United States Patent
Adam

(10) Patent No.: US 9,443,501 B1
(45) Date of Patent: Sep. 13, 2016

(54) METHOD AND SYSTEM OF NOTE SELECTION AND MANIPULATION

(71) Applicant: Apple Inc., Cupertino, CA (US)

(72) Inventor: Thorsten Adam, Hamburg (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/711,317

(22) Filed: May 13, 2015

(51) Int. Cl.
  *G10H 1/00* (2006.01)
  *G10H 1/18* (2006.01)
  *G06F 3/02* (2006.01)

(52) U.S. Cl.
  CPC . *G10H 1/18* (2013.01); *G06F 3/02* (2013.01)

(58) Field of Classification Search
  CPC .... G06F 3/017; G06F 3/0488; G06F 3/0482; G06F 3/041; G06F 2203/04808; G06F 3/0416; G06F 3/0412; G06F 3/016; G06F 3/0486; G06F 3/03545; G06F 3/048; G06F 3/03547; G06F 3/0414; G06F 1/1643; G06F 3/0426; G10H 2210/066; G10H 2220/096
  See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,792,971 A * | 8/1998 | Timis | G10H 1/0008 369/83 |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,239,784 B2 * | 8/2012 | Hotelling | G06F 3/0418 345/173 |
| 8,479,122 B2 | 7/2013 | Hotelling et al. | |
| 8,487,176 B1 * | 7/2013 | Wieder | G10H 1/0025 84/615 |
| 2006/0197753 A1 | 9/2006 | Hotelling | |
| 2012/0222540 A1 * | 9/2012 | Usui | G10H 1/0025 84/622 |
| 2012/0311507 A1 * | 12/2012 | Murrett | G06F 3/041 715/863 |
| 2014/0006031 A1 * | 1/2014 | Mizuguchi | G10L 13/04 704/260 |
| 2015/0013527 A1 * | 1/2015 | Buskies | G10H 1/40 84/611 |
| 2015/0153929 A1 * | 6/2015 | Bernstein | G06F 3/0481 715/781 |
| 2015/0268926 A1 * | 9/2015 | Panaiotis | G06F 3/167 715/716 |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Marlon Fletcher
(74) *Attorney, Agent, or Firm* — Morrison & Foerster LLP

(57) ABSTRACT

A method, electronic device and non-transitory computer readable storage medium for simple and intuitive audio editing of multiple notes at once in an audio editing application. Audio editing can include selecting, inserting, and modifying multiple notes at once with respect to a time interval, including using a brush pattern tool to insert some or all of a stored pattern of notes, and using a time stretch tool to expand, contract, or reverse a set of selected notes.

47 Claims, 51 Drawing Sheets

(56) References Cited

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

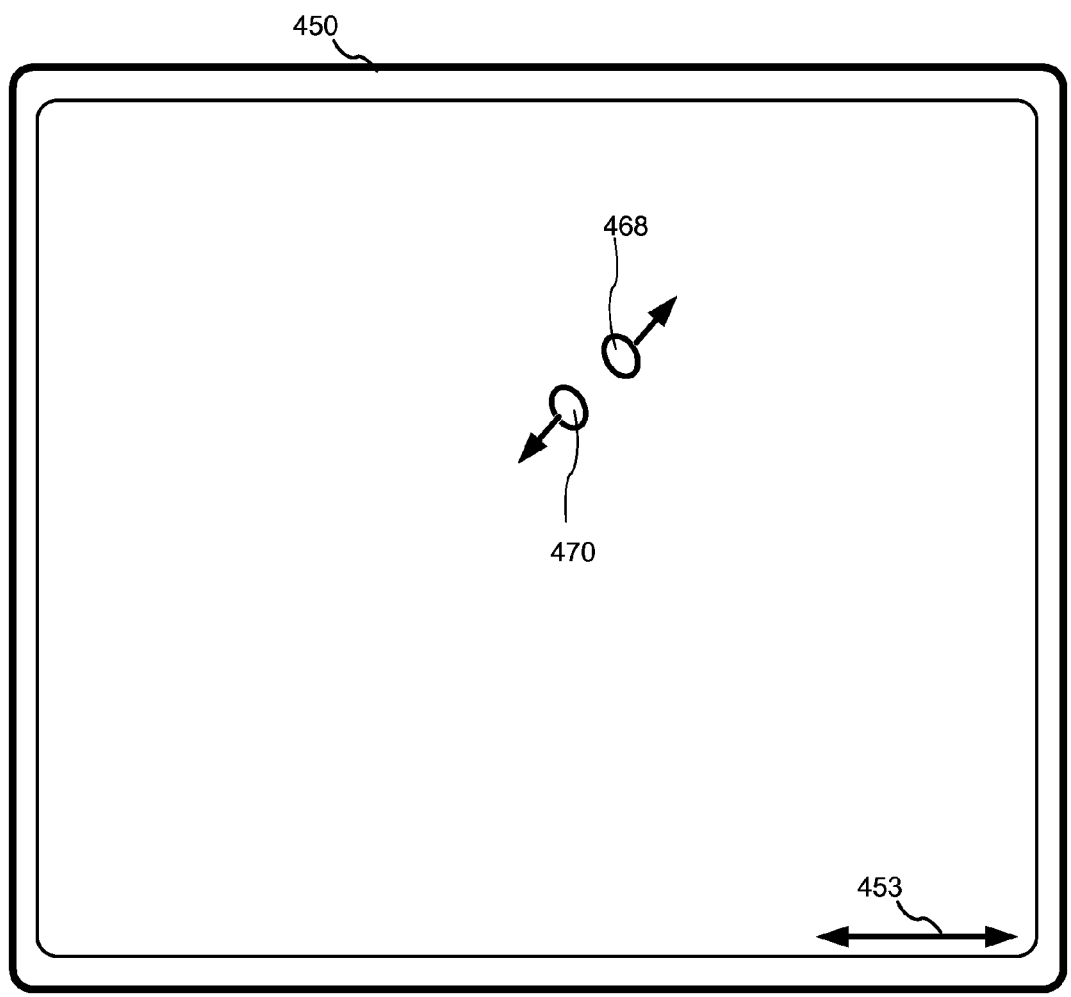
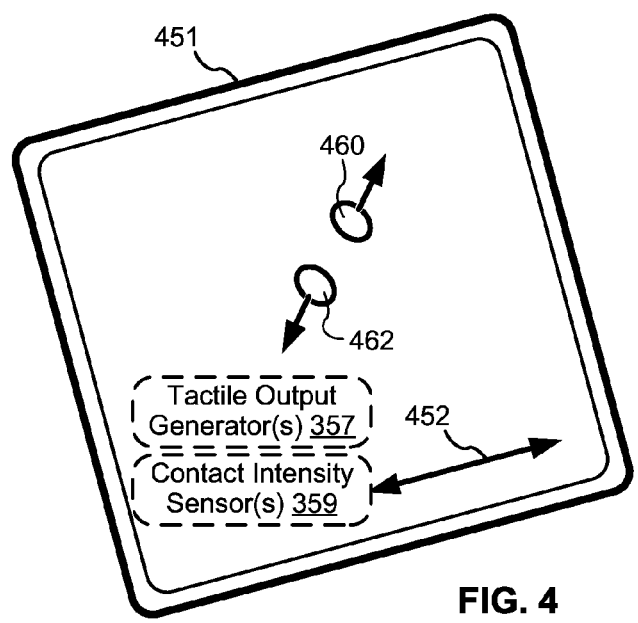
FIG. 4

METHOD AND SYSTEM OF NOTE SELECTION AND MANIPULATION

FIELD OF THE DISCLOSURE

The present disclosure relates generally to user interfaces for an audio editing application.

BACKGROUND OF THE DISCLOSURE

Audio editing applications provide a user interface area for editing sequences of notes, including the ability to insert single notes, adjust durations of single notes, and move single notes within the sequence.

SUMMARY OF THE DISCLOSURE

Audio editing applications provide a user interface area for editing sequences of notes, including the ability to insert single notes, adjust durations of single notes, and move single notes within the sequence. However, there is a need to provide a simple and intuitive way to select and manipulate several notes at once with respect to a time interval. The embodiments described below provide methods of an audio editing application for selecting, inserting, and modifying multiple notes at once, including using a brush pattern tool to insert some or all of a stored pattern of notes, and using a time stretch tool to expand, contract, or reverse a set of selected notes.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4 illustrates an exemplary user interface for a multifunction device with a touch-sensitive surface that is separate from the display in accordance with some embodiments.

DETAILED DESCRIPTION

Figure 1A:
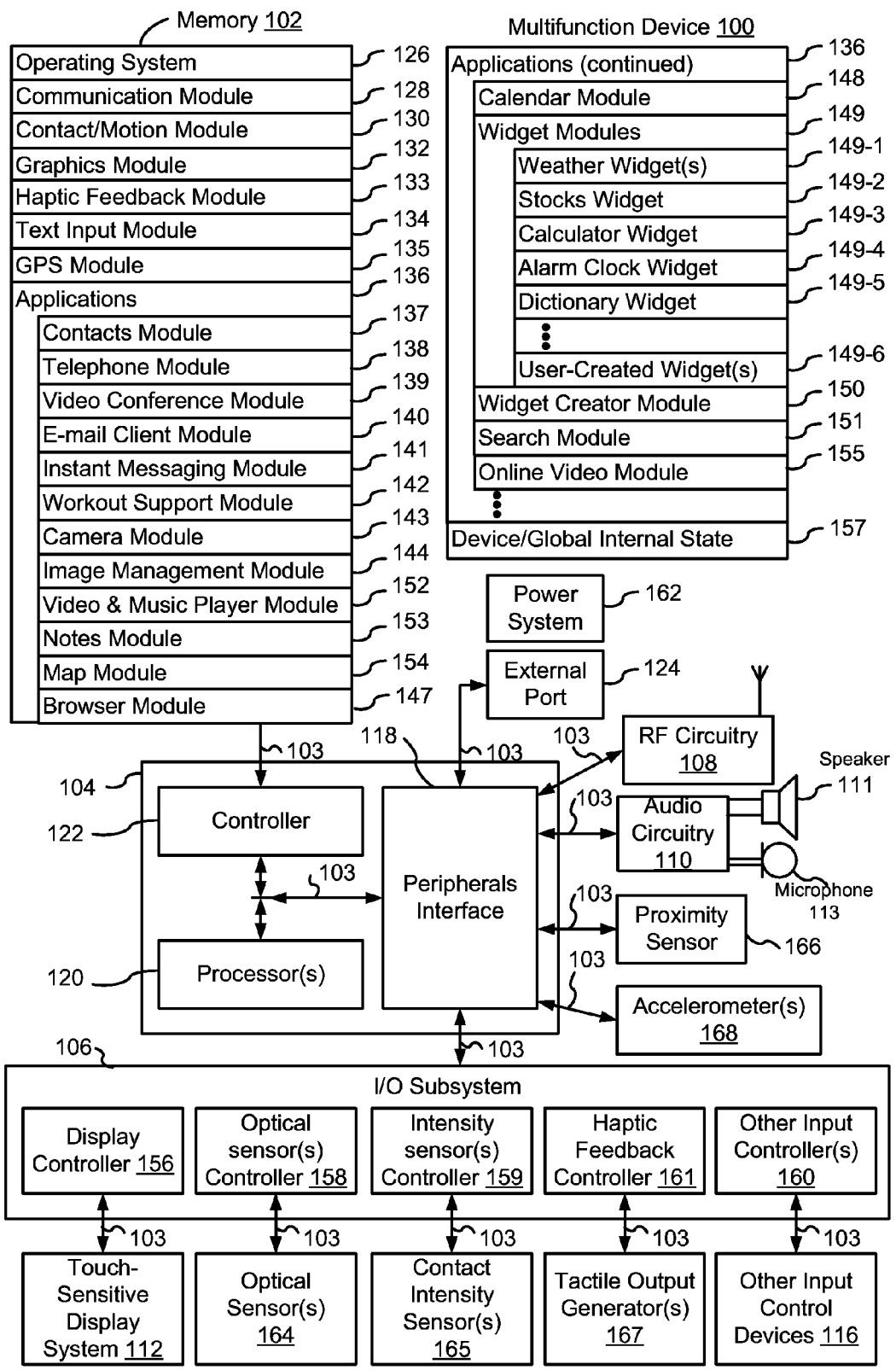
FIG. 1A is a block diagram illustrating a multifunction device with a touch-sensitive display in accordance with some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Audio editing applications provide a user interface area for editing sequences of notes, including the ability to insert single notes, adjust durations of single notes, and move single notes within the sequence. However, there is a need to provide a simple and intuitive way to select and manipulate several notes at once with respect to a time interval. The embodiments described below provide methods of an audio editing application for selecting, inserting, and modifying multiple notes at once, including using a brush pattern tool to insert some or all of a stored pattern of notes, and using a time stretch tool to expand, contract, or reverse a set of selected notes.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
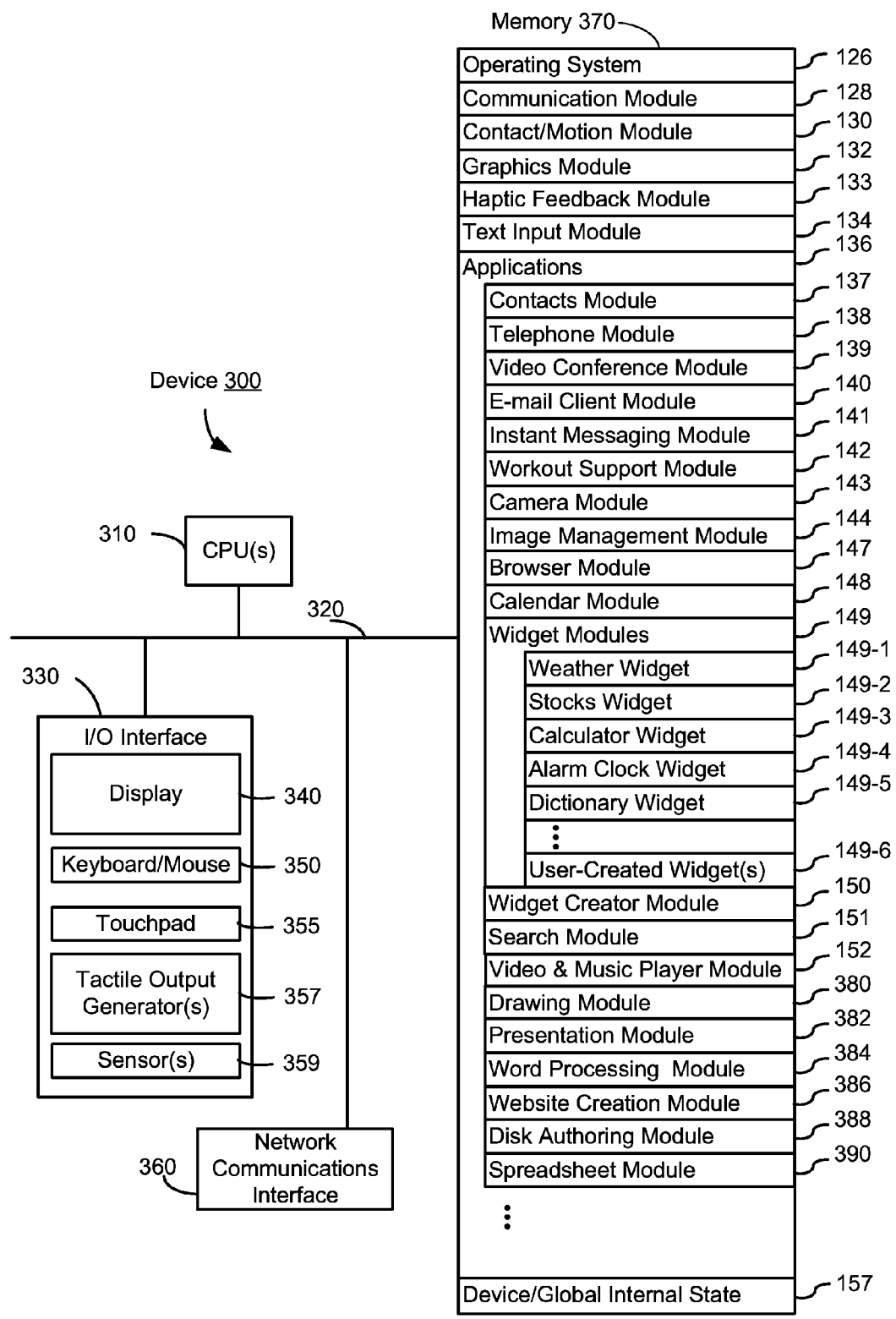
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;

search module 151;
video and music player module 152, which is, optionally, made up of a video player module and a music player module;
notes module 153;
map module 154;
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
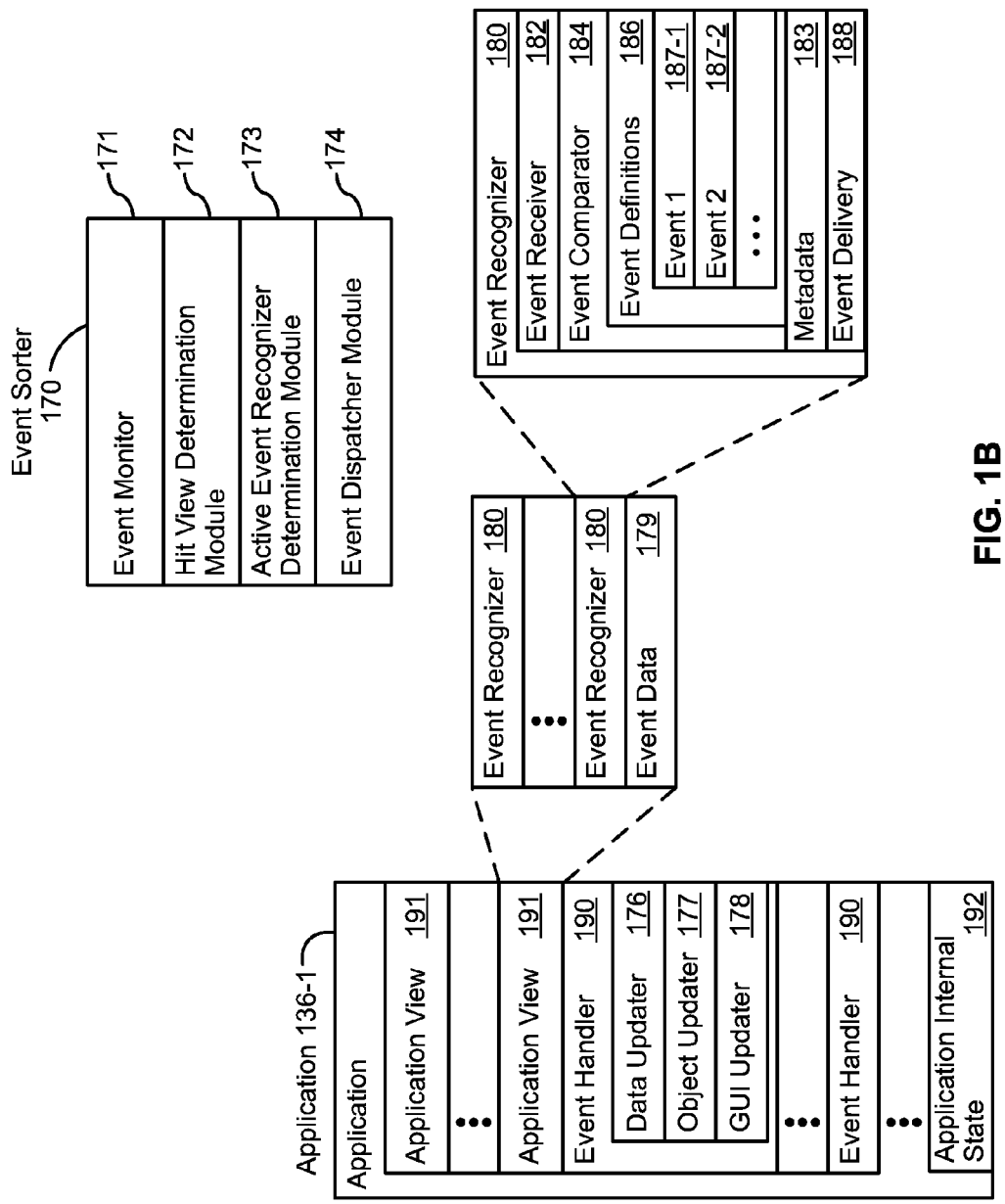
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
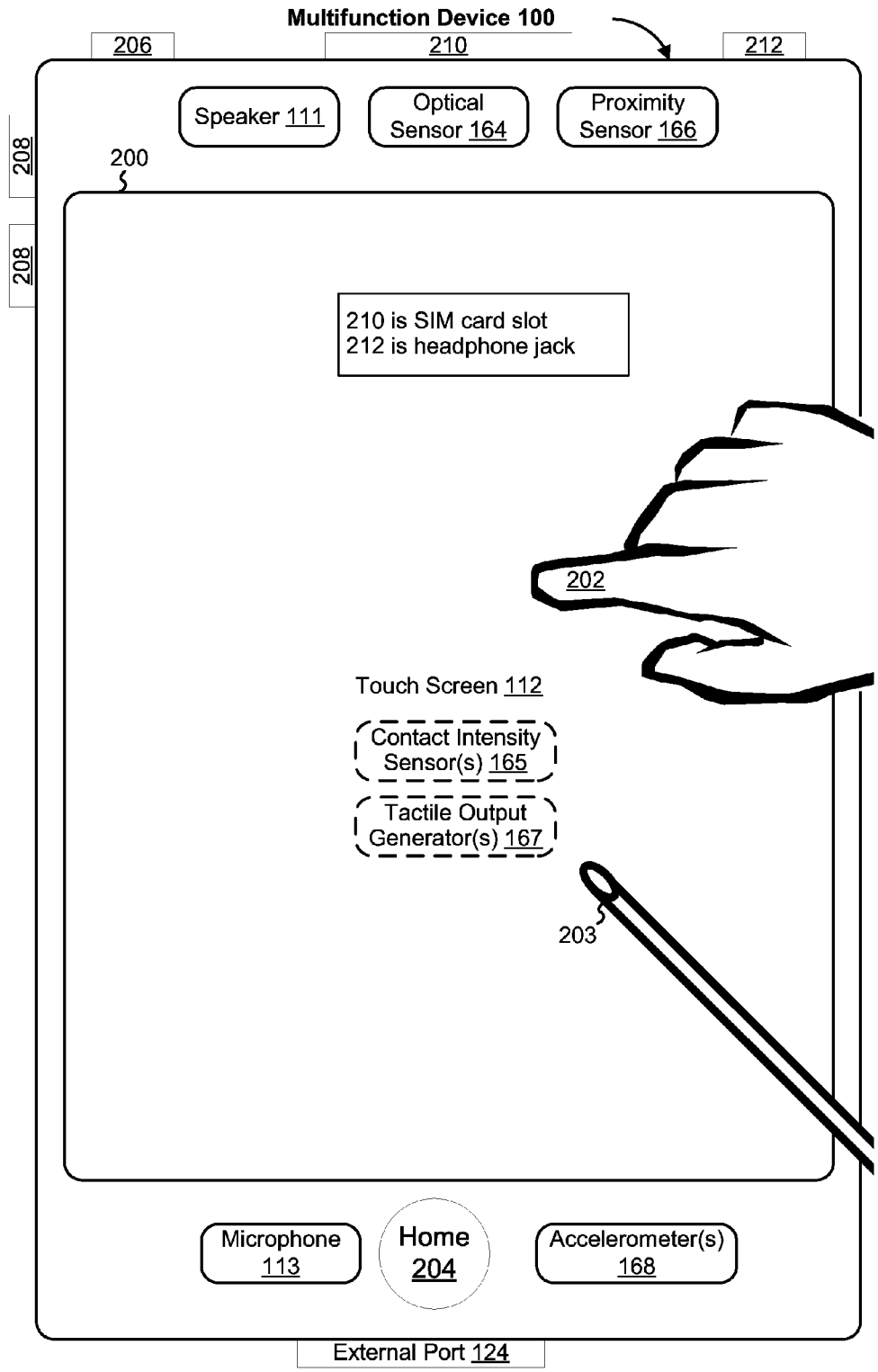
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

USER INTERFACES AND ASSOCIATED PROCESSES

Audio editing applications provide a user interface area for editing sequences of notes, including the ability to insert single notes, adjust durations of single notes, and move single notes within the sequence. However, there is a need to provide a simple and intuitive way to select and manipulate several notes at once with respect to a time interval. The embodiments described below provide methods of an audio editing application for selecting, inserting, and modifying multiple notes at once, including using a brush pattern tool to insert some or all of a stored pattern of notes, and using a time stretch tool to expand, contract, or reverse a set of selected notes.

Figure 5A:
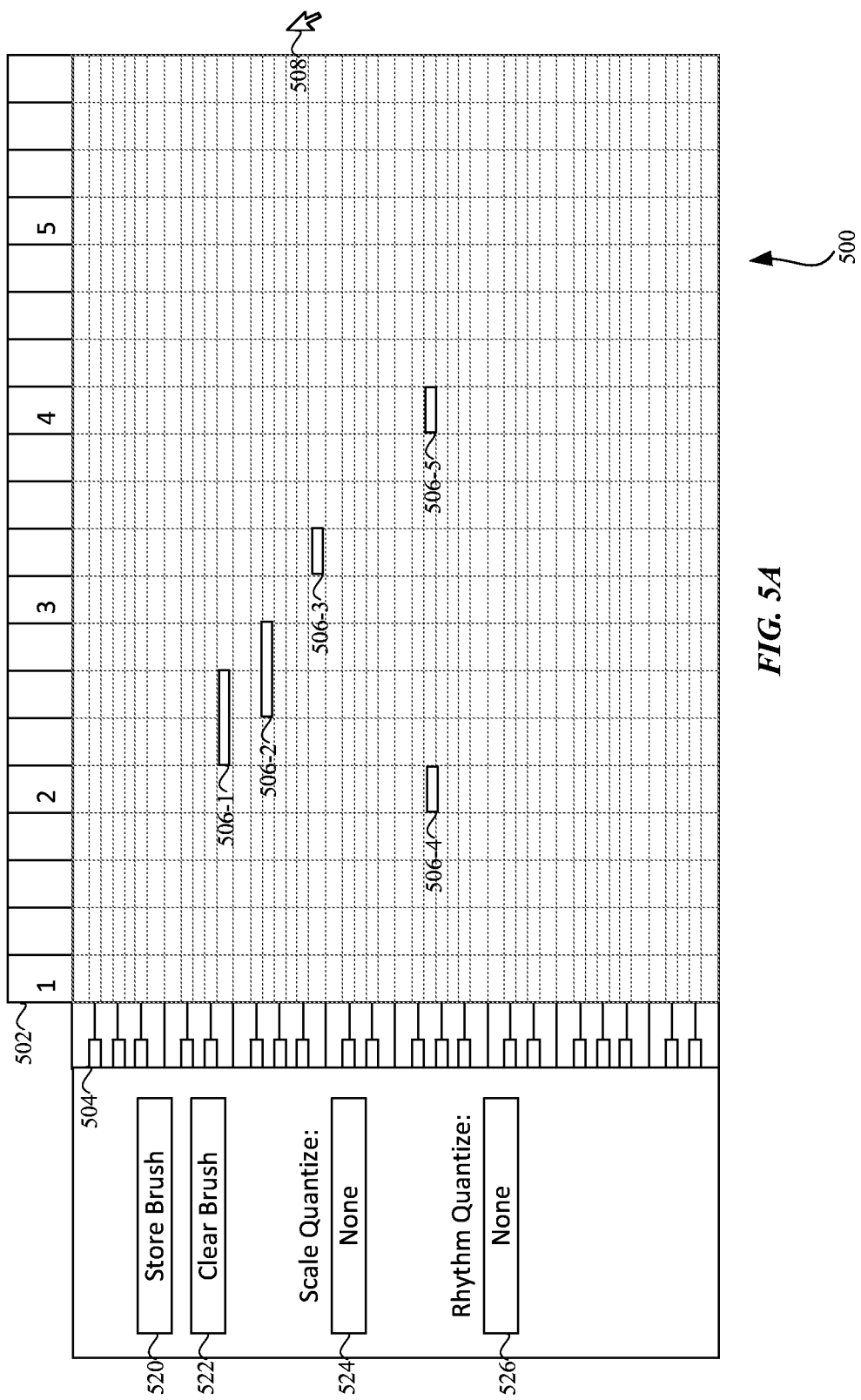
FIGS. 5A-5RR illustrate user interfaces of an audio editing application in accordance with some embodiments.
Figure 5B:
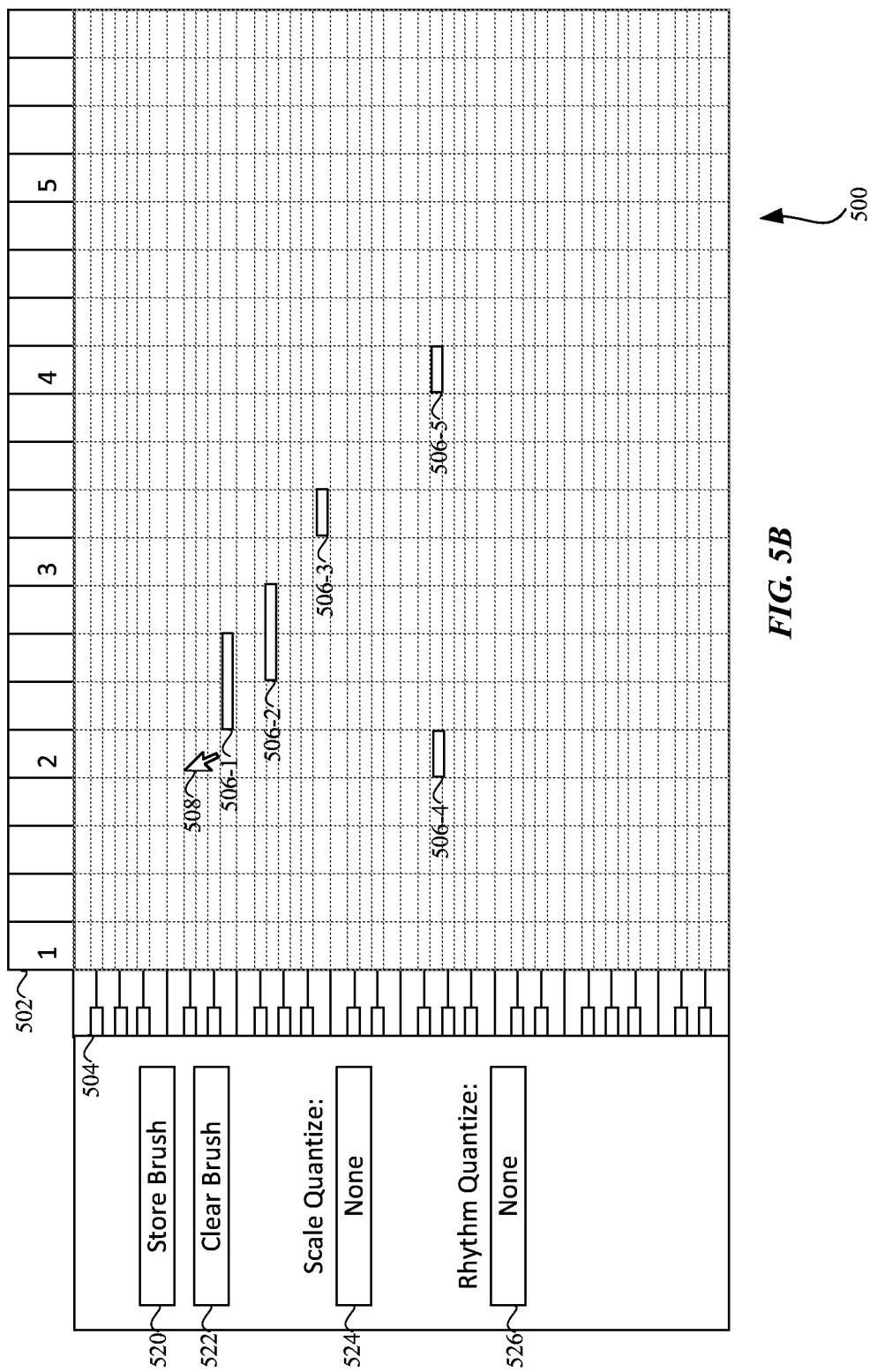
Figure 5C:
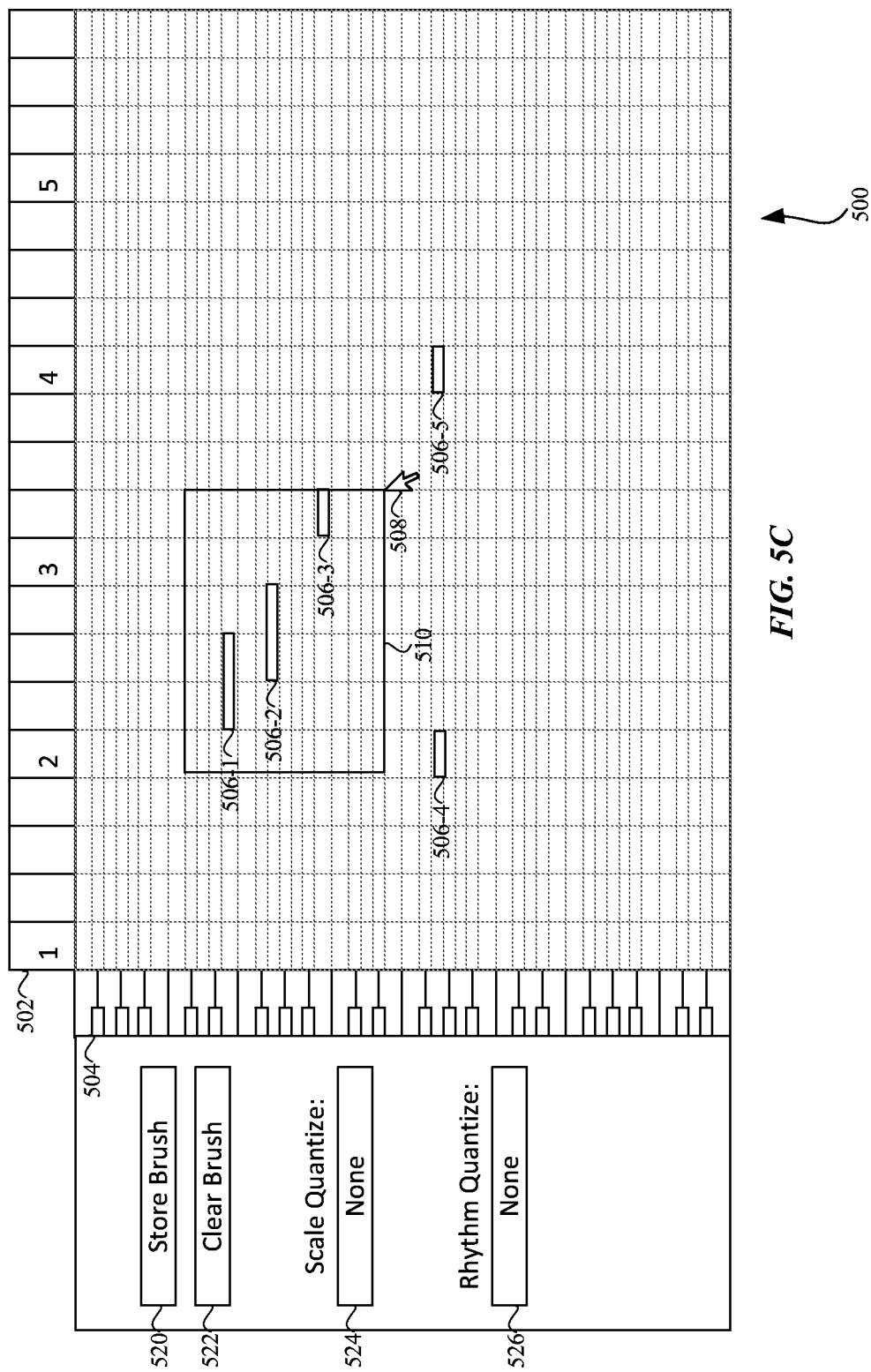
Figure 5D:
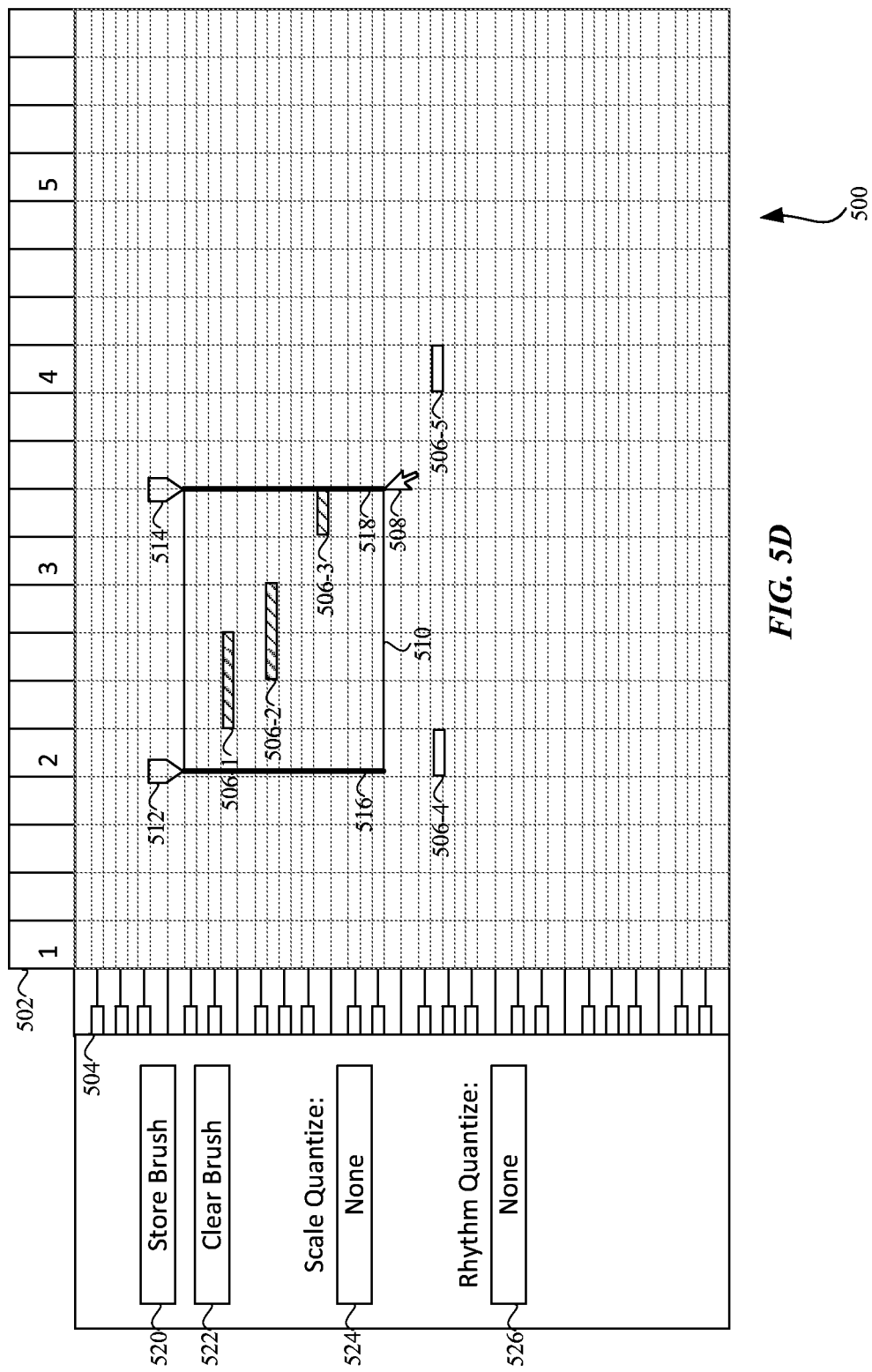
Figure 5E:
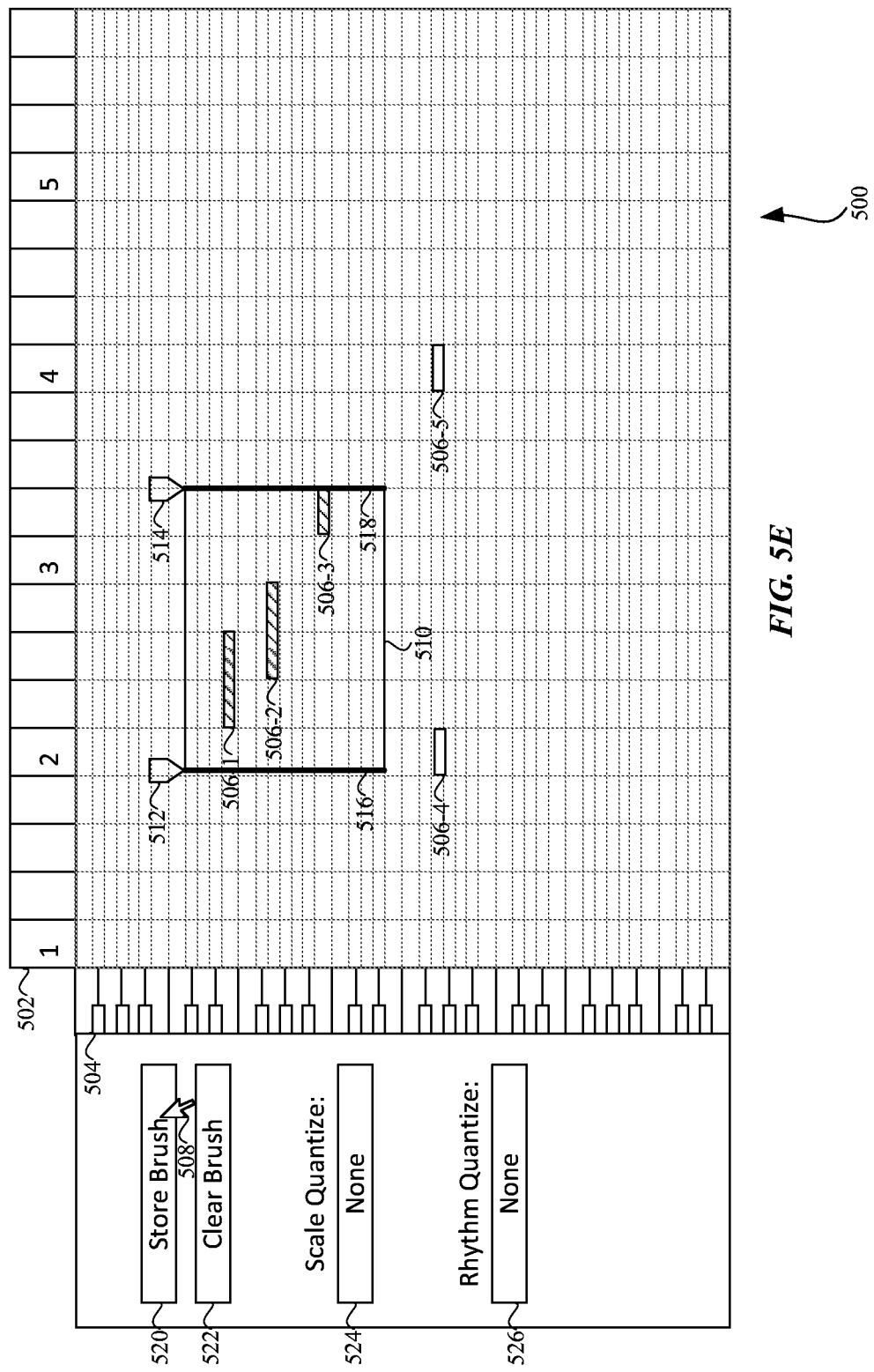
Figure 5F:
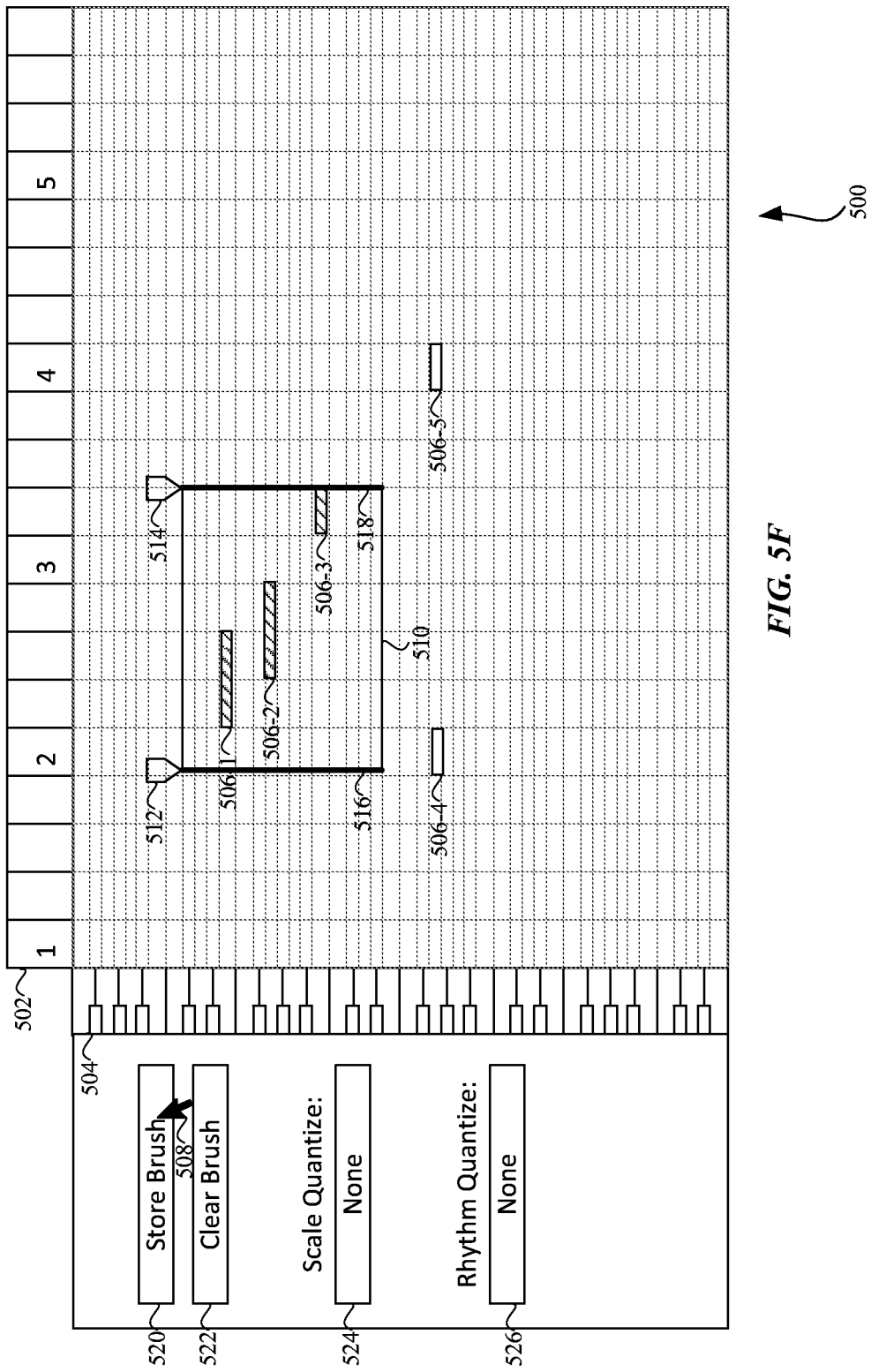
Figure 5G:
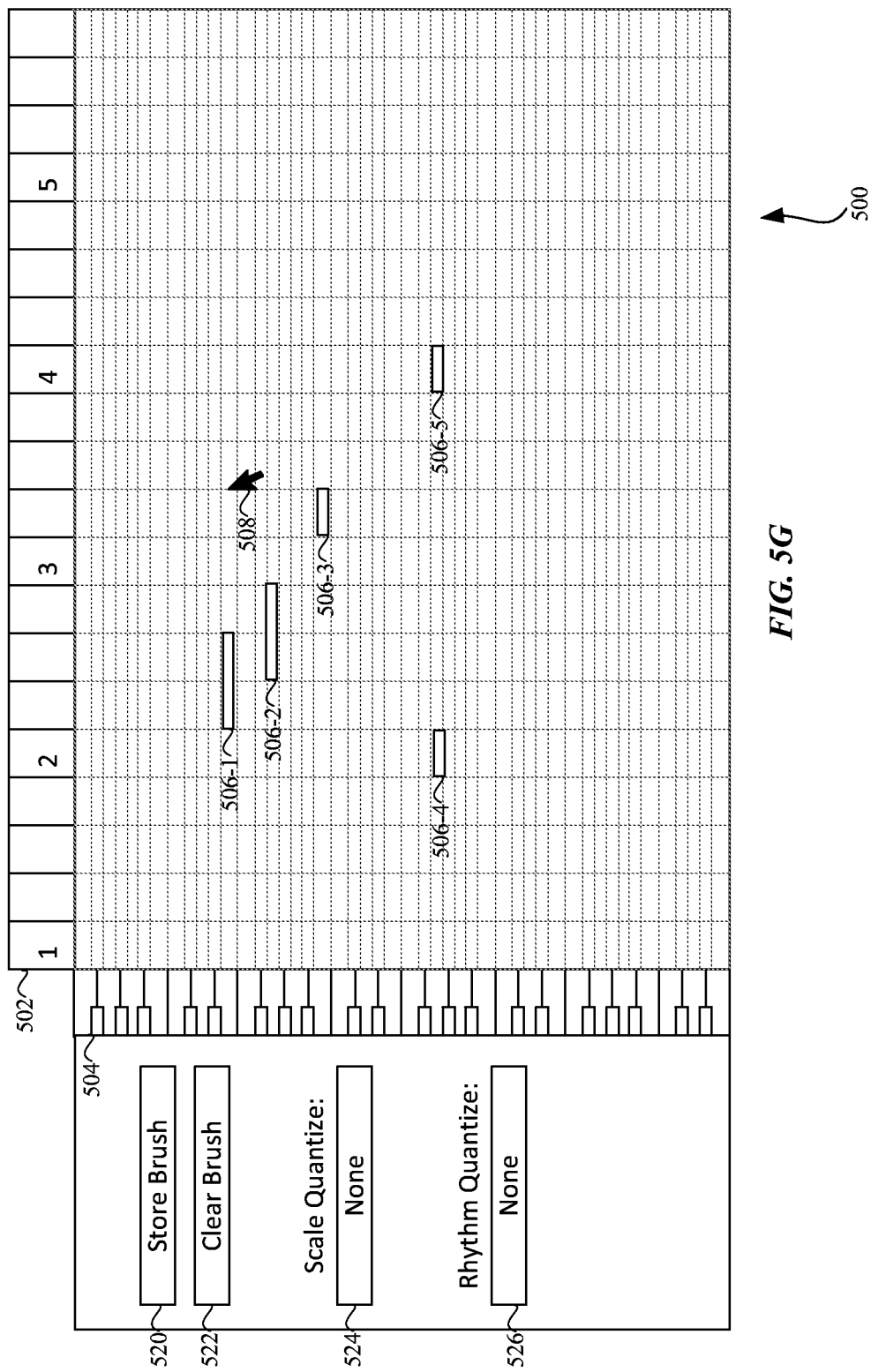
Figure 5H:
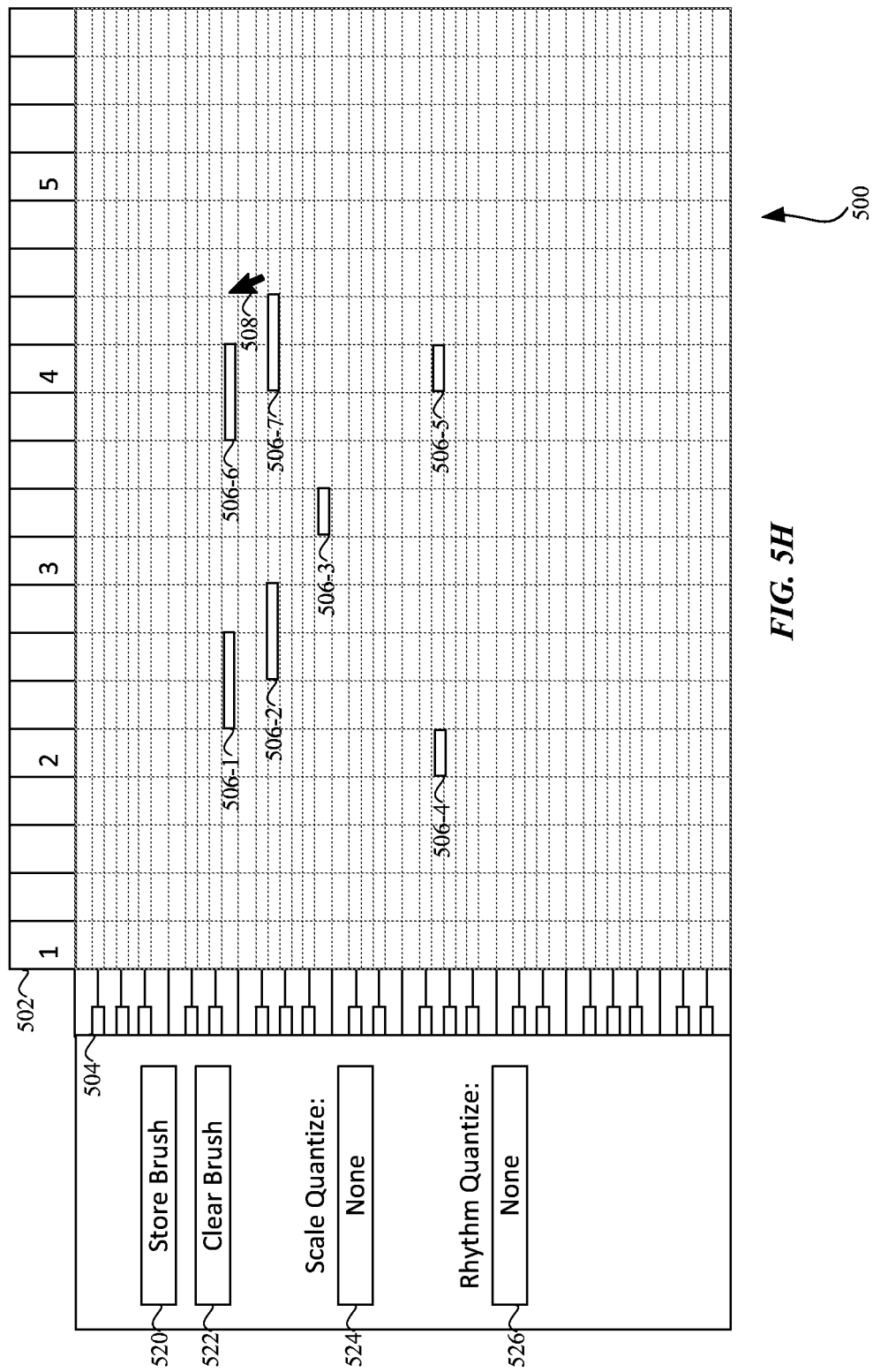
Figure 5I:
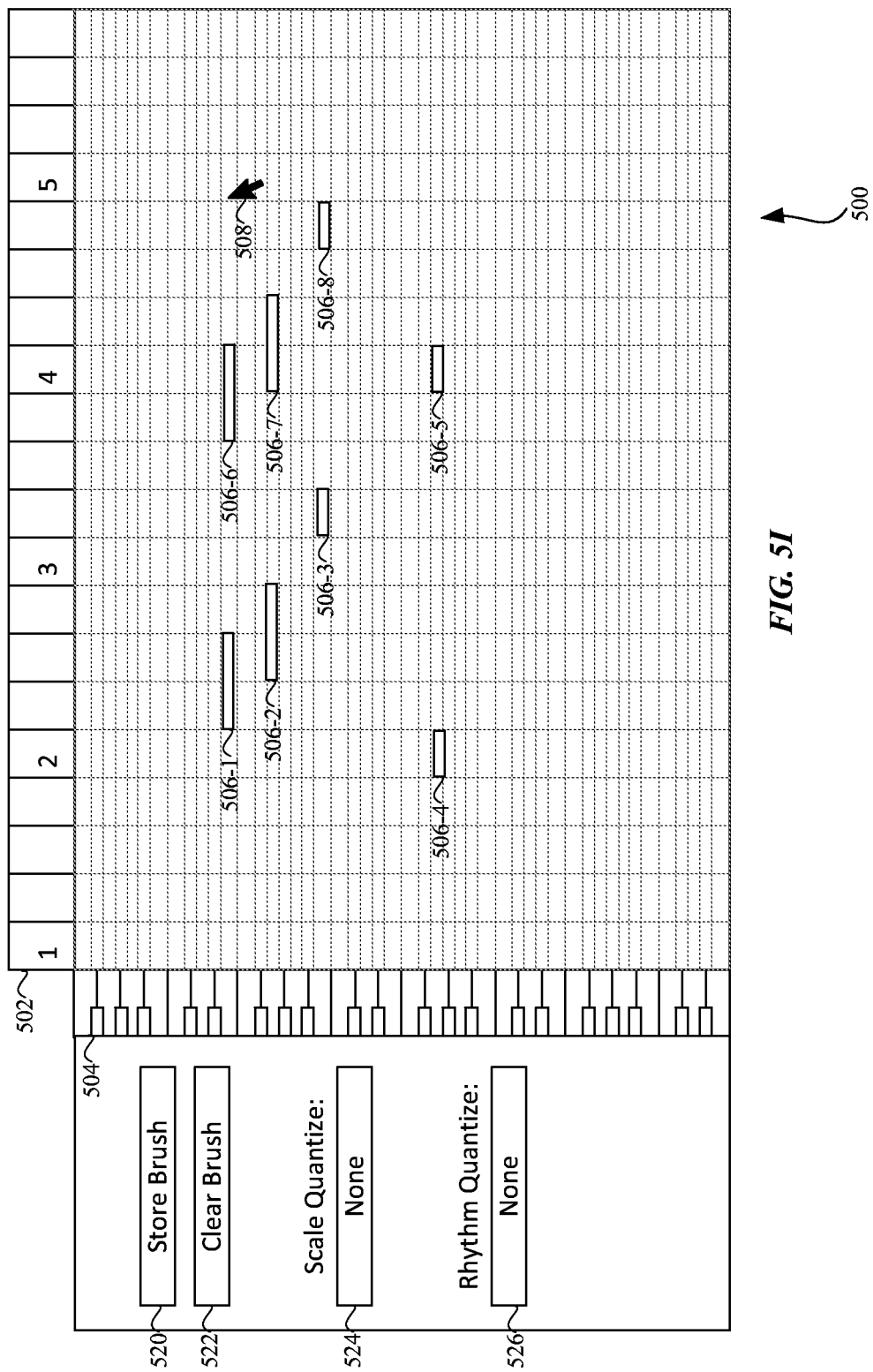
Figure 5J:
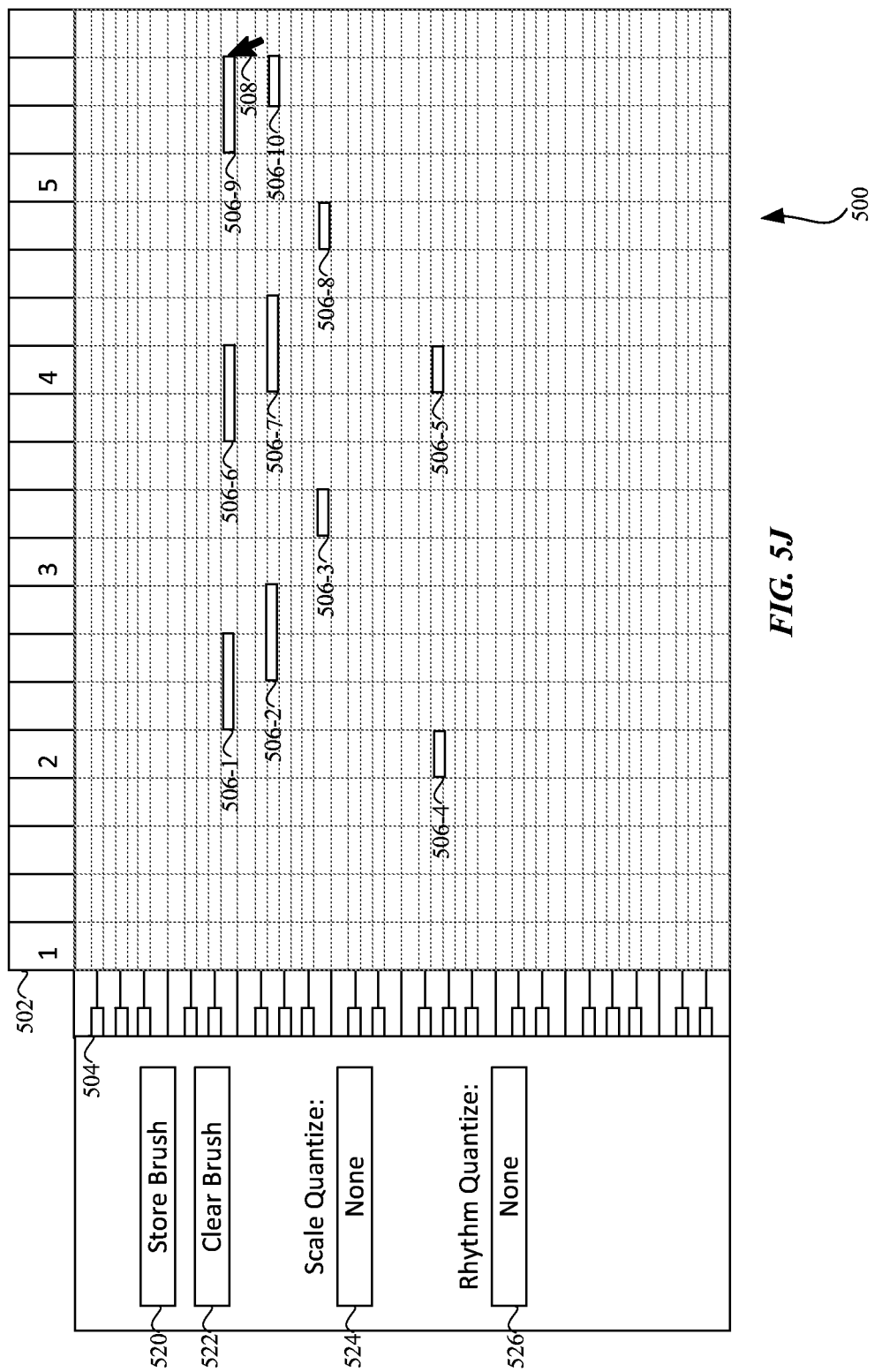
Figure 5K:
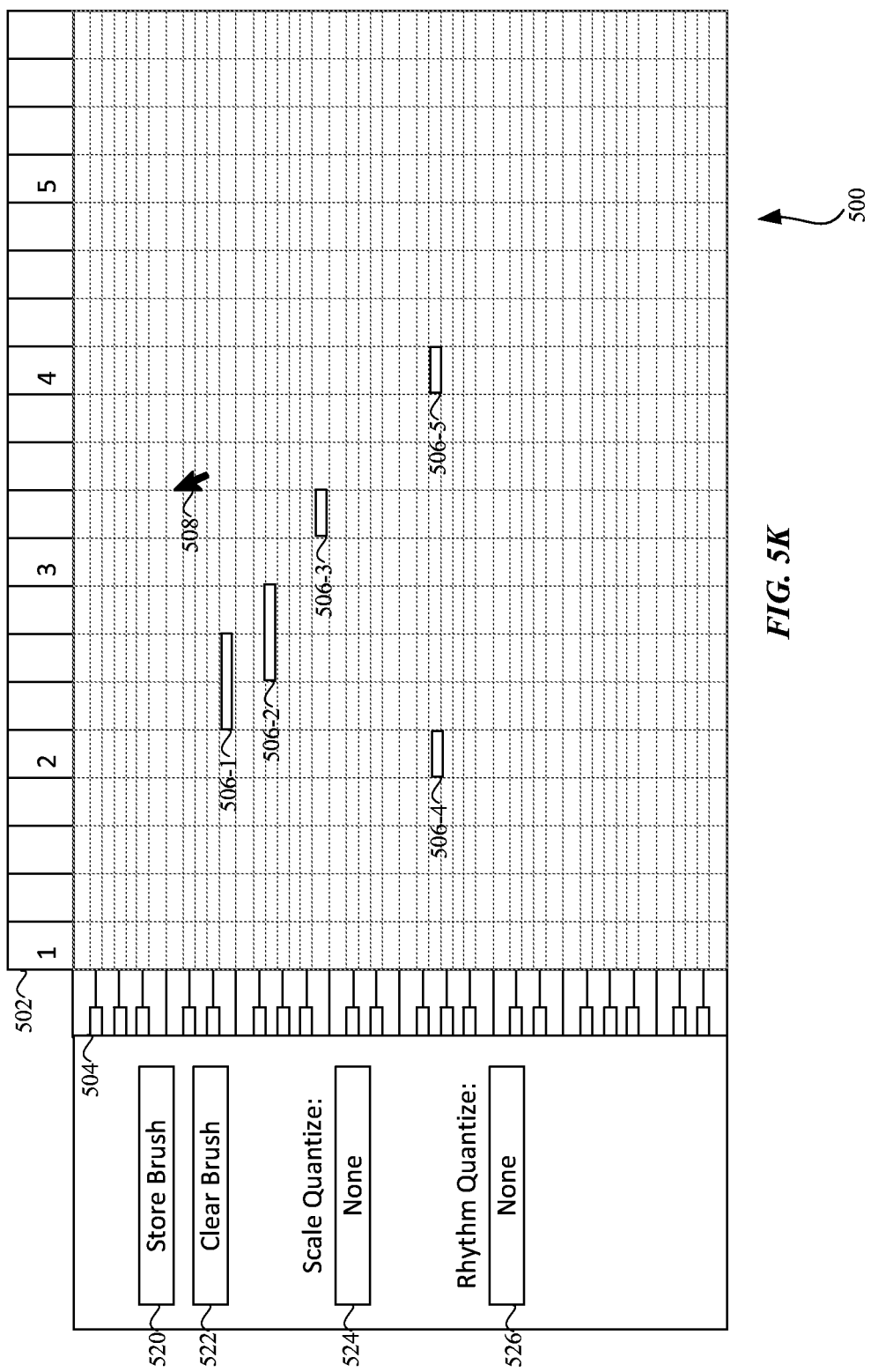
Figure 5L:
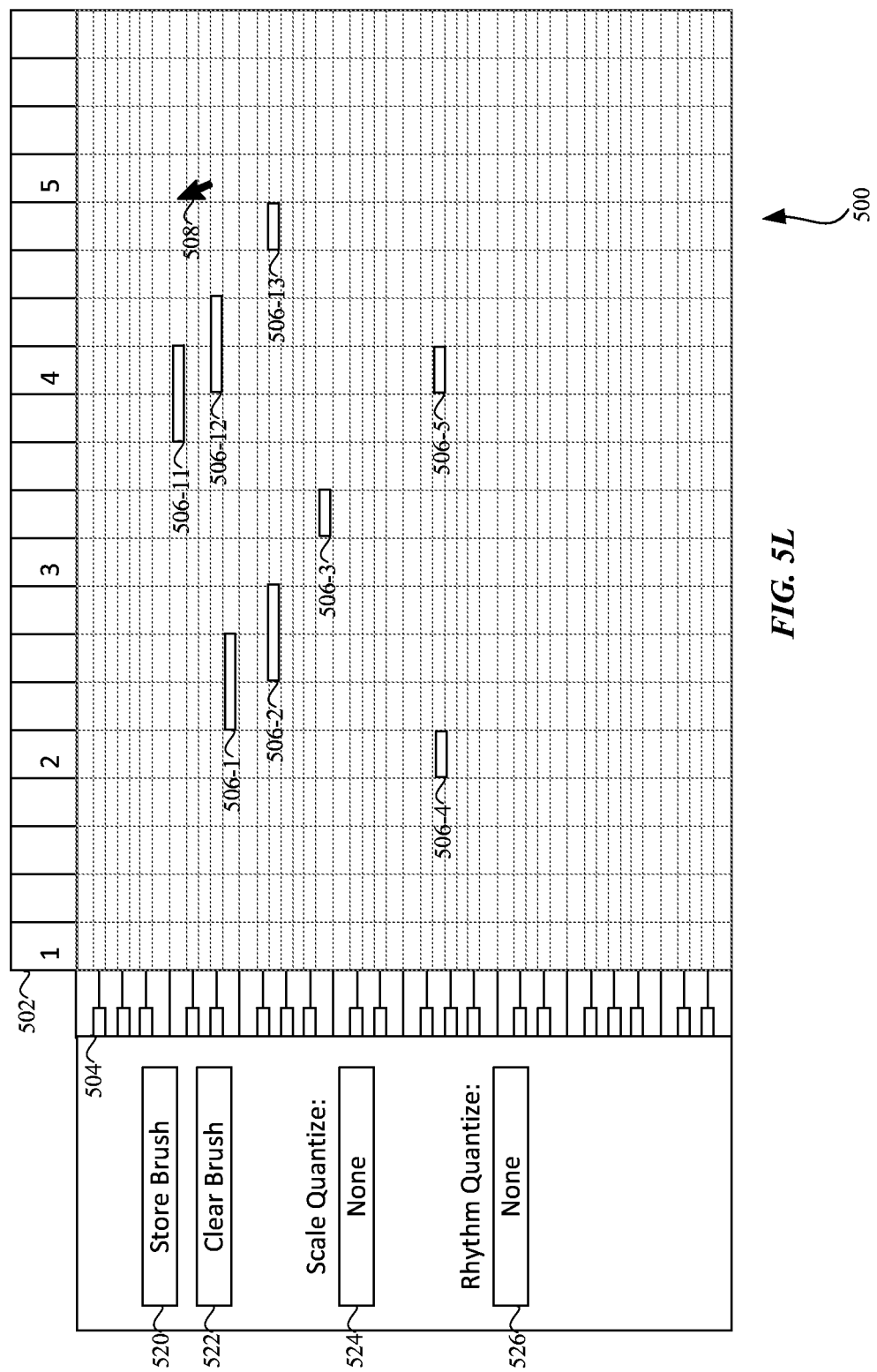
Figure 5M:
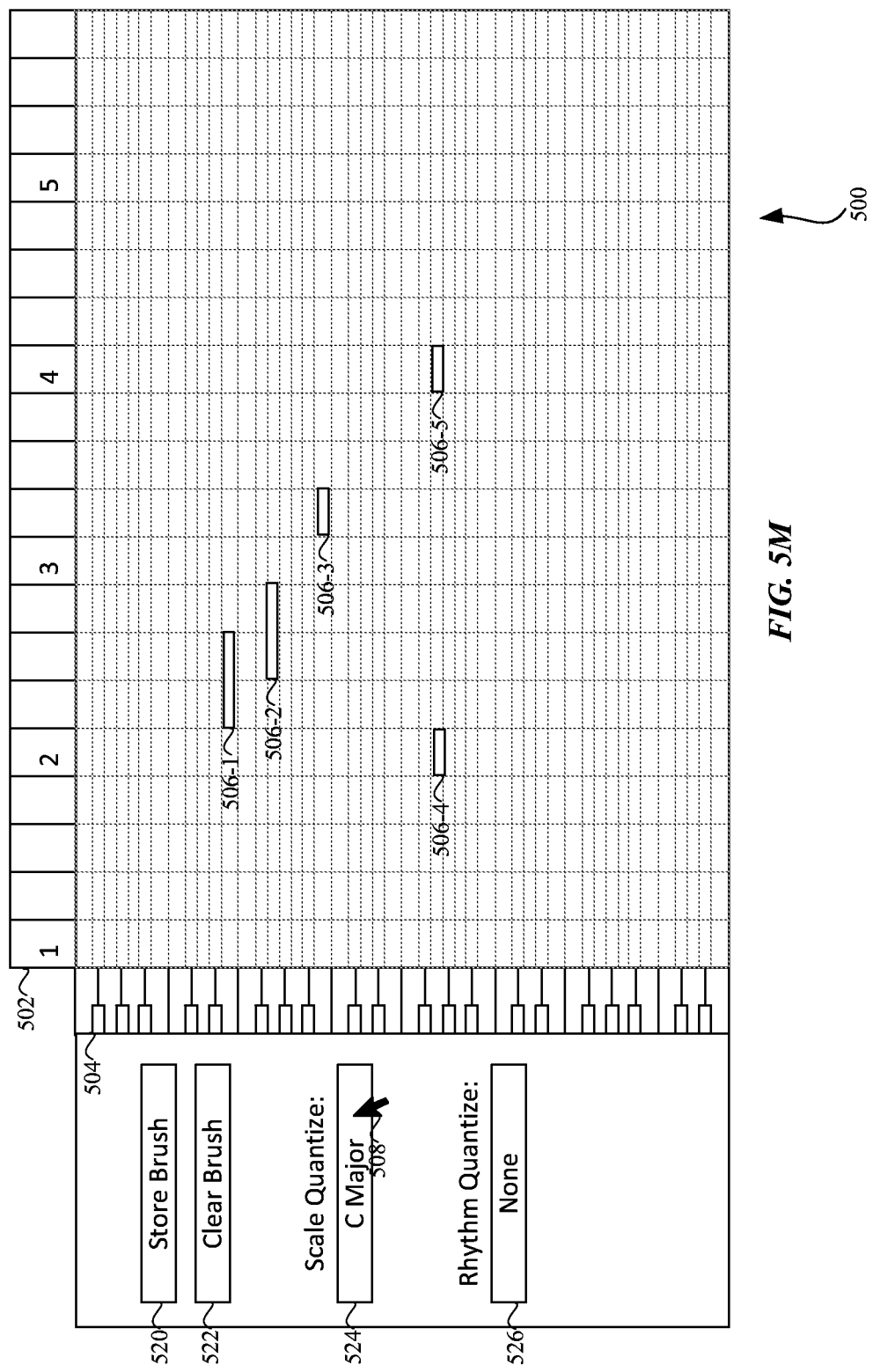
Figure 5N:
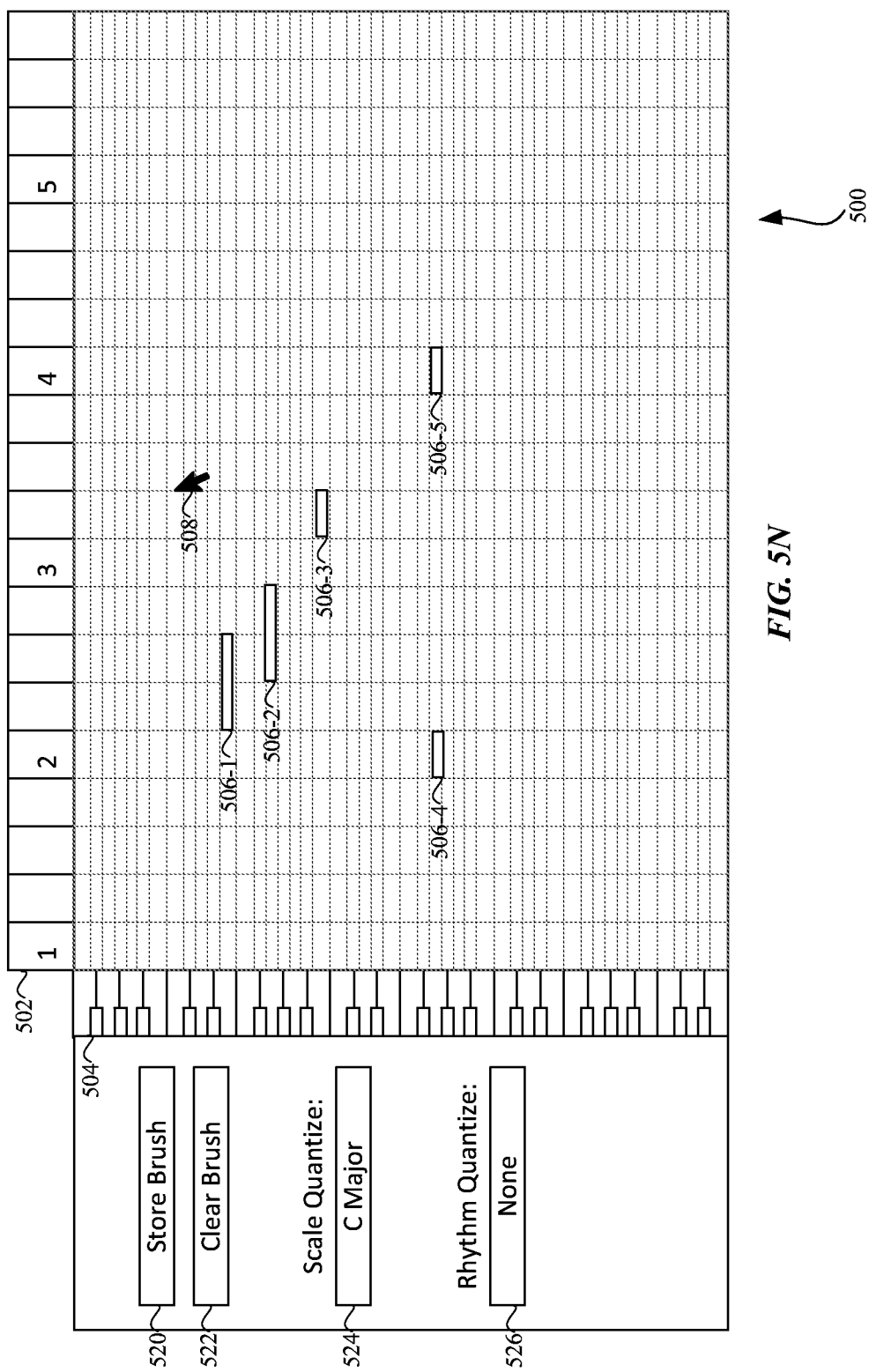
Figure 50:
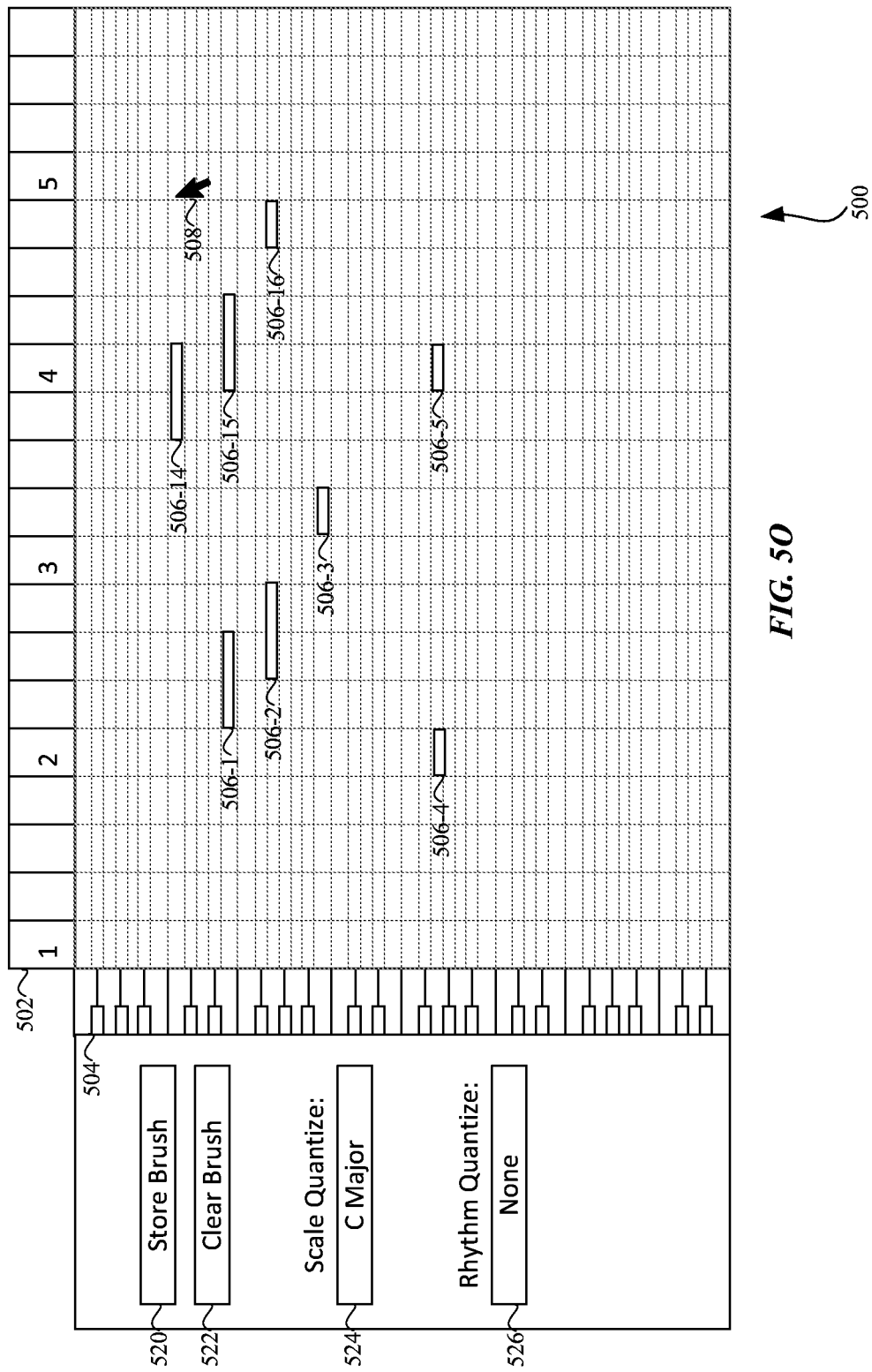
Figure 5P:
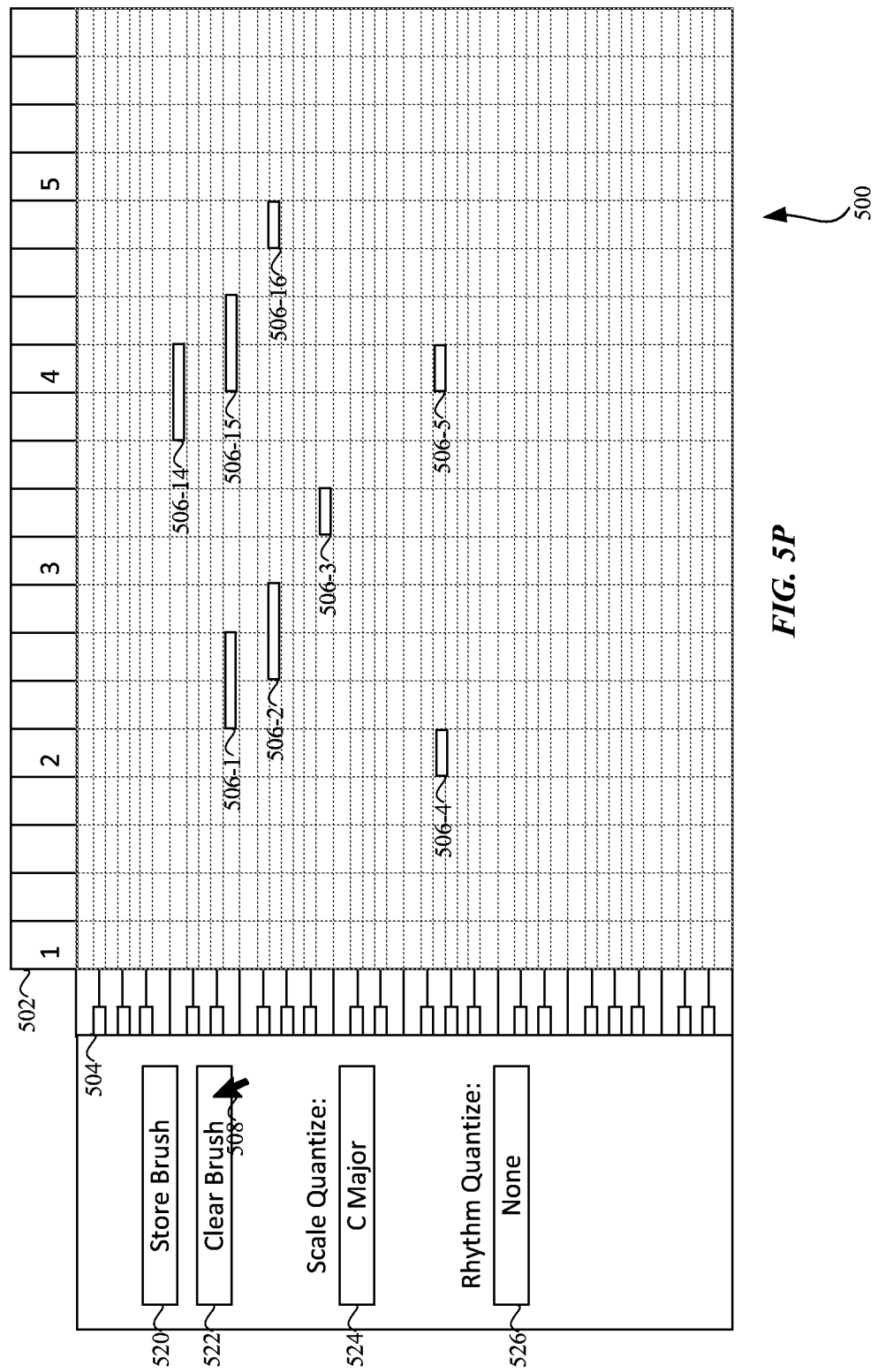
Figure 5Q:
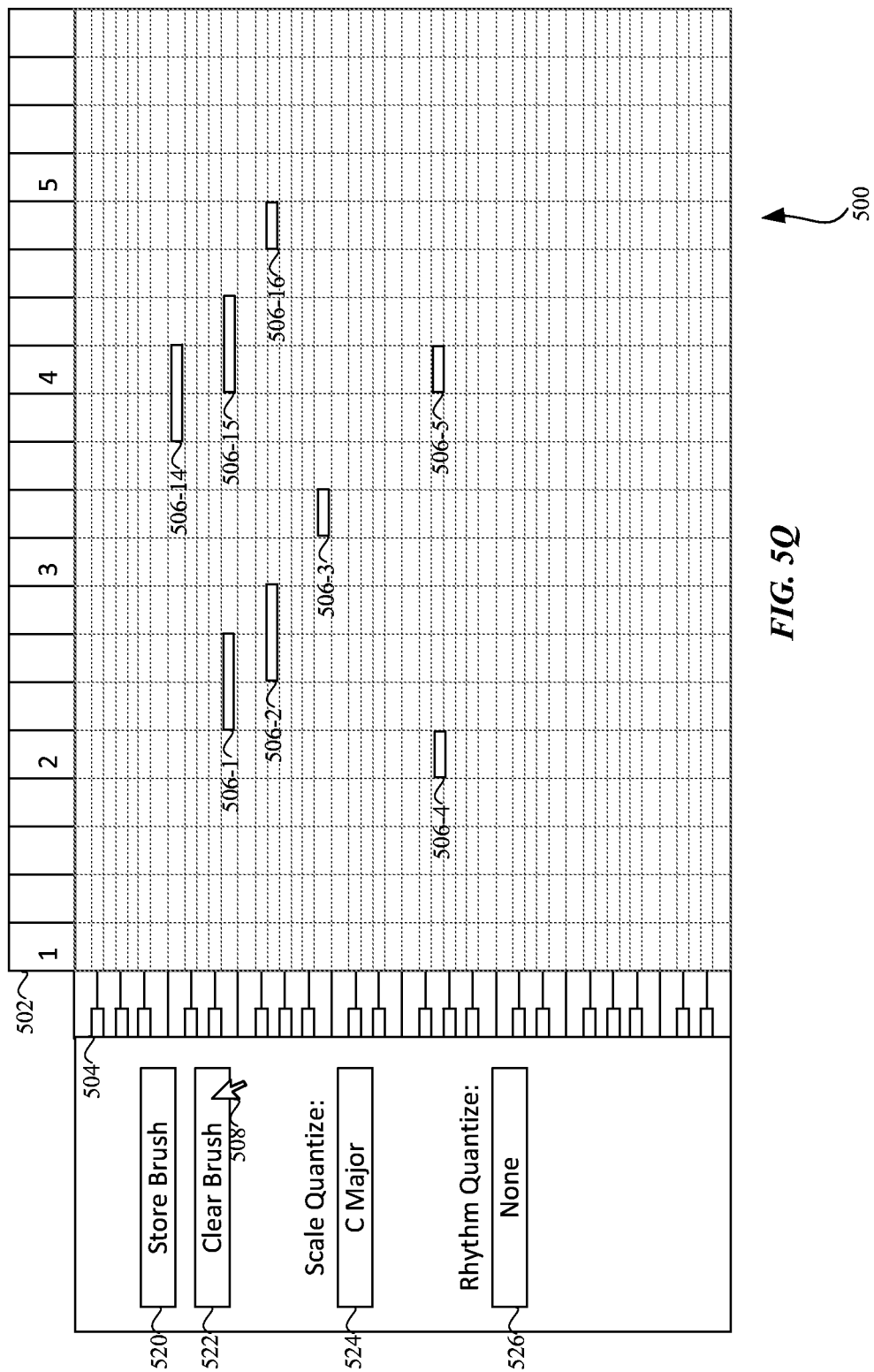
Figure 5R:
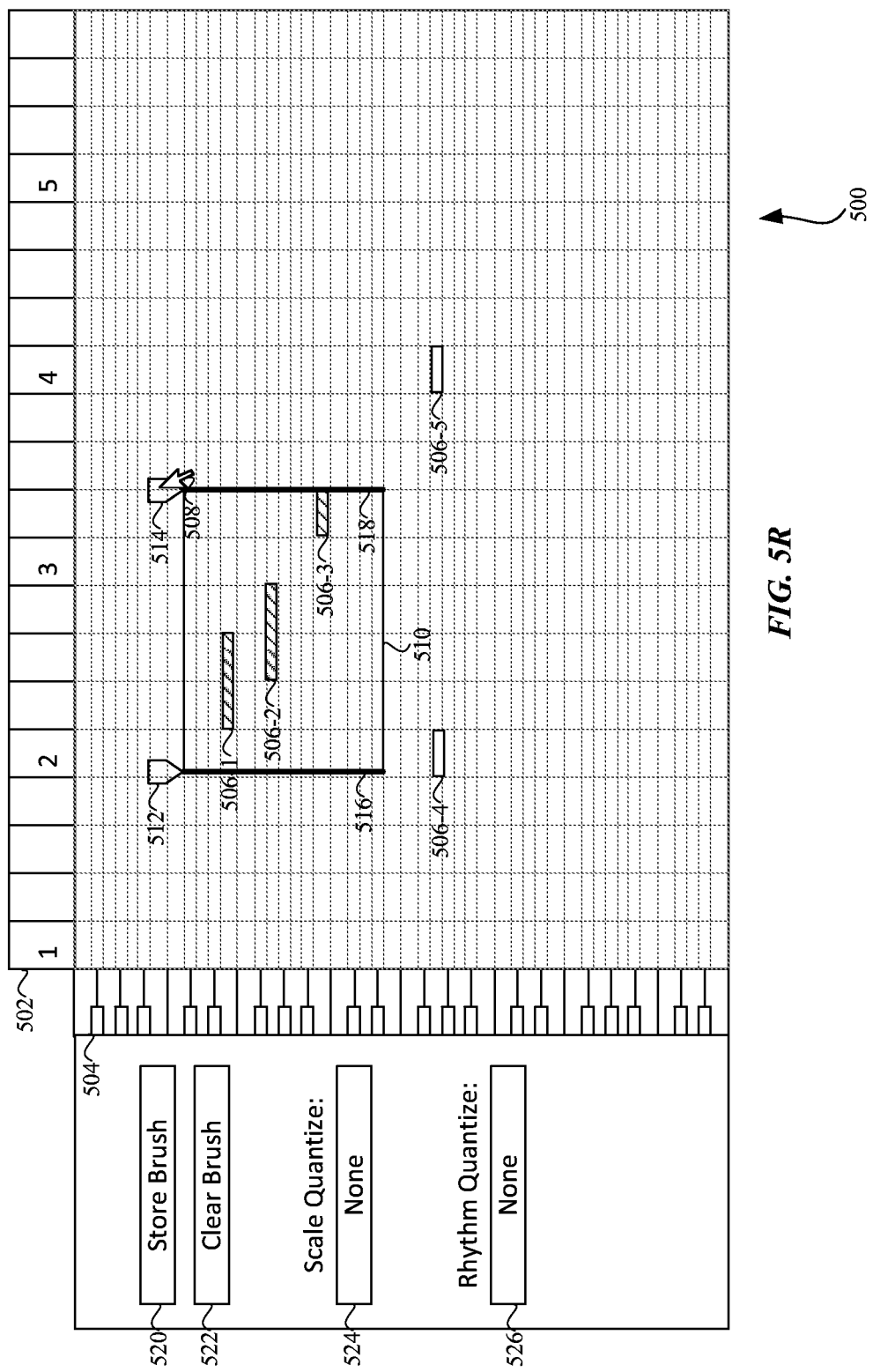

FIGS. 5A-5RR illustrate user interfaces of an audio editing application in accordance with some embodiments. The user interfaces in these figures are used to illustrate the processes described below, including the processes described below with reference to FIGS. 6A-6B.

FIG. 5A illustrates a musical user interface area 500, including note event objects 506-1, 506-2, 506-3, 506-4, and 506-5 located with respect to a time axis 502 and a pitch axis 504. The location of each note with respect to the pitch axis indicates a pitch of the note. For example, note 506-1 has a pitch of C, note 506-2 has a pitch of A, note 506-3 has a pitch of F, note 506-4 has a pitch of A, and note 506-5 has a pitch of A. The location of each note with respect to the time axis indicates a note initiation time of the note. For example, note 506-1 starts at the second beat of measure 2, note 506-2 starts at the third beat of measure 2, note 506-3 starts at the second beat of measure 3, note 506-4 starts at the first beat of measure 2, and note 506-5 starts at the first beat of measure 4. Further, the length of each note with respect to the time axis indicates a duration of the note. For example, notes 506-1 and 506-2 each have a duration of two beats, and notes 506-3, 506-4, and 506-5 each have a duration of one beat.

The musical user interface area 500 further includes a "Store Brush" button 520 for storing note event objects in association with a brush pattern tool, a "Clear Brush" button 522 for clearing note event objects stored in association with a brush pattern tool, a "Scale Quantize" selector 524 for selecting a scale quantize value, and a "Rhythm Quantize"

selector 526 for selecting a rhythm quantize value, each of which is explained in more detail below. A cursor 508 (e.g., controlled with a mouse or other pointing device) is optionally used to interact with the musical user interface area 500, although in some embodiments touch input or other input is optionally used to interact with the musical user interface 500.

FIGS. 5B-5D illustrate the creation of a selection area 510 in response to user input. In FIG. 5B, input is initiated with the cursor 508 at a first location in the user interface (e.g., a user clicks with the cursor at the first location), and in FIG. 5C the input is terminated with the cursor 508 at a second location in the user interface (e.g., the user drags from the first location to the second location and releases at the second location). As illustrated in FIG. 5C, a selection area 510 is optionally displayed during the user input to indicate to the user which notes are contained within the selection area. In FIG. 5D, in response to the input (e.g., after termination of the input), the selection area 510 is displayed including a first border 512, a second border 514, a first pivot 516, and a second pivot 518.

The input optionally selects both a time interval along the time axis, and also any note event objects contained within the selection area. For example, FIG. 5D illustrates a selected time interval from the first beat of measure 2 to the third beat of measure 3. Further, the notes 506-1, 506-2, and 506-3 located within the selection area 510 are selected, whereas the notes 506-4 and 506-5 located outside the selection area 510 are not selected. In some embodiments, selected notes are optionally displayed in the user interface having a different visual characteristic than unselected notes (e.g., selected notes may be highlighted, displayed with a different color, displayed with a different fill pattern, etc.).

In some embodiments, the first and second borders 512 and 514 are moveable to different locations corresponding to different times of the sequence of notes, stretching the selected notes based on movement of the borders, as described below with reference to FIGS. 5R-5EE. Further, in some embodiments, the first and second pivots 516 and 518 are optionally moveable to different locations corresponding to different times of the sequence of notes, adjusting the selected time interval based on movement of the pivots without stretching the selected notes, as described below with reference to FIGS. 5FF-5KK.

FIGS. 5E-5Q illustrate a brush pattern tool in accordance with some embodiments. FIG. 5E illustrates selection of the "Store Brush" button 520. In response to the selection, the selected note event objects 506-1, 506-2, and 506-3 are stored in association with the brush pattern tool, allowing the stored notes to be inserted into the sequence of notes in response to a dragging input. Further, the selected note event objects 506-1, 506-2, and 506-3 are optionally stored in association with an offset determined based on a difference between a note initiation time (e.g., a "note-on" time) of an earliest note of the selected notes (e.g., note 506-1 in FIG. 5E) and the beginning of the selected time interval. For example, in FIG. 5E, there is one beat between the beginning of the selected time interval and the start of the note 506-1, and the selected pattern of notes 506-1, 506-2, and 506-3 is thereby optionally stored with an offset of one beat.

In some embodiments, a visual characteristic of the cursor 508 is changed to indicate that one or more note event objects are stored in association with the brush pattern tool. For example, FIG. 5F illustrates a color of the cursor changing to black, indicating that the notes 506-1, 506-2, and 506-3 are stored in association with the brush pattern tool.

FIGS. 5G-5J illustrate insertion of the stored note event objects in response to a dragging input with the cursor 508. FIG. 5G illustrates an initiation of the dragging input at the third beat of measure 3, and FIG. 5H illustrates the insertion of notes 506-6 (corresponding to stored note 506-1) and 506-7 (corresponding to stored note 506-2). The note 506-6 is inserted not at the third beat of measure 3 (the location of the initiation of the dragging input), but instead at the fourth beat of measure 3 (e.g., offset by one beat). Further, the relationships between the notes with respect to the pitch and time axes are preserved as the stored notes are inserted. As the dragging input continues in FIGS. 5I and 5J, additional notes 506-8 (corresponding to stored note 506-3), 506-9 (corresponding to stored note 506-1), and 506-10 (corresponding to stored note 506-2) are inserted. If the dragging input traverses a distance shorter than the originally selected time interval, then only a portion of the stored notes are inserted, as illustrated in FIG. 5H. In contrast, if the dragging input traverses a distance longer than the originally selected time interval, then the pattern of stored notes is at least partially repeated, as illustrated in FIG. 5J. In some embodiments, a dragging input may cause notes to be inserted the overlap existing notes. In such a case, the notes are optionally merged or the notes are optionally inserted as overlapping the existing notes.

In some embodiments, the inserted notes are optionally transposed based on a starting location of the dragging input inserting the notes, as illustrated in FIGS. 5K-5L. For example, the first note in the stored pattern is a C, but the dragging input begins in FIG. 5K at an E along the pitch axis. The interval from C to E is 4 semitones. Accordingly, FIG. 5L illustrates inserted notes 506-11, 506-12, and 506-13, corresponding to notes 506-1, 506-2, and 506-3, respectively, but transposed up 4 semitones. Note 506-11 been transposed from C to E, note 506-12 has been transposed from A to C#, and note 506-13 has been transposed from F to A.

Figure 5S:
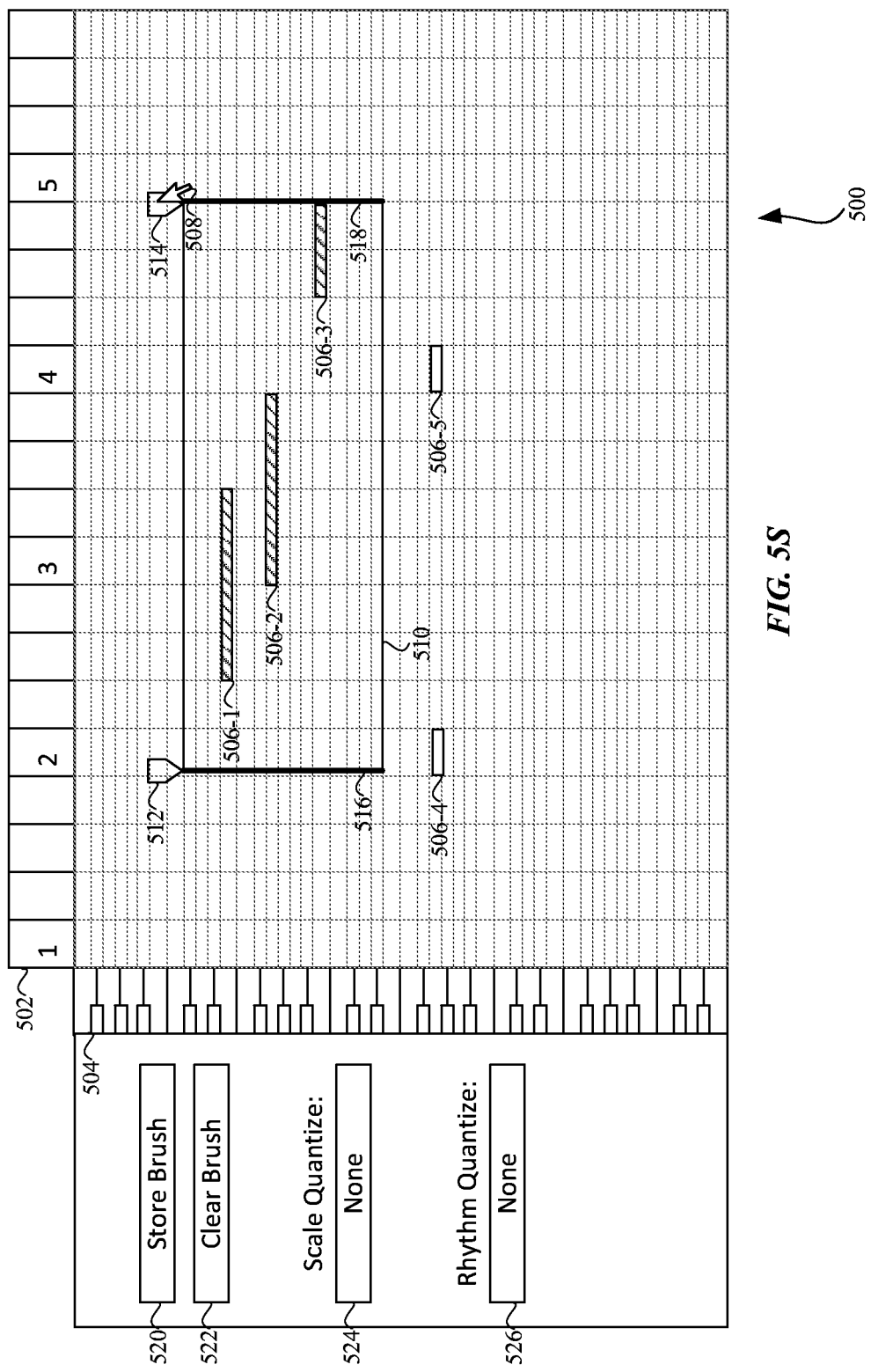

In some embodiments, the inserted notes are optionally transposed further based on a selected scale using a "Scale Quantize" selector 524. FIG. 5M illustrates selection of a C Major scale, and FIGS. 5N-5O illustrate inserting notes 506-14, 506-15, and 506-16. In FIG. 5O, the notes have again been transposed up based on the 4 semitone difference between C and E (in response to the initiation of the dragging input at an E along the pitch axis, as illustrated in FIG. 5P). However, any notes that are not in the selected scale are instead transposed to match a corresponding pitch in the selected scale. For example, because the note C# is not in the C Major scale, a C note 506-15 is inserted instead.

In some embodiments, a visual characteristic of the cursor 508 is optionally changed to indicate that notes stored in association with the brush pattern tool have been cleared from storage. For example, FIG. 5P illustrates selection of the "Clear Brush" button 522, and FIG. 5Q illustrates the cursor 508 having a white color indicating that no notes are stored in association with the brush pattern tool.

FIGS. 5R-5RR illustrate a time stretch tool in accordance with some embodiments. In FIG. 5R, a dragging input is initiated on the second border 514, and the second border is dragged to the right in FIG. 5S, expanding the selected time interval and the selected notes, and to the left in FIG. 5T, contracting the selected time interval and the selected notes.

Based on the dragging input, the note initiation time and the note duration of each selected note is adjusted. For example, the dragging input causes the length of the selected time interval to double between FIG. 5R and FIG. 5S. In response, the duration of each of the selected notes 506-1, 506-2, and 506-3 is doubled, and the time between the note initiation time of each selected note and the start of the selected time interval is also doubled.

Figure 5T:
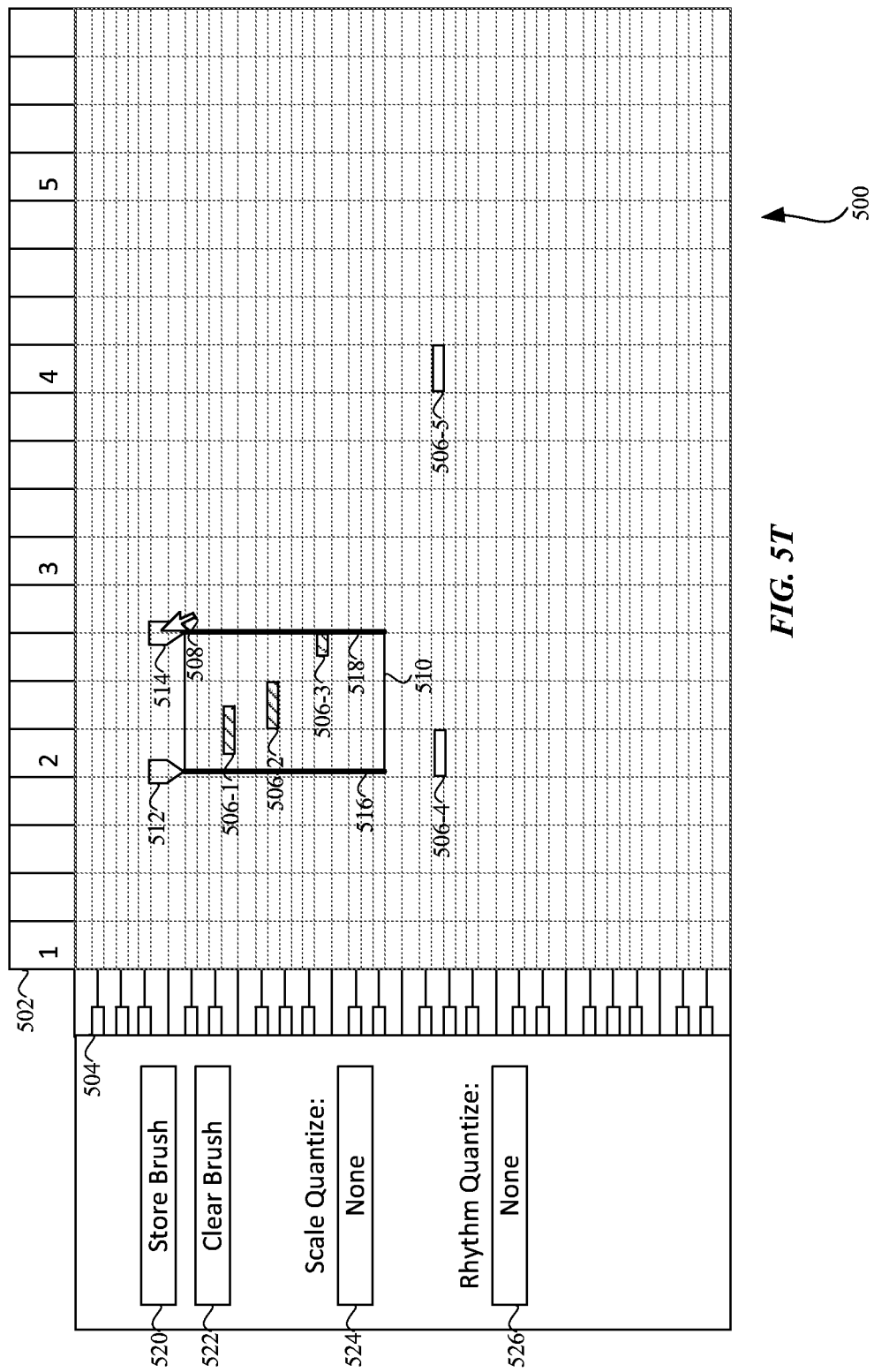

Similarly, the dragging input causes the length of the selected time interval to be halved between FIG. 5R and FIG. 5T. In response, the duration of each of the selected notes 506-1, 506-2, and 506-3 is halved, and the time between the note initiation time of each selected note and the start of the selected time interval is also halved.

Figure 5U:
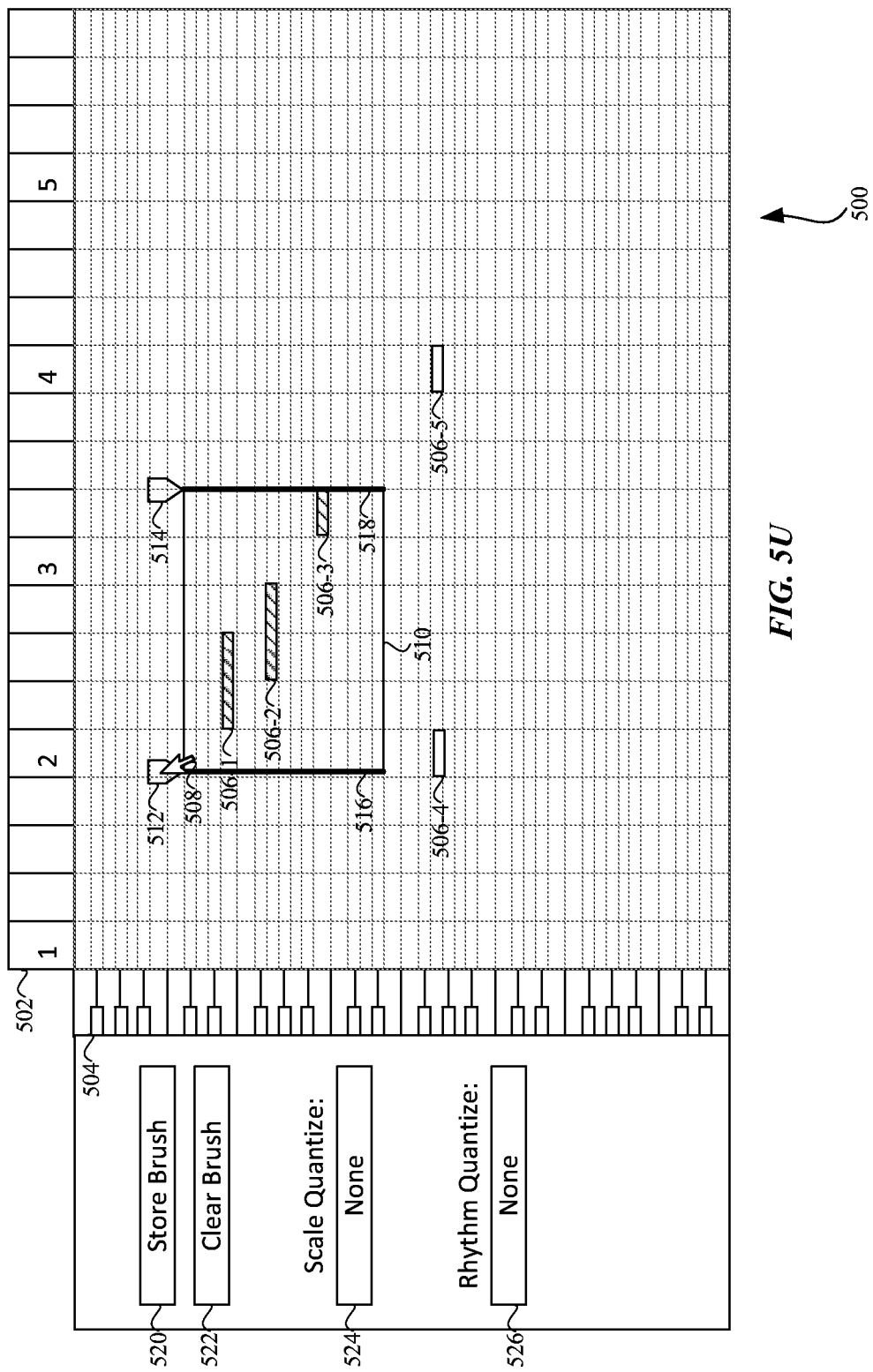
Figure 5V:
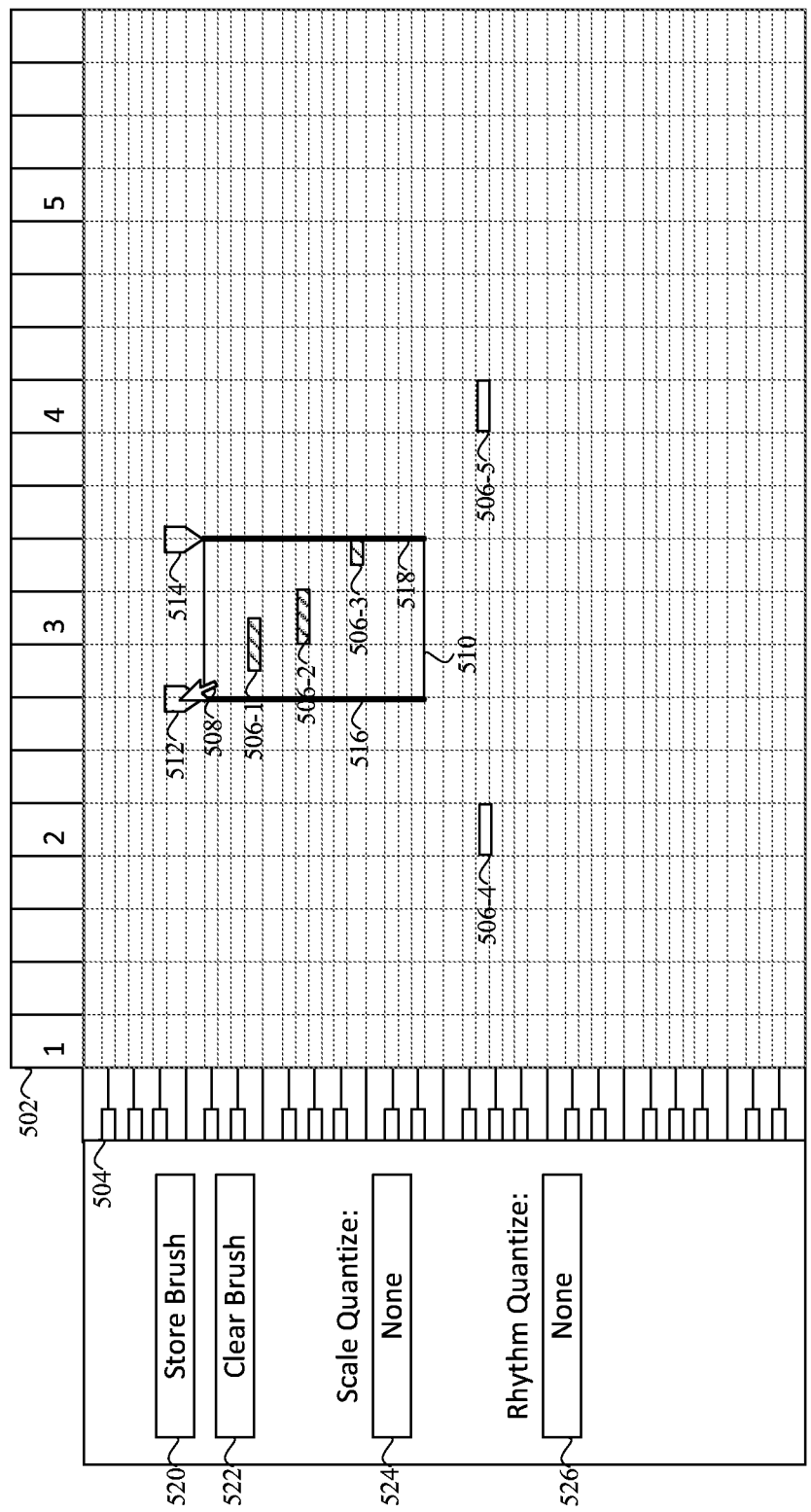
Figure 5W:
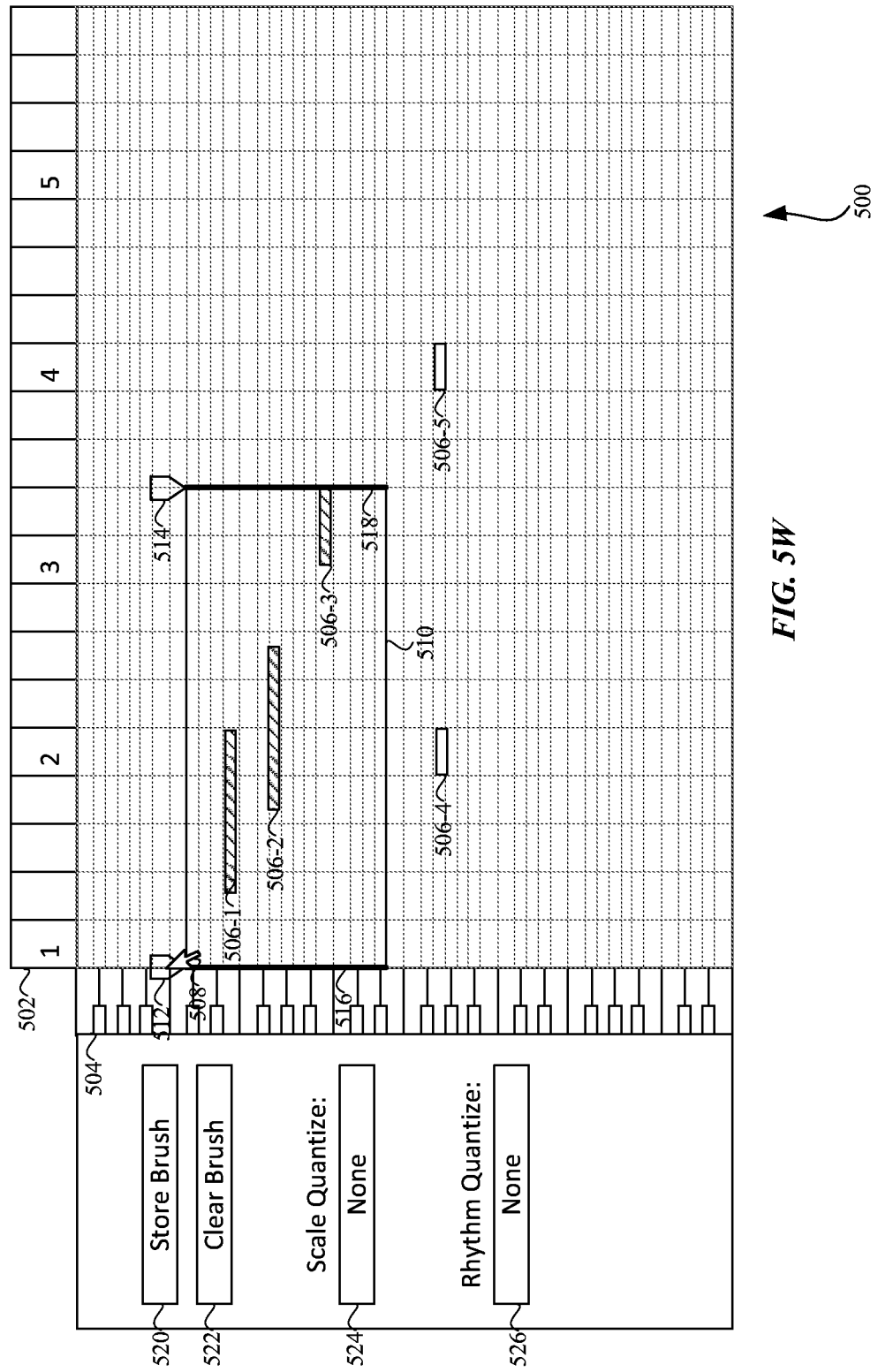

FIGS. 5U-5W illustrate a similar time stretching of the selected notes 506-1, 506-2, and 506-3 in response to dragging input of the first border 512. In FIG. 5U, a dragging input is initiated on the first border 512, and the first border is dragged to the right in FIG. 5V, contracting the selected time interval and the selected notes, and to the left in FIG. 5W, expanding the selected time interval and the selected notes.

Figure 5X:
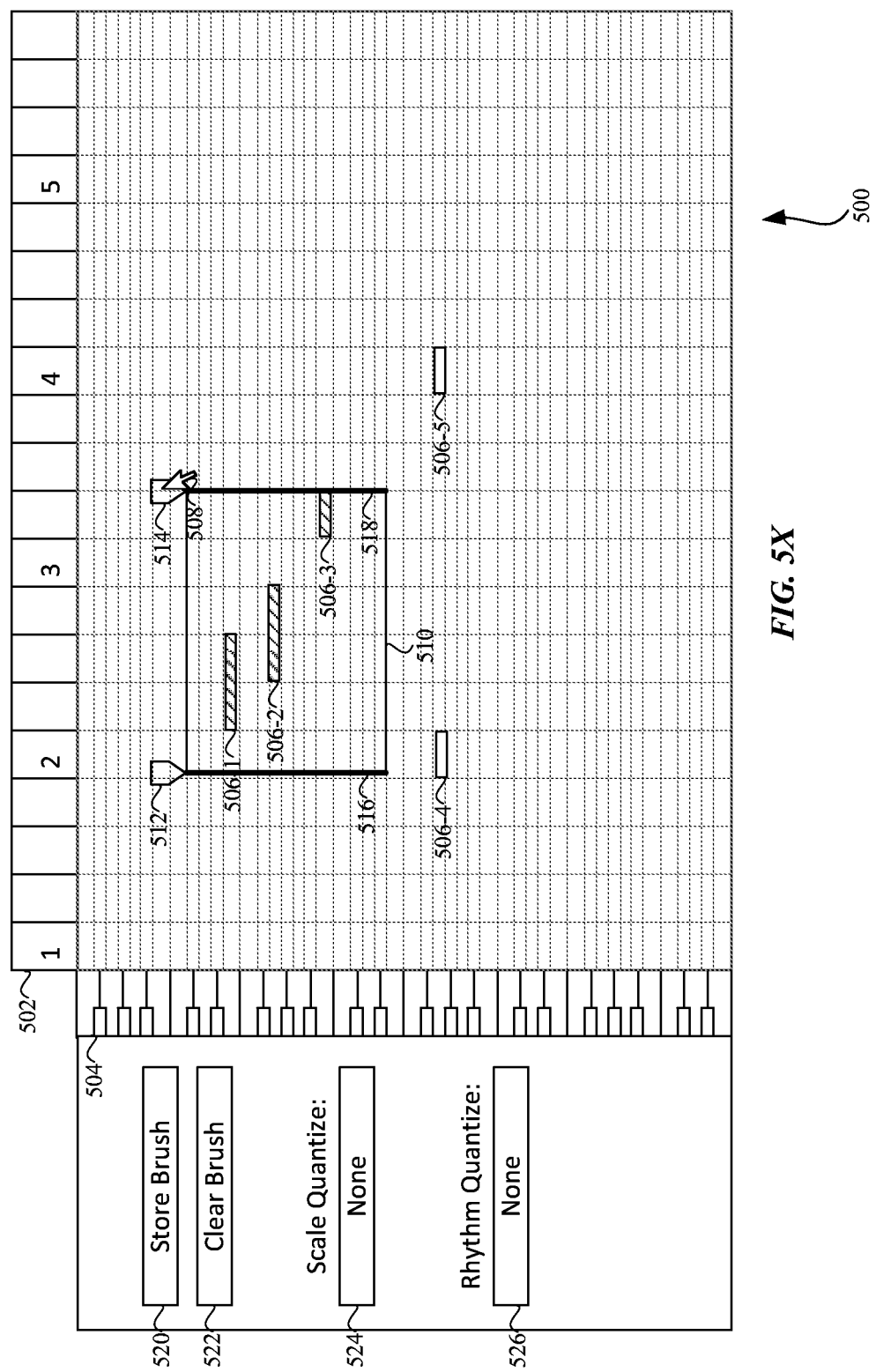
Figure 5Y:
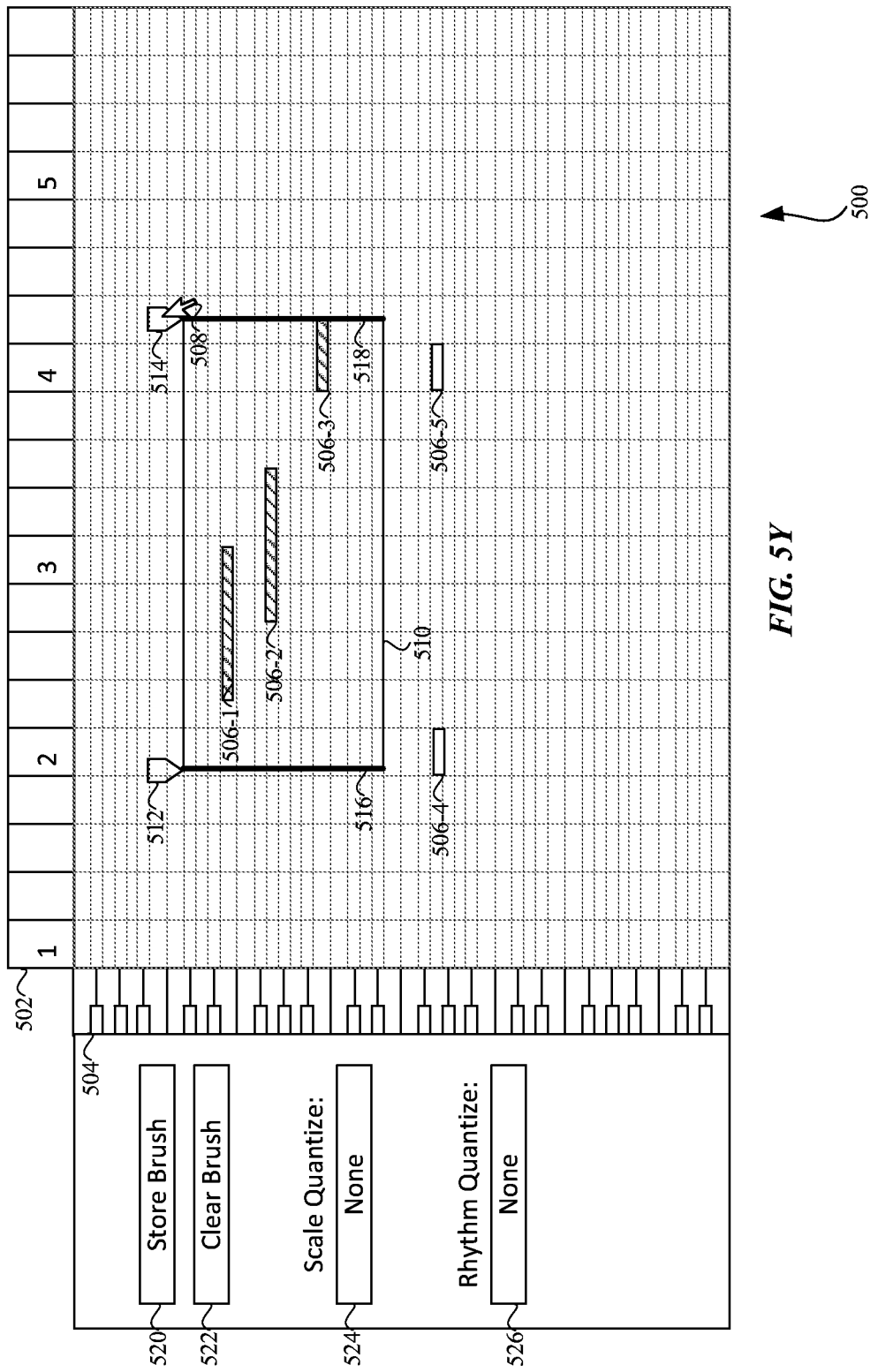
Figure 5Z:
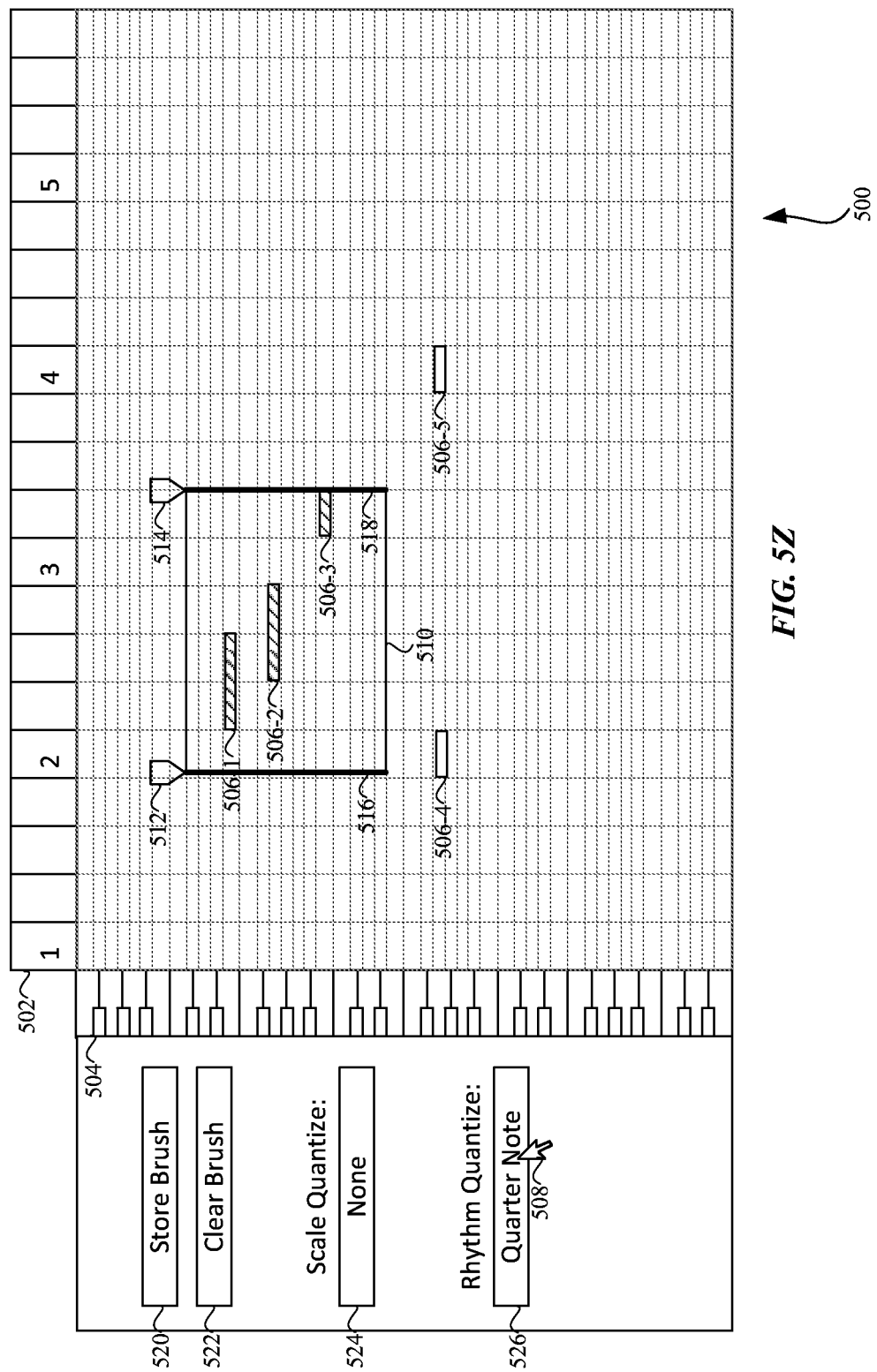
Figure 5A:
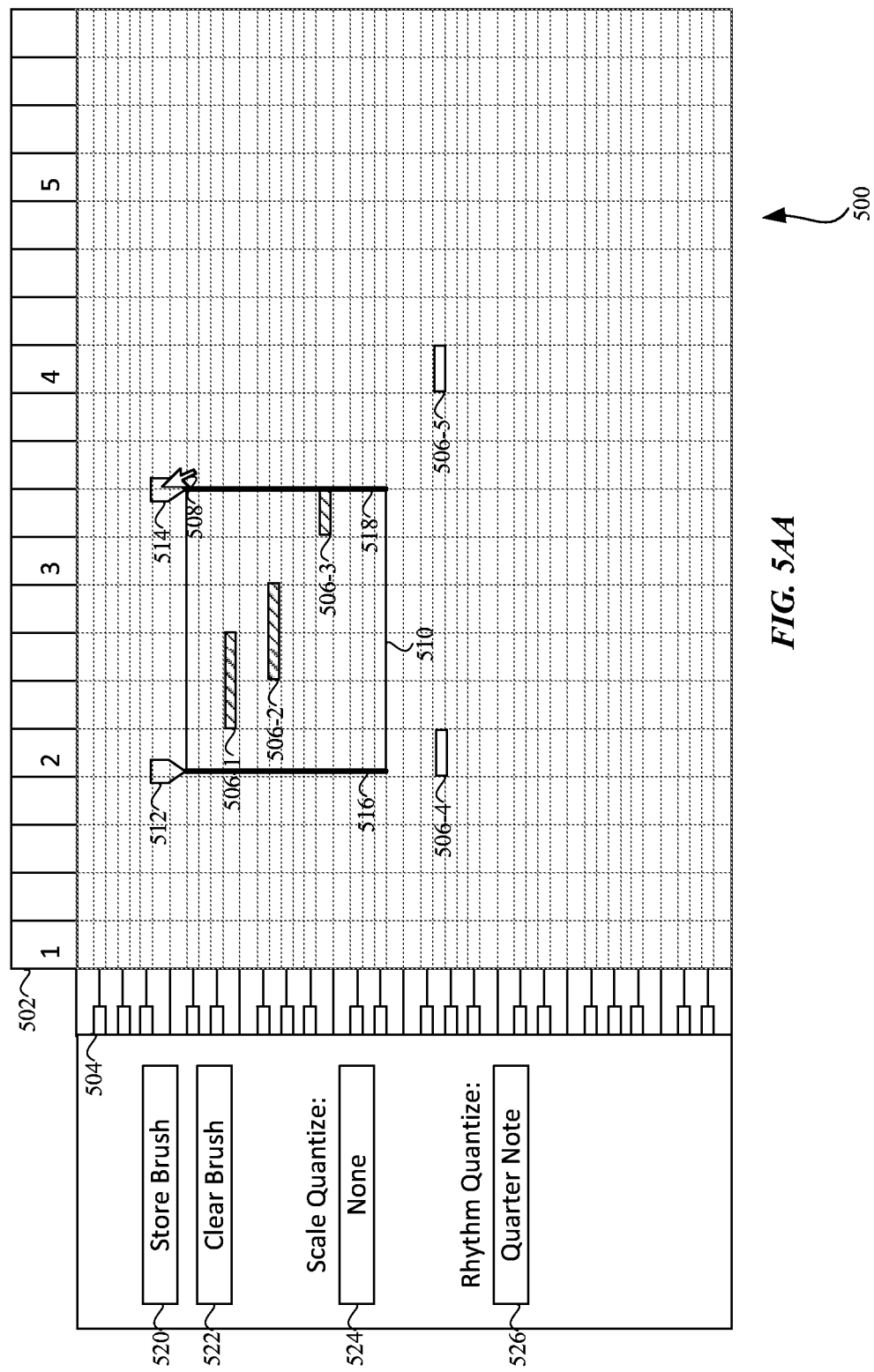
Figure 5B:
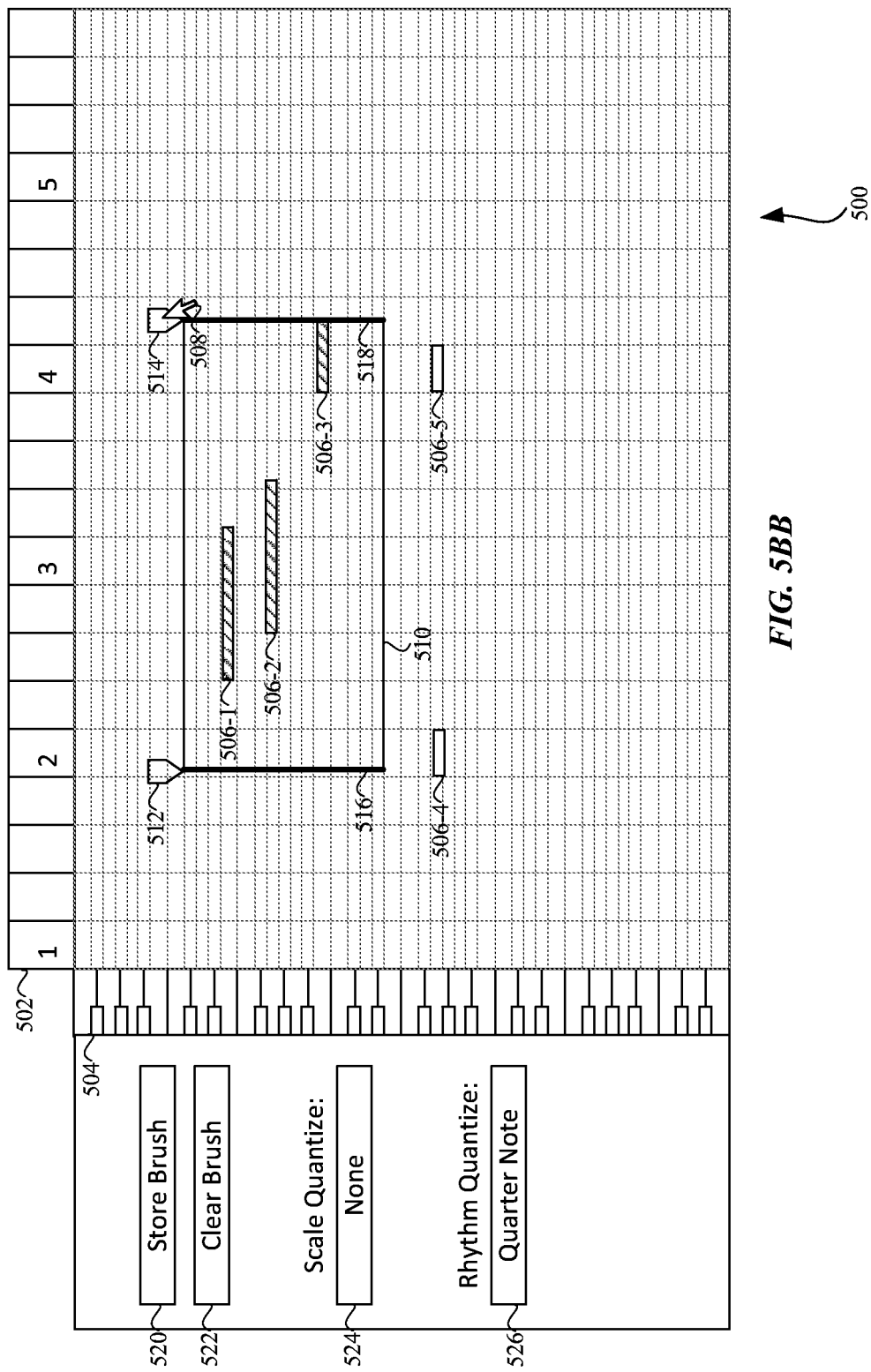
Figure 5C:
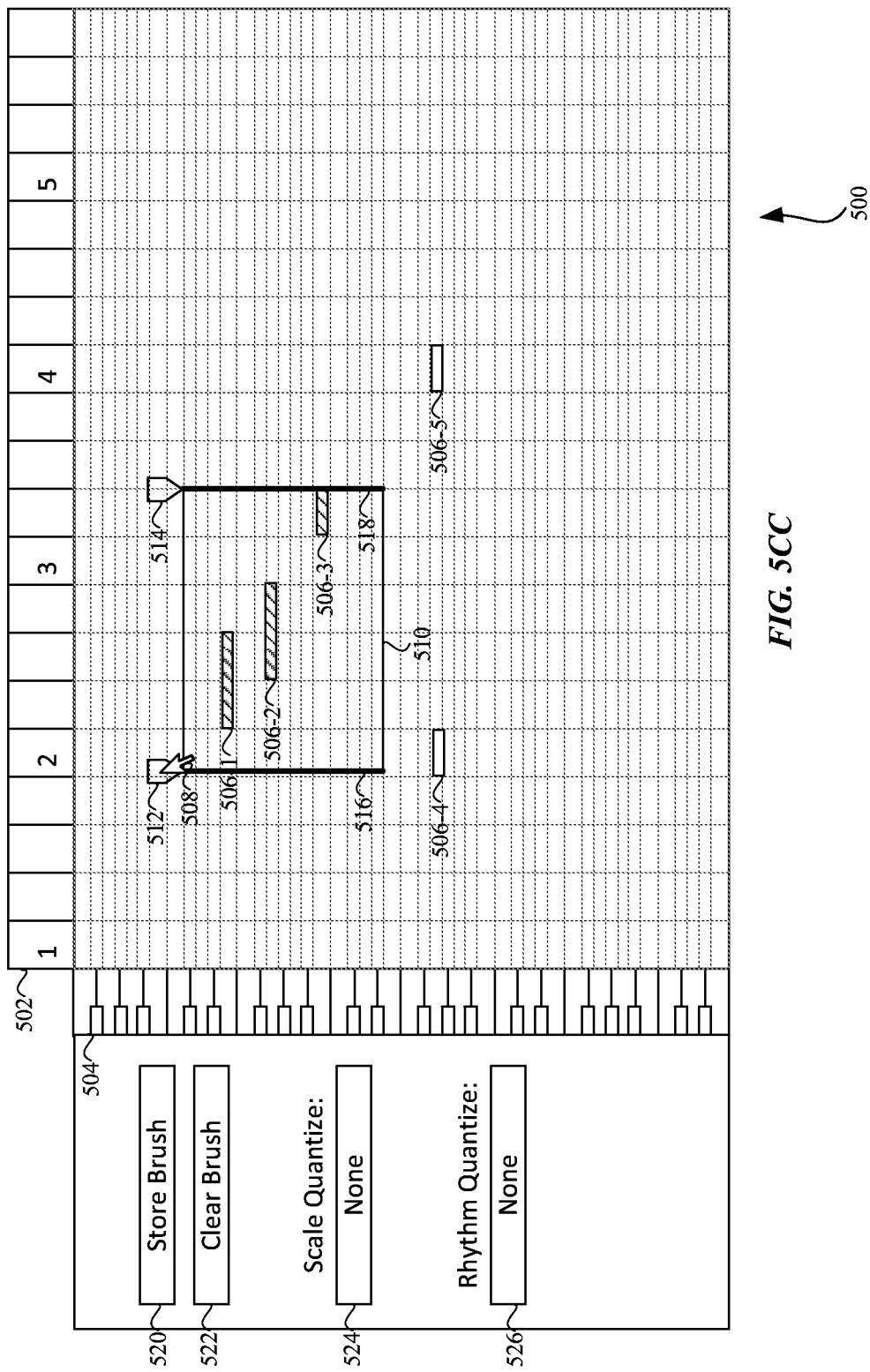
Figure 5D:
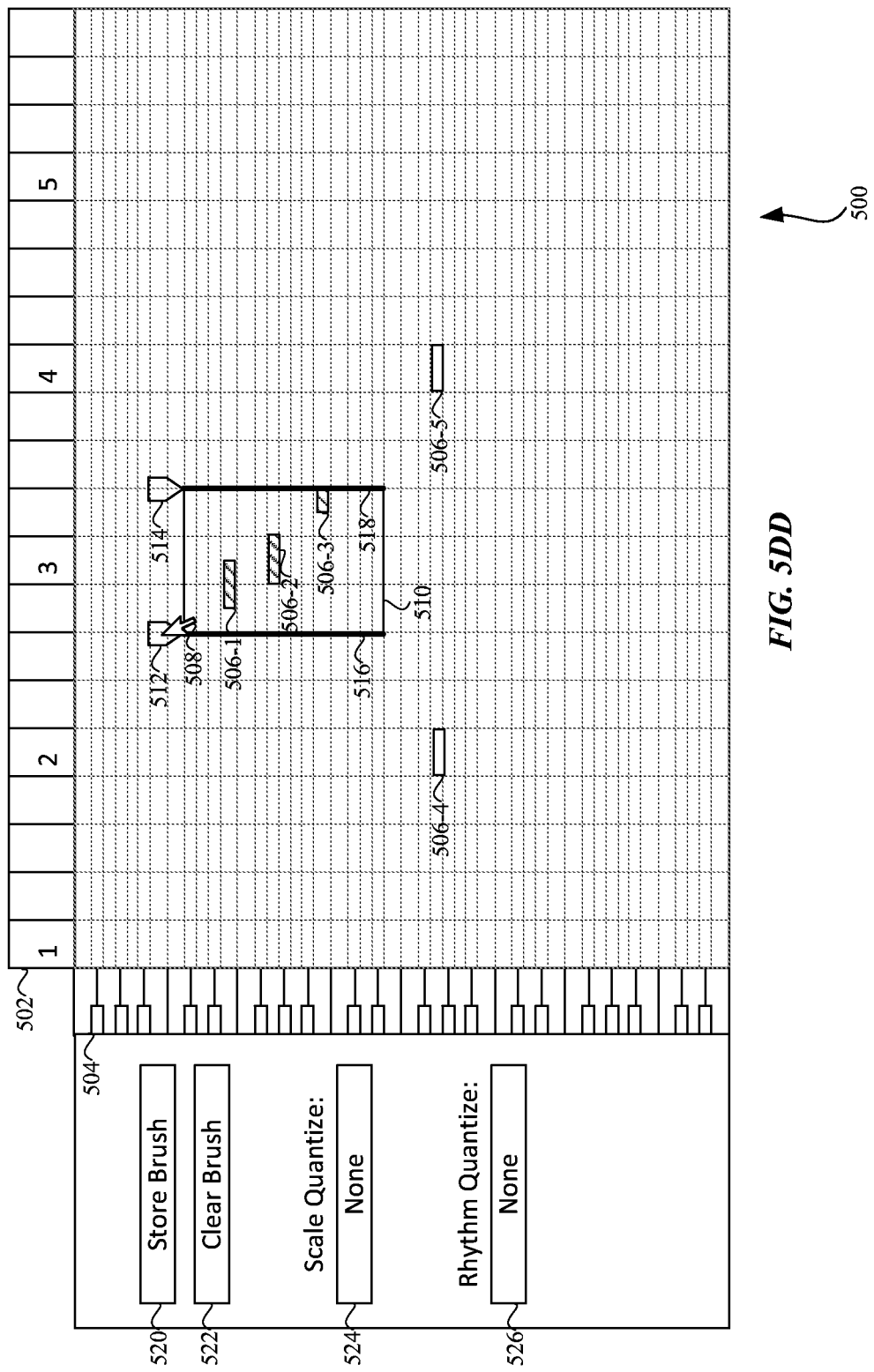
Figure 5E:
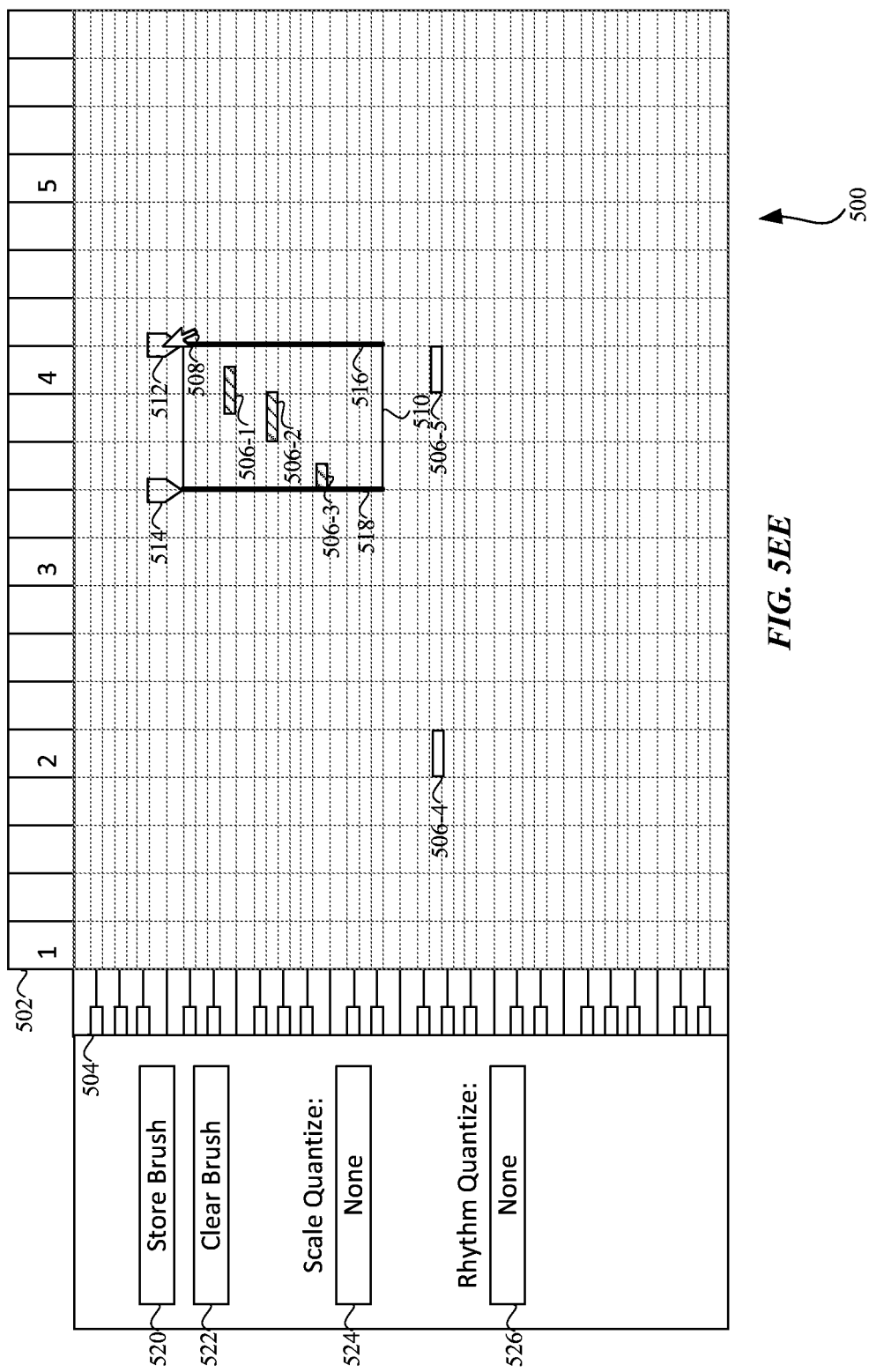
Figure 5F:
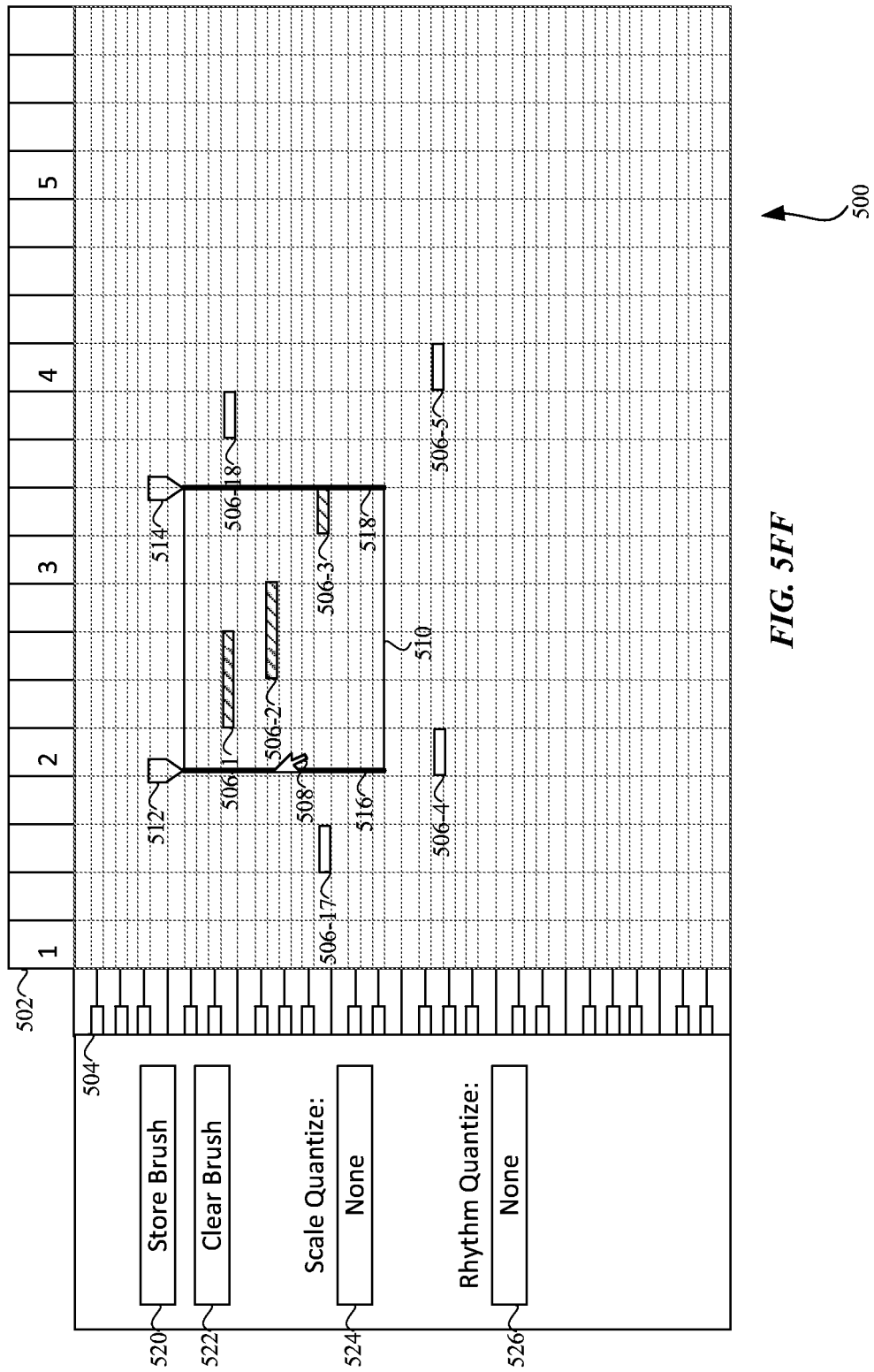
Figure 5G:
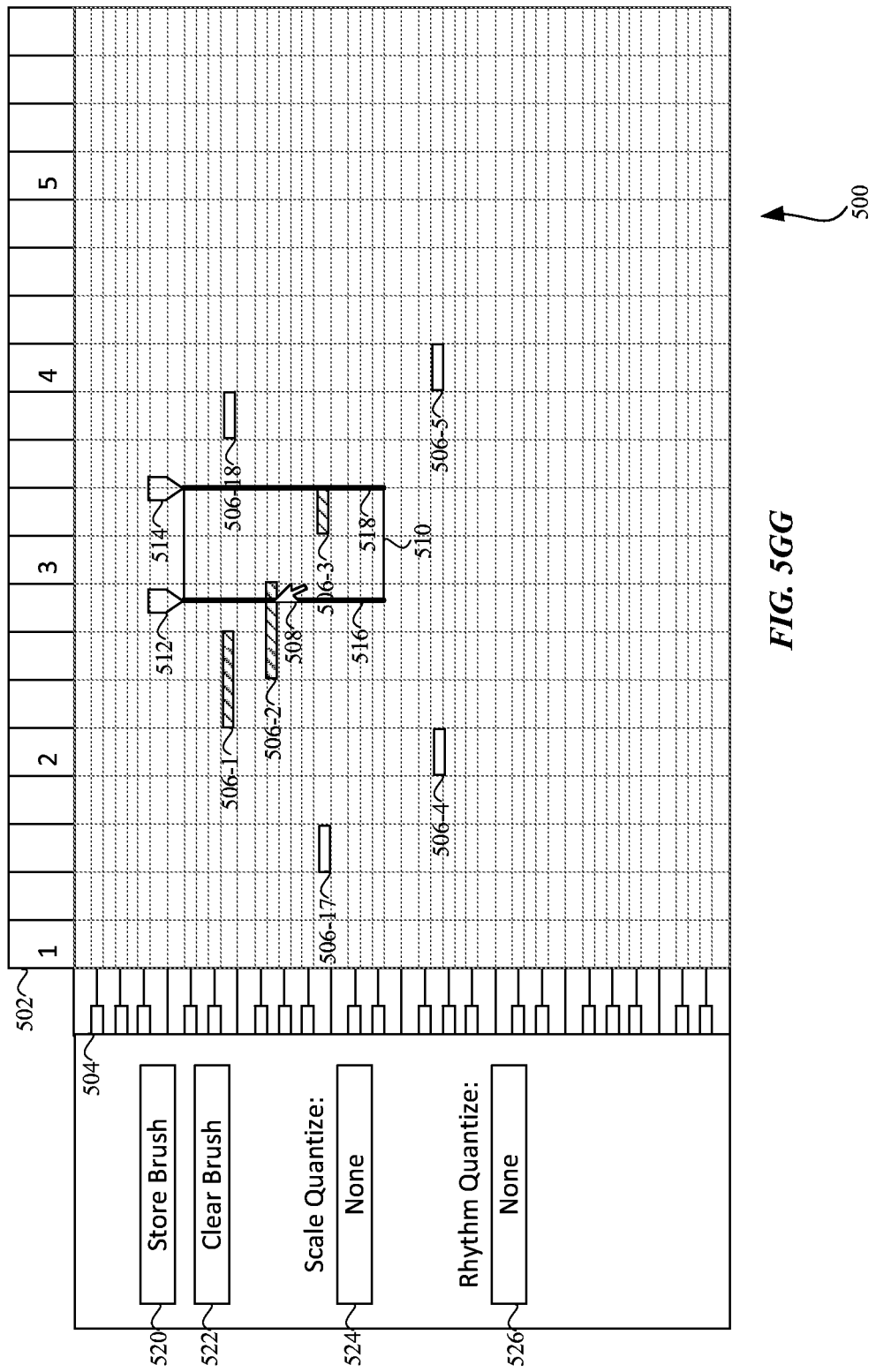
Figure 5H:
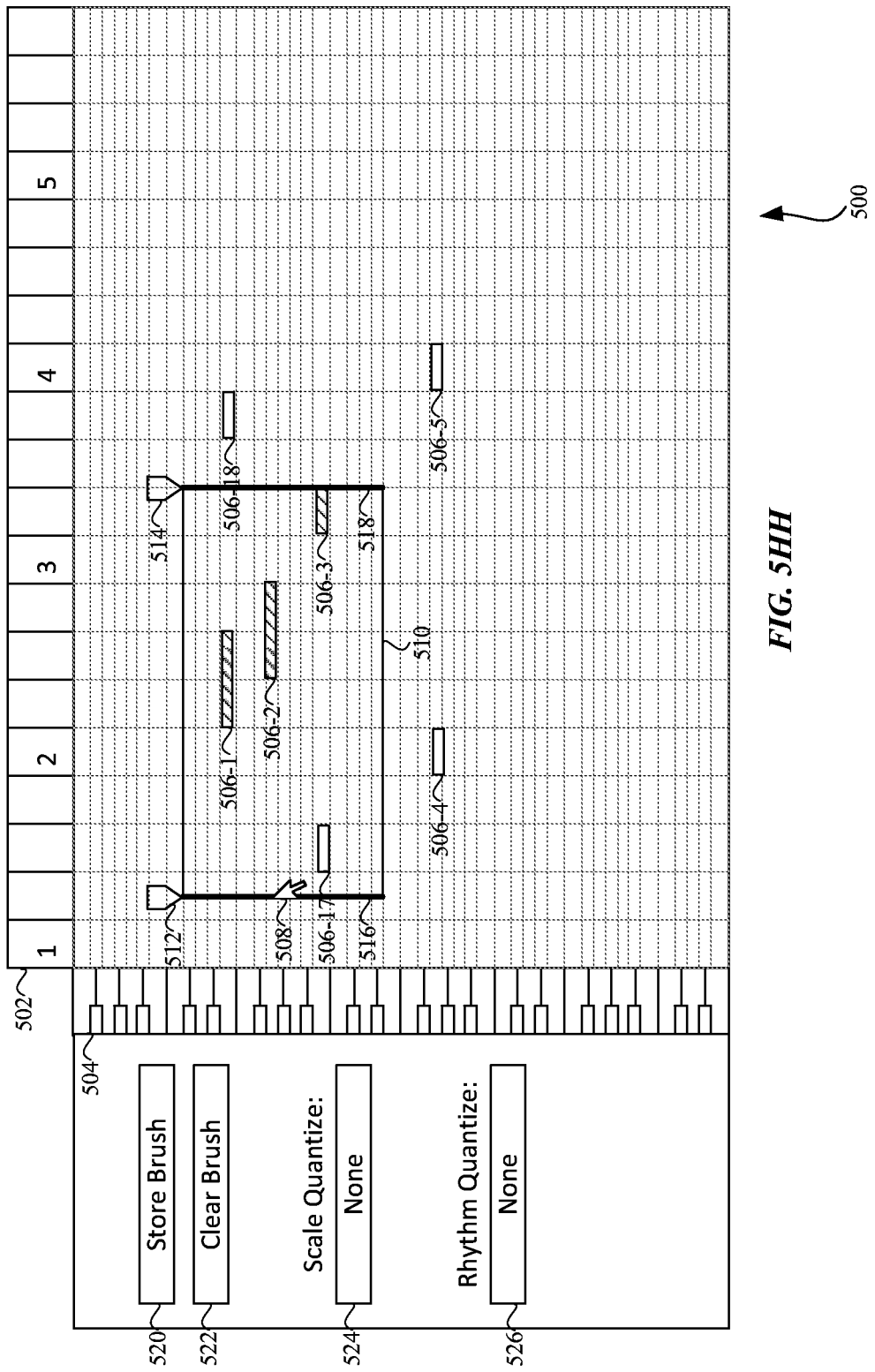
Figure 5I:
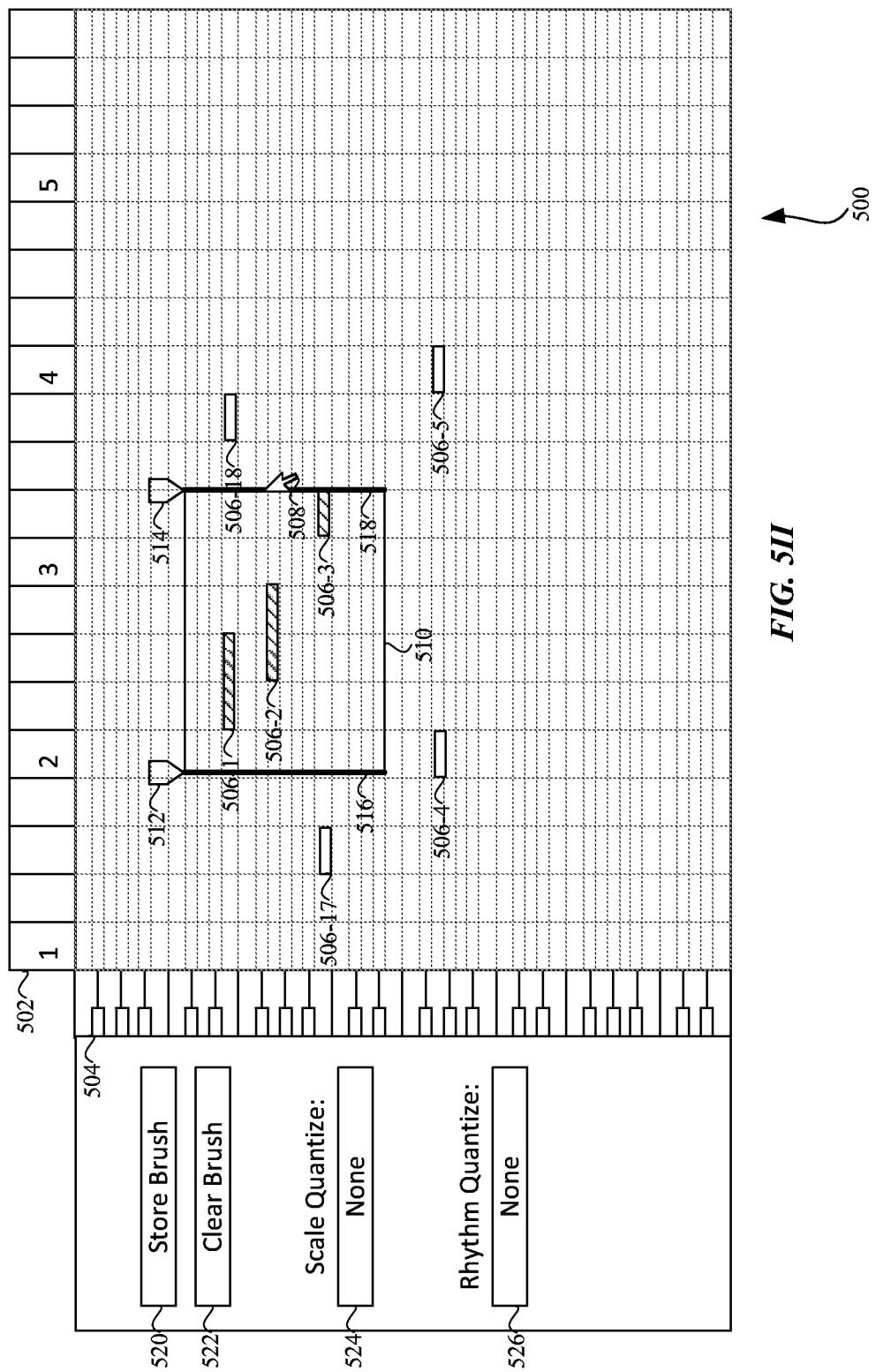
Figure 5J:
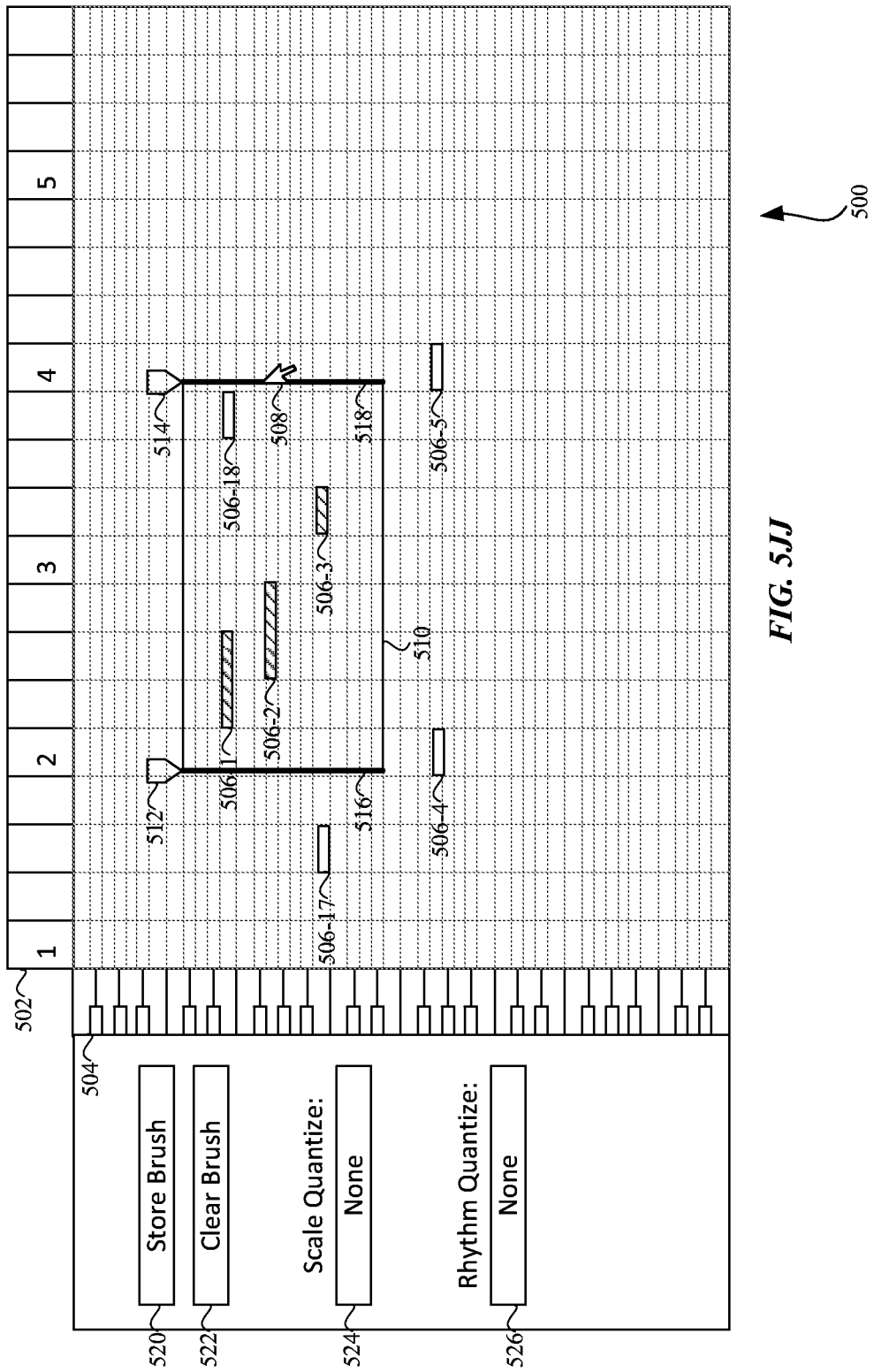
Figure 5K:
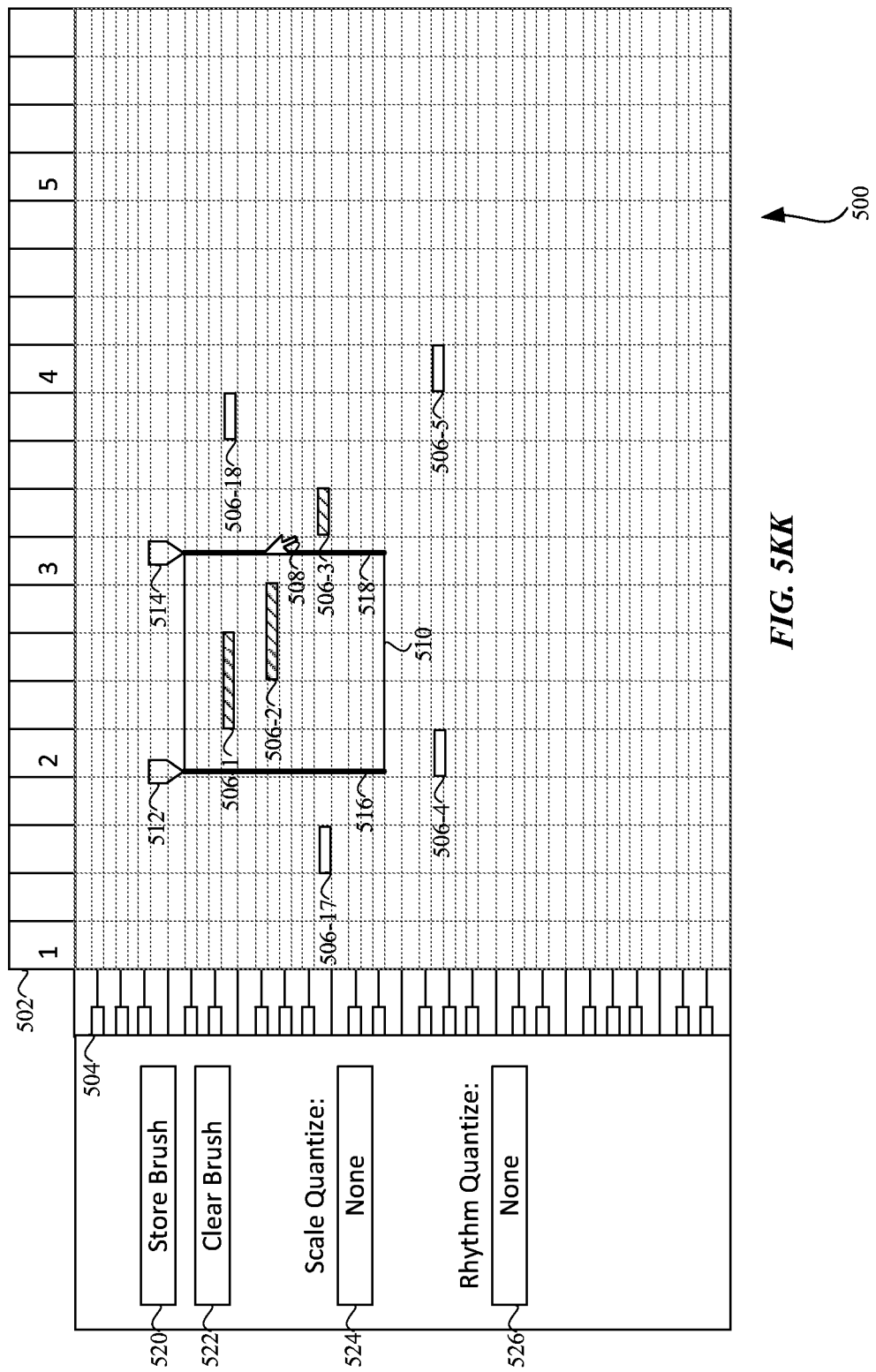
Figure 5L:
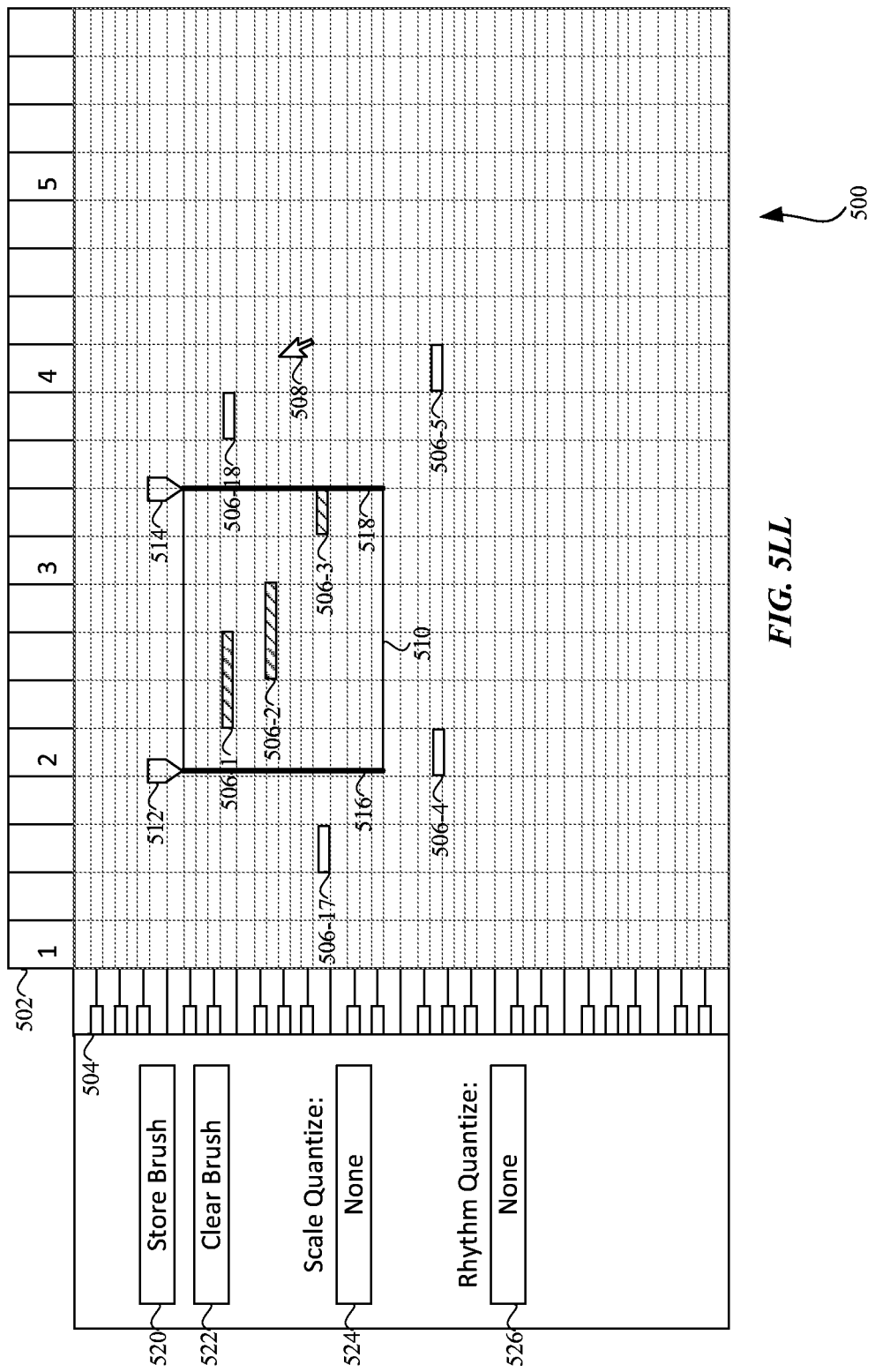
Figure 5M:
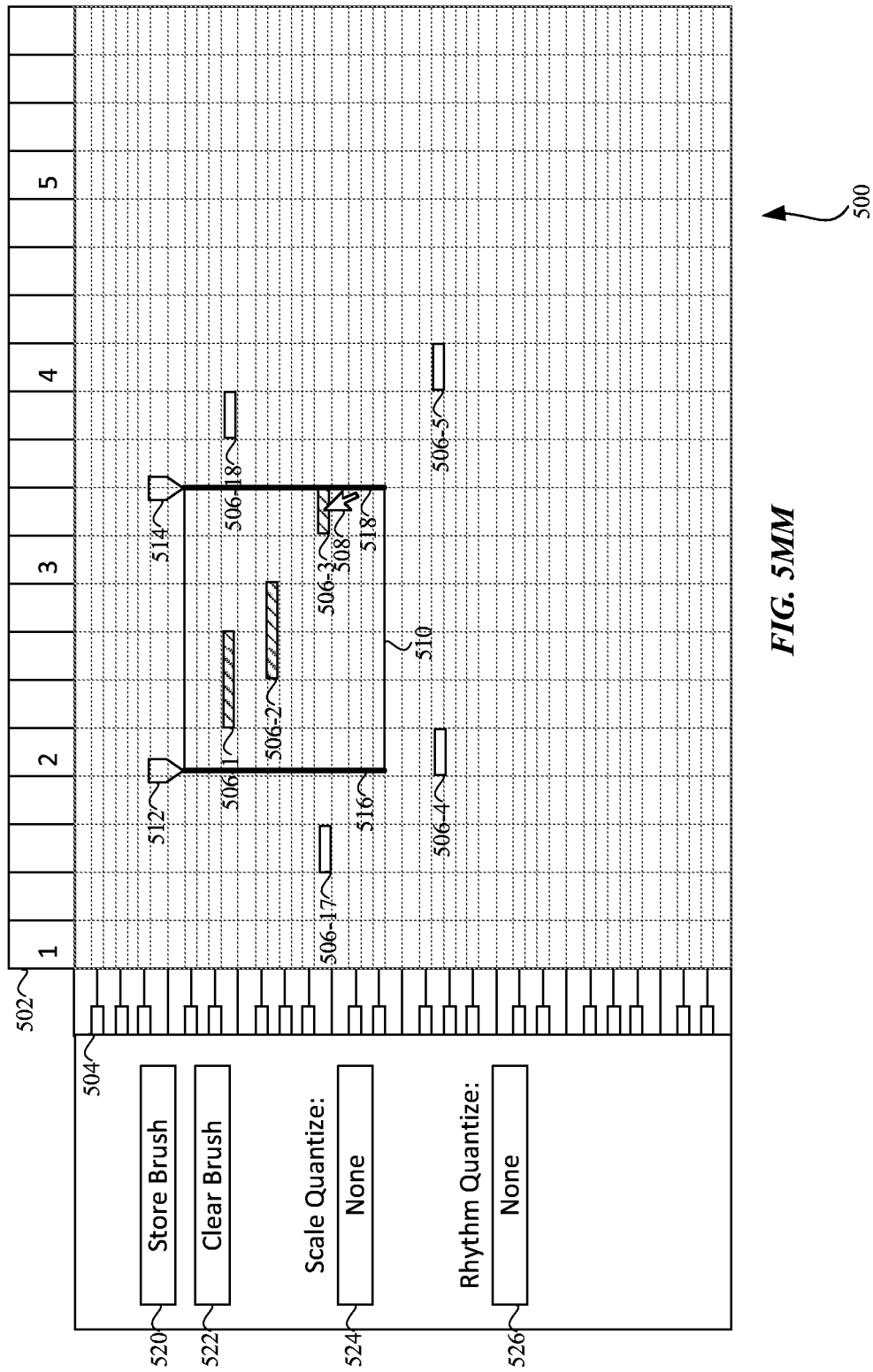
Figure 5N:
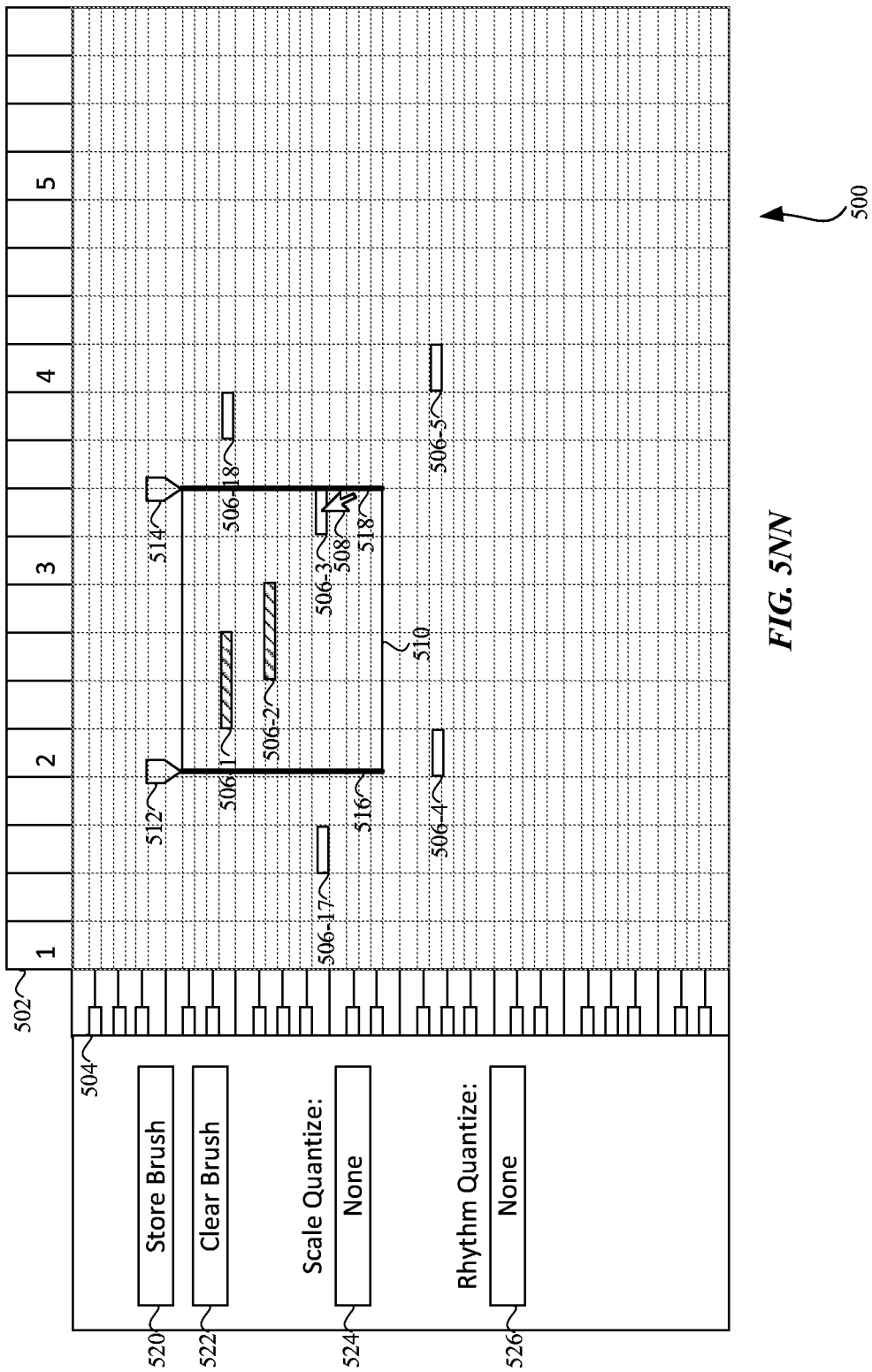
Figure 5O:
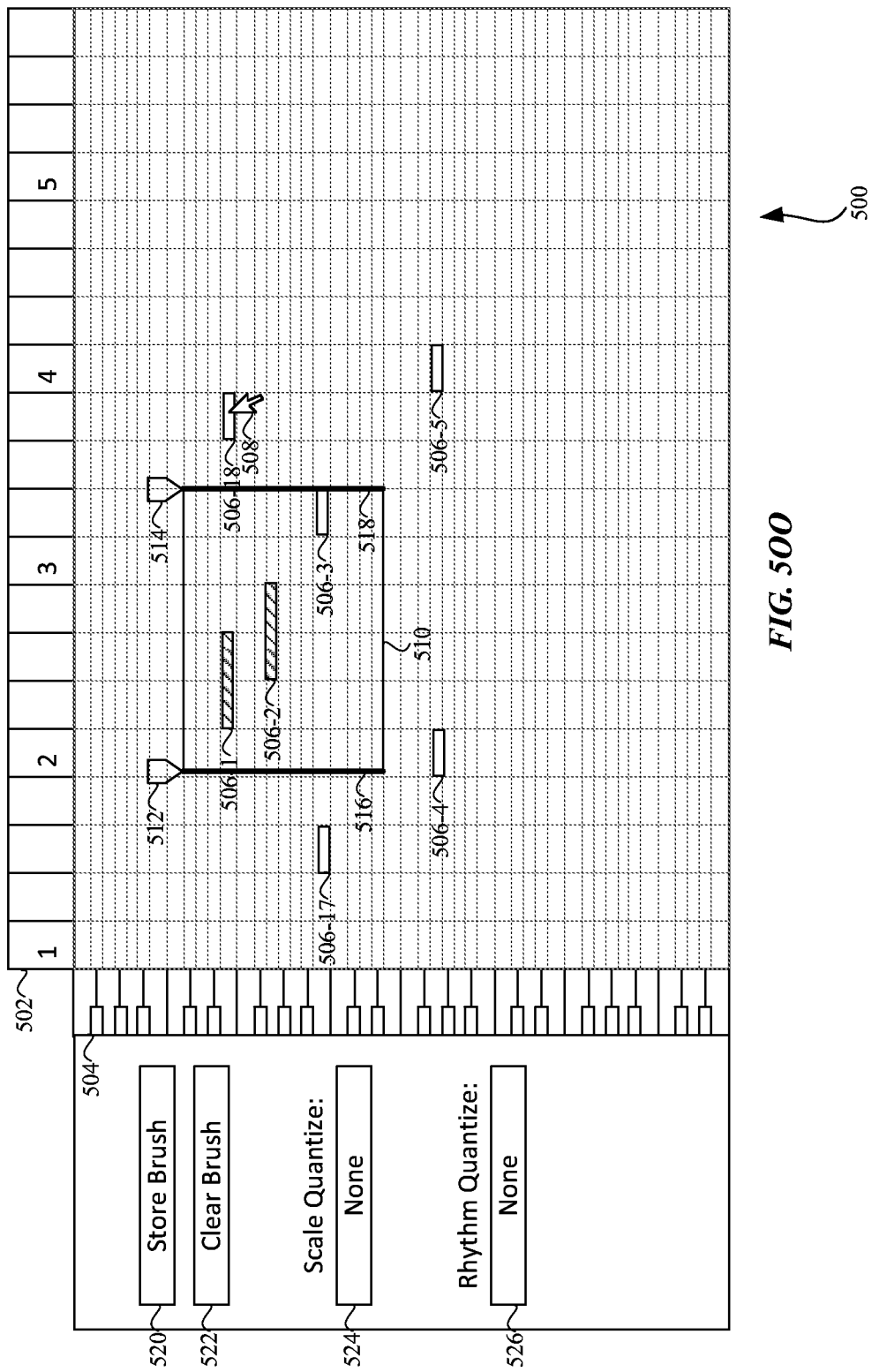
Figure 5P:
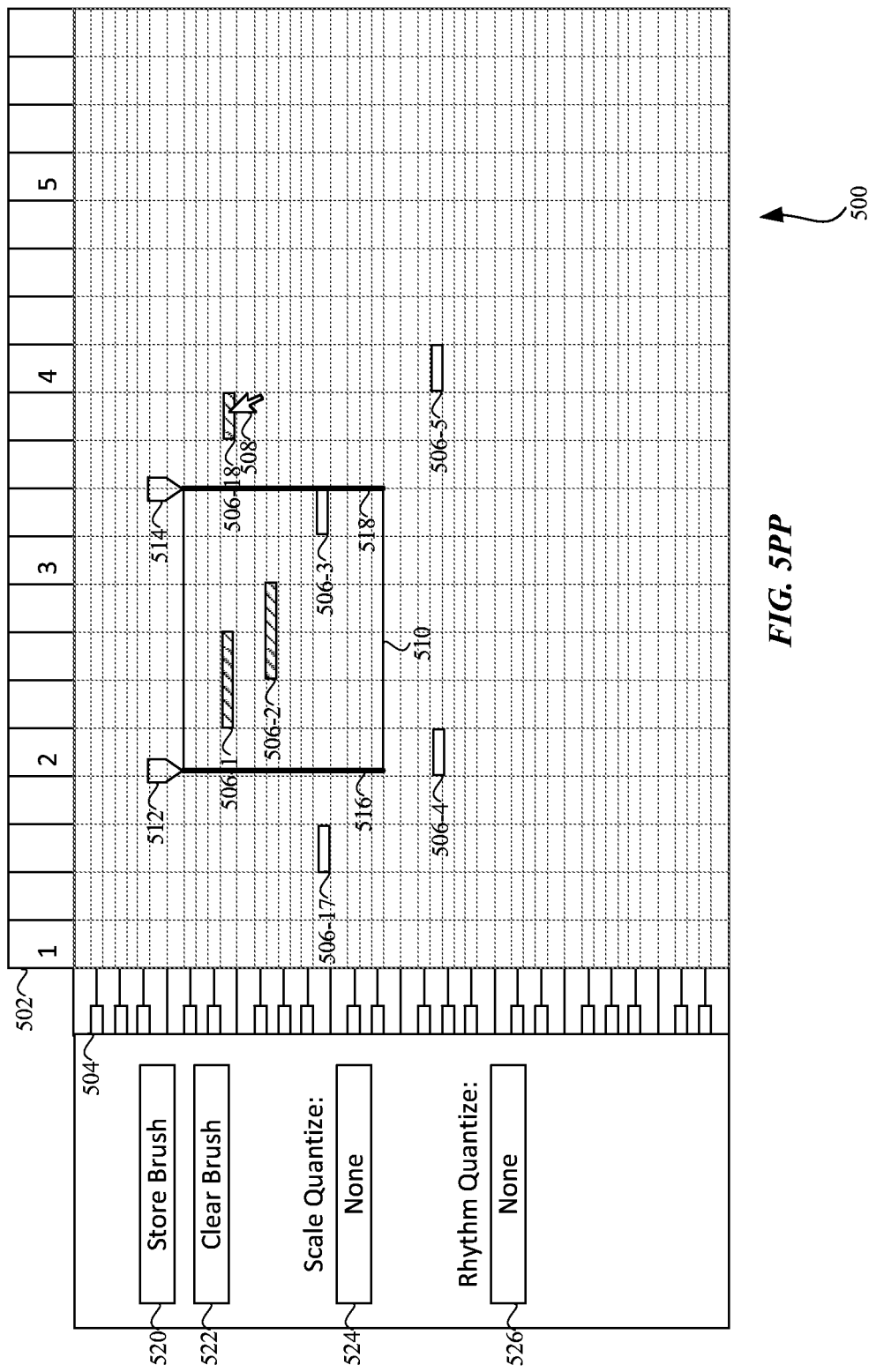
Figure 5Q:
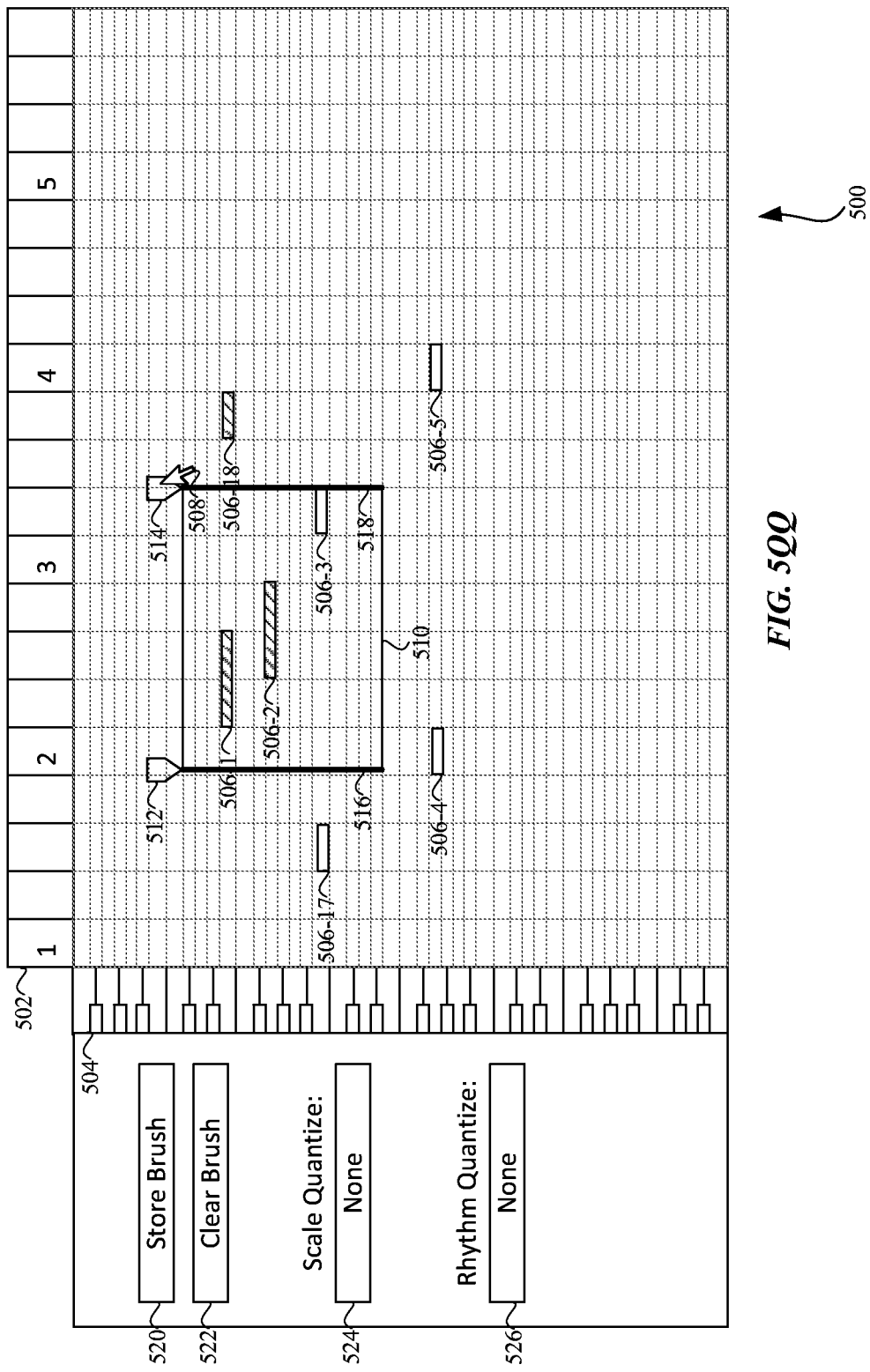
Figure 5R:
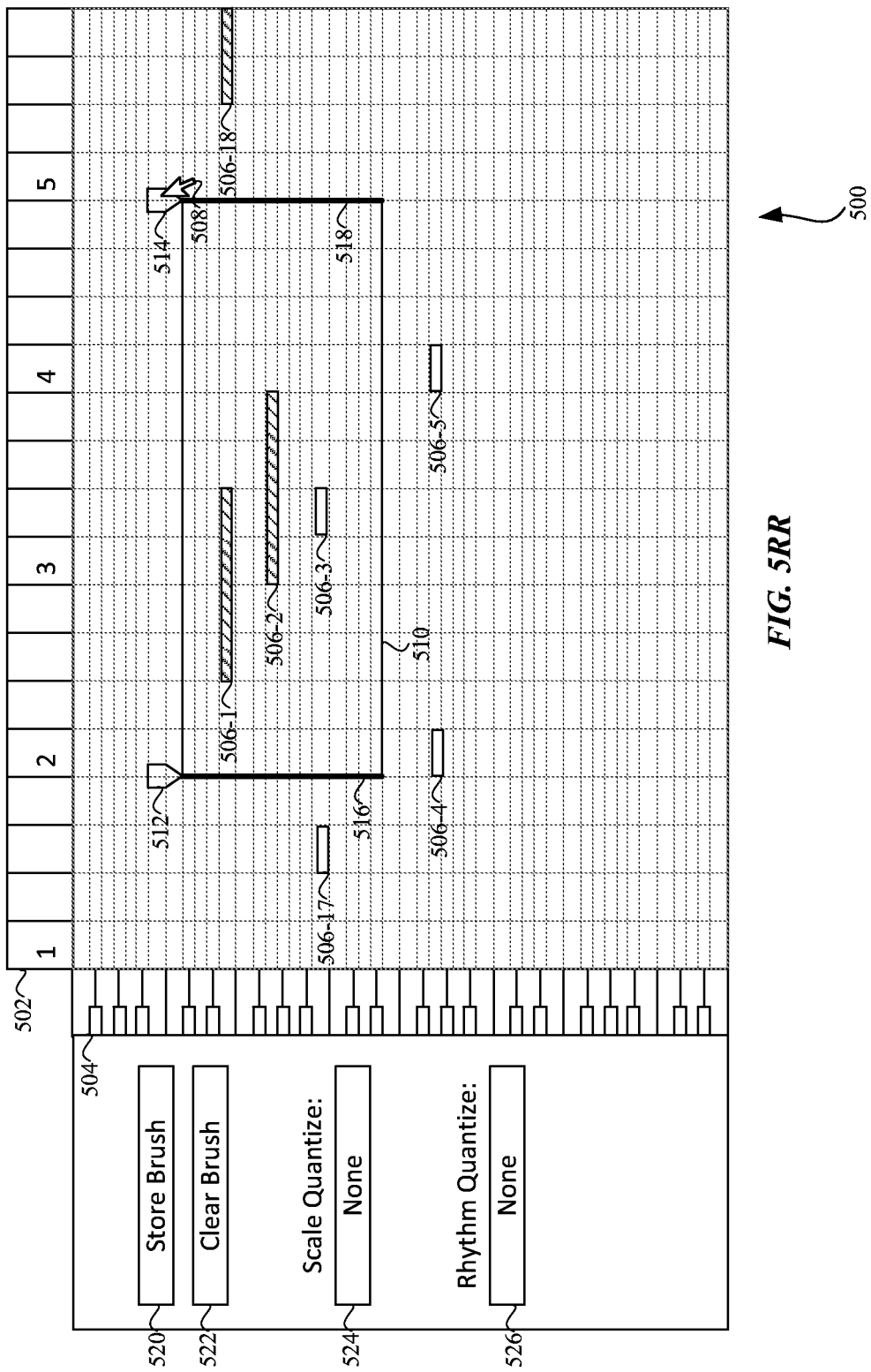

In some embodiments, the note initiation times of the selected notes are further adjusted based on a selected rhythm quantize value selected using the "Rhythm Quantize" selector 526. FIGS. 5X-5Y illustrate time stretching of notes 506-1, 506-2, and 506-3 without a selected rhythm quantize value, whereas FIGS. 5AA-5BB illustrate time stretching of notes 506-1, 506-2, and 506-3 with a quarter note rhythm quantize value (selected using the "Rhythm Quantize" selector 526 illustrated in FIG. 5Z).

For example, in FIG. 5Y, after time stretching without rhythm quantize, note 506-1 has a note initiation time that falls between the second and third beats of measure 2, and note 506-2 has a note initiation time that falls between the fourth beat of measure 2 and the first beat of measure 3. In contrast, in FIG. 5BB, after time stretching with a quarter note rhythm quantize value, the notes 506-1 and 506-2 are instead snapped to the nearest quarter note value: note 506-1 has been snapped to the third beat of the second measure, and note 506-2 has been snapped to the fourth beat of the second measure.

FIGS. 5CC-5EE illustrate using the time stretch tool to reverse the order of the selected notes 506-1, 506-2, and 506-3. The dragging input is initiated on the first border 512 in FIG. 5CC. FIG. 5DD illustrates the first border 512 dragged to the right, contracting the selected time interval and the selected notes 506-1, 506-2, and 506-3. As the first border 512 is dragged past the second border 514, the selected notes are reversed along the time axis, as illustrated in FIG. 5EE.

FIGS. 5FF-5KK illustrate dragging inputs on the first and second pivots 516 and 518, adjusting the start and end of the selected time interval without stretching any of the selected notes. In FIG. 5FF, a dragging input is initiated on the first pivot 516, and the first pivot is dragged to the right in FIG. 5GG, contracting the selected time interval without contracting the selected notes, and to the left in FIG. 5HH, expanding the selected time interval without expanding the selected notes. In FIG. 5II, a dragging input is initiated on the second pivot 518, and the second pivot is dragged to the right in FIG. 5JJ, expanding the selected time interval without expanding the selected notes, and to the left in FIG. 5KK, contracting the selected time interval without contracting the selected notes.

Although FIGS. 5FF-5KK illustrate changing the selected time interval without changing which notes are selected, in some embodiments adjusting the selected time interval using the pivots optionally causes one or more additional notes to be selected and/or one or more of the selected notes to be de-selected. For example, in some embodiments, changing the time interval to include note 506-18 in FIG. 5JJ optionally causes the note 506-18 to be selected, and changing the time interval to exclude note 506-3 in FIG. 5KK optionally causes the note 506-3 to be de-selected.

In some embodiments, one or more notes may be selected outside the selection area and/or one or more notes may be de-selected within the selection area interval, all while maintaining the selected time interval itself, as illustrated in FIGS. 5LL-5RR. For example, FIG. 5LL illustrates selected notes 506-1, 506-2, and 506-3 and unselected notes 506-4, 506-5, 506-17, and 506-18. In FIGS. 5MM-5NN, the note 506-3 is de-selected (e.g., by clicking while the cursor 508 is over note 506-3), and the selected time interval is maintained. Further, in FIGS. 5OO-5PP, the note 506-18 is selected (e.g., by clicking while the cursor 508 is over note 506-18), and the selected time interval is maintained. FIGS. 5QQ-5RR illustrate time stretching of selected notes 506-1, 506-2, and 506-18 in response to a dragging input on the second border 514. The dragging input causes the length of the selected time interval to double between FIG. 5QQ and FIG. 5RR. In response, the duration of each of the selected notes 506-1, 506-2, and 506-18 is doubled, and the time between the note initiation time of each selected note and the start of the selected time interval is also doubled.

Figure 6A:
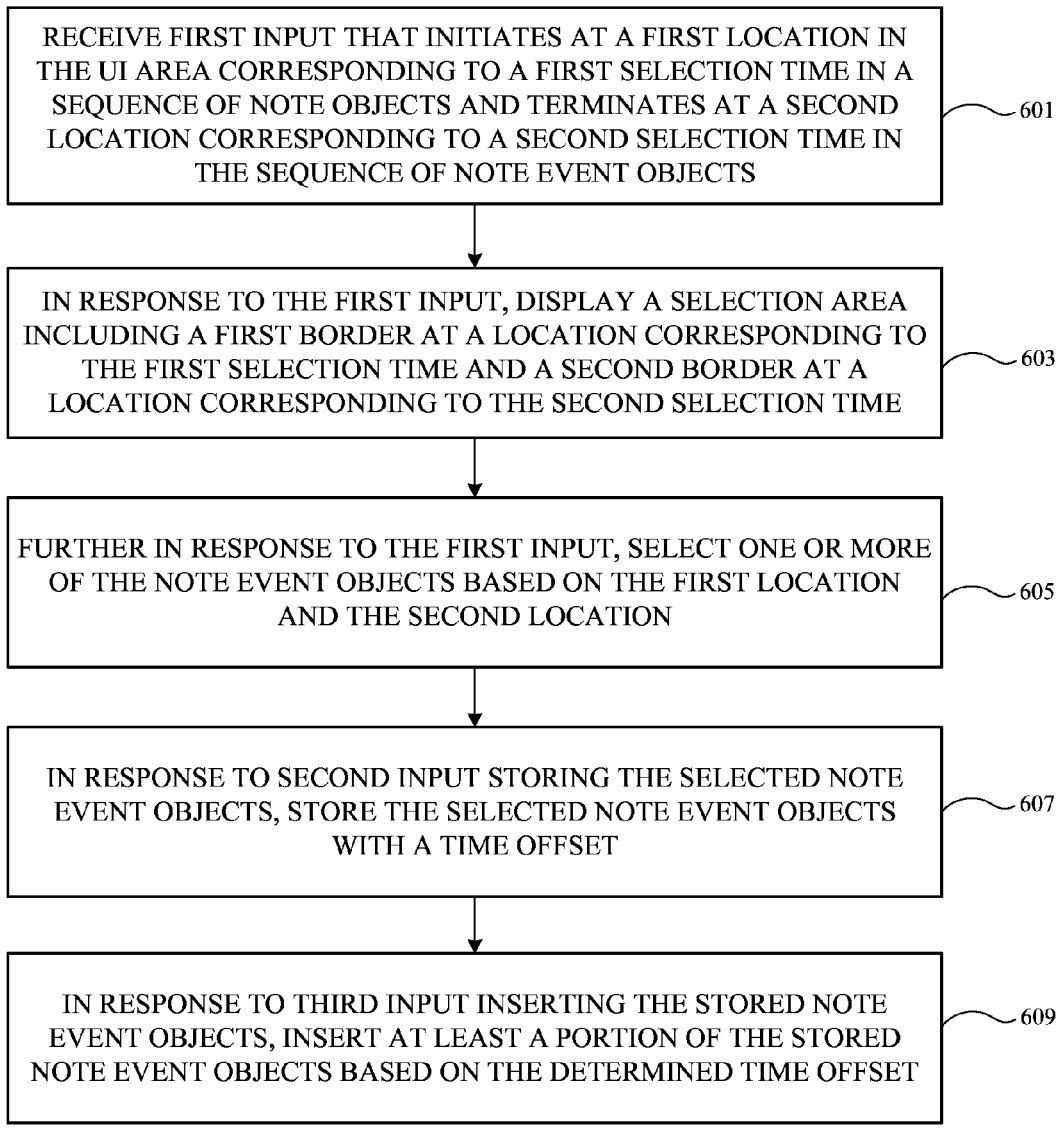
FIGS. 6A-6B are flow diagrams illustrating methods of an audio editing application in accordance with some embodiments.
Figure 6B:
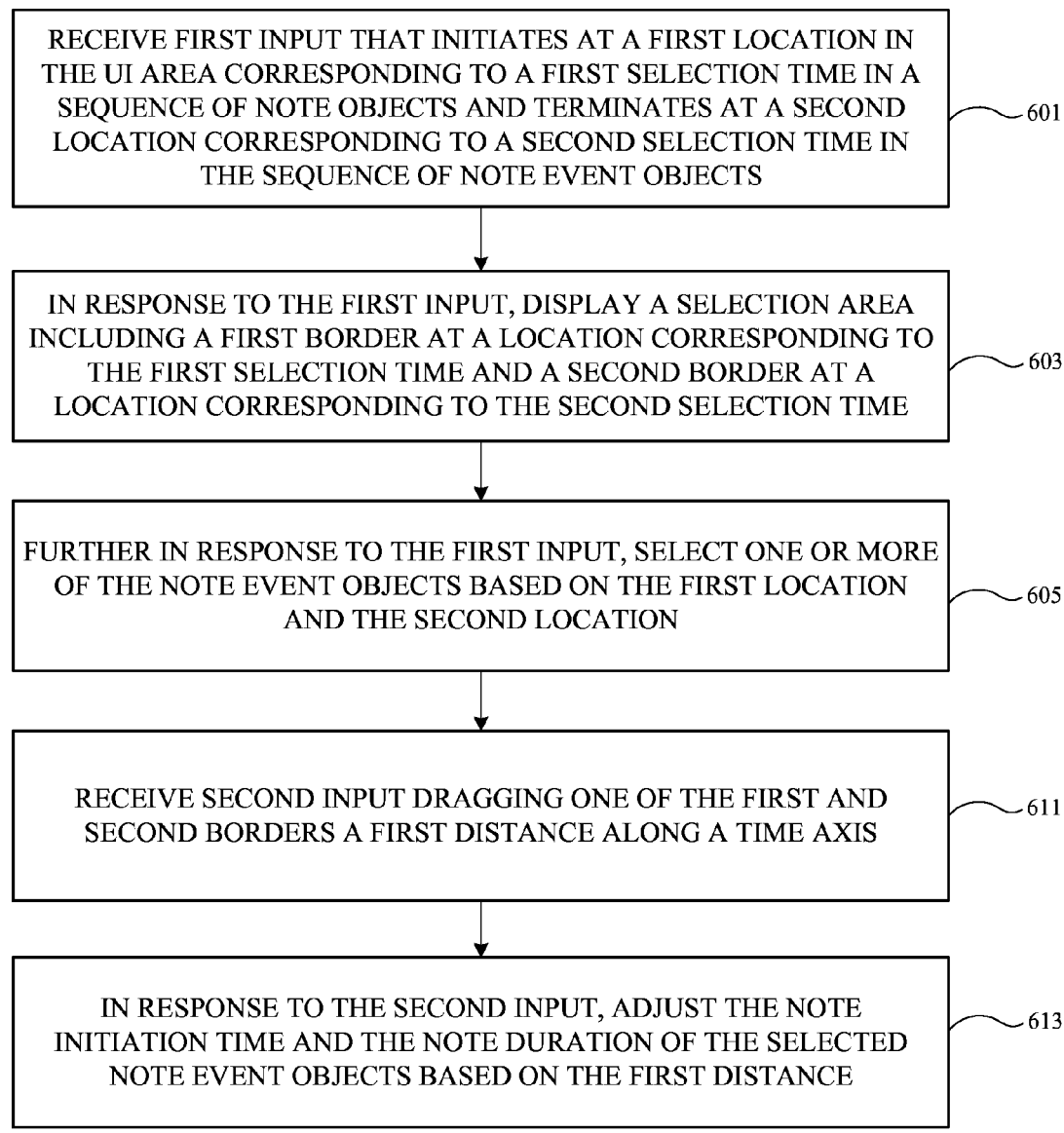

FIGS. 6A-6B are flow diagrams illustrating methods of an audio editing application in accordance with some embodiments. The methods are optionally performed at an electronic device as described above with reference to FIGS. 1A-B, 2, and 3 (e.g., electronic device 100 or 300, etc.). Some operations in the methods are, optionally, combined and/or the order of some operations is, optionally, changed.

As described below, the methods provide user interfaces for manipulating note event objects in a sequence of notes. The methods reduce the cognitive burden on a user when interacting with a user interface on the device by allowing the user to easily manipulate multiple notes at once, thereby creating a more efficient human-machine interface. For battery-operated electronic devices, increasing the efficiency of the user's interaction with the user interfaces conserves power and increases the time between battery charges.

An electronic device receives (601) a first input on a musical user interface area (e.g., user interface area 500 in FIGS. 5A-5RR) that initiates at a first location in the user interface area corresponding to a first selection time in a sequence of note event objects and terminates at a second location in the user interface area corresponding to a second selection time in the sequence of note event objects (e.g., a dragging input from the first location to the second location using a mouse, touch pad, touch screen, etc., as illustrated in FIGS. 5B-5C).

In response to the first input, the electronic device displays (603) a selection area (e.g., selection area 510 in FIG. 5D) including a first border (e.g., first border 512 in FIG. 5D) at a location corresponding to the first selection time (e.g., along a time axis 502) and a second border (e.g., second border 514 in FIG. 5D) at a location corresponding to the second selection time (e.g., along a time axis), the first and second borders being movable to different locations corresponding to different times of the sequence (e.g., in response to a dragging input on one of the borders, as illustrated in FIGS. 5R-5W). In some embodiments, the first location does not coincide with a location corresponding to one of the sequence of notes. For example, there may be an offset between the start of the selected time interval and the note initiation time of the earliest selected note, as illustrated in FIG. 5D, showing a one beat offset between the start of the selected time interval and the note initiation time of earliest selected note 506-1.

In some embodiments, further in response to the first input, the electronic device optionally selects (605) one or more of the note event objects based on the first location and the second location. For example, the first and second locations optionally define a bounding box (e.g., the bounding box of selection area 510 in FIG. 5D), and the selection includes selecting every note inside the bounding box (e.g., notes 506-1, 506-2, and 506-3) and not selecting any notes outside the bounding box (e.g., notes 506-4 and 506-5).

In some embodiments, the electronic device optionally receives second input storing the selected note event objects (e.g., input selecting a user interface object for storing the selected note event objects, such as the "Store Brush" button 520 in FIGS. 5E-5F). In response to the second input, the electronic device optionally stores (607) the selected note event objects with a time offset determined based on a difference between a note initiation time (e.g., a "note-on" time) of an earliest note event object of the selected note event objects and the first selection time (e.g., the one beat offset between the start of the selected time interval and the earliest selected note 506-1 illustrated in FIG. 5F).

In some embodiments, the electronic device receives third input inserting the stored note event objects (e.g., dragging to insert the stored pattern as illustrated in FIGS. 5G-5J). In response to the third input, the electronic device optionally inserts (609) at least a portion of the stored note event objects into the sequence of note event objects based on the determined time offset. For example, as illustrated in FIGS. 5G-5J, the third input starts at a first insertion location along the time axis 502 in FIG. 5G, and the earliest note event object 506-6 is inserted along the time axis offset from the first insertion location based on the determined time offset.

In some embodiments, the third input optionally includes a dragging input that traverses a first distance along a time axis, the first distance being shorter than a distance from the first selection time to the second selection time along the time axis (e.g., the input inserting the stored note event objects is shorter than the pattern), and the portion of the stored note event objects inserted excludes at least a latest note event object of the stored note event objects (e.g., because the input is shorter than the pattern, not all of the pattern is inserted, as illustrated in FIG. 5H).

In some embodiments, the third input includes a dragging input that traverses a first distance along a time axis, the first distance being longer than a distance from the first selection time to the second selection time along the time axis (e.g., the input inserting the stored note event objects is longer than the pattern), and, further in response to the third input, at least a portion of the stored note event objects are repeated, as illustrated in FIG. 5J.

In some embodiments, the earliest note event object has a first pitch along a pitch axis in the user interface area (e.g., note 506-1 has a pitch of C in FIG. 5K), and the third input starts at a second pitch along the pitch axis, different from the first pitch (e.g., the cursor 508 starts at the pitch E in FIG. 5K). In such a case, the electronic device optionally transposes the inserted portion of the stored note event objects such that the earliest note event object has the second pitch along the pitch axis and the rest of the inserted pattern is transposed in kind, as illustrated in FIG. 5L.

In some embodiments, transposing the inserted portion is further based on a selected scale. In such a case, the individual note event objects are not all transposed the same distance along the pitch axis, and are instead transposed to match a corresponding pitch in the selected scale. For example, in FIG. 5M a C Major scale is selected using the "Scale Quantize" selector 524, in FIG. 5N the cursor 508 starts at the pitch E, and in FIG. 5O the inserted portion is transposed such that all the notes are in the C Major scale (e.g., note 506-15 is inserted having a pitch of C, instead of inserting a note having a pitch of C# as with note 506-12 in FIG. 5L).

In some embodiments, a user interface object (e.g., a cursor or an icon) of the user interface area has a first visual appearance before the second input is received, and the user interface object changes to a second visual appearance in response to the second input (e.g., the cursor or icon changes appearance to indicate that a pattern has been stored). For example, the cursor 508 is white in FIG. 5E before the "Store Brush" button 520 is clicked and changes to black in FIG. 5F after the "Store Brush" button 520 is clicked. In some embodiments, the electronic device receives fourth input clearing the stored note event objects from storage (e.g., clicking the "Clear Brush" button 522 in FIG. 5P). In response to the fourth input, the electronic device clears the stored note event objects from storage and reverts the user interface object from the second visual appearance to the first visual appearance. For example, the cursor 508 is black in FIG. 5P before the "Clear Brush" button 522 is clicked and reverts back to white in FIG. 5R after the "Clear Brush" button 522 is clicked.

In some embodiments, each of the selected note event objects optionally has a note initiation time and a note duration. The electronic device optionally receives (611) second input dragging one of the first and second borders a first distance along a time axis (e.g., input dragging the second border 514 in FIGS. 5R-5T or the first border 512 in FIGS. 5U-5W). In response to the second input, the electronic device optionally adjusts (613) the note initiation time and the note duration of each of the selected note event objects based on the first distance. For example, FIGS. 5R-5T illustrate adjusting the note initiation time and the note duration of each of the selected notes 506-1, 506-2, and 506-3 in response to input dragging the second border 514, and FIGS. 5U-5W illustrate adjusting the note initiation time and the note duration of each of the selected notes 506-1, 506-2, and 506-3 in response to input dragging the first border 512.

In some embodiments, the note initiation times and the note durations are each adjusted in proportion to the first distance along the time axis, as illustrated in FIGS. 5R-5W. In some embodiments, the note initiation times are adjusted relative to the first selection time and not relative to the note initiation time of an earliest note event object of the selected note event objects. For example, in FIGS. 5R-5T, the note initiation times of notes 506-1, 506-2, and 506-3 are adjusted relative to the start of the selected time interval and not relative to the note initiation time of the earliest note 506-1.

In some embodiments, adjusting the note initiation time of each note event object optionally includes snapping each note initiation time to a nearest quantized rhythm value. For example, as illustrated in FIGS. 5X-5AA and described above, if a selected quantization is "Quarter Note" then each note initiation time is adjusted and snapped to the nearest quarter note rhythm value. In contrast, if the selected quantization is "Whole Note" then each note initiation time is adjusted and snapped to the nearest whole note rhythm value.

In some embodiments, the dragged border is dragged past a non-dragged border along the time axis, and adjusting the note initiation time of each of the selected note event objects optionally includes reversing an order of the selected note event objects, as illustrated in FIGS. 5CC-5EE, which show the first border 512 being dragged past the second border 514, and the selected notes 506-1, 506-2, and 506-3 being reversed accordingly.

In some embodiments, the electronic device, further in response to the first input, displays a first pivot (e.g., pivot 516 in FIG. 5FF) at a first pivot location corresponding to the first selection time. The electronic device receives third input dragging the first pivot, and, in response to the third input, the electronic device optionally adjusts the first selection time according to the third input while maintaining the note initiation time and the note duration of each of the selected note event objects. For example, FIGS. 5FF-5HH illustrate the first pivot 516 being dragged and the selected time interval being adjusting accordingly, without stretching the selected notes 506-1, 506-2, and 506-3.

In some embodiments, the electronic device, further in response to the first input, displays a second pivot (e.g., pivot 518 in Figure II) at a second pivot location corresponding to the second selection time (e.g., along the time axis). The electronic device receives fourth input dragging the second pivot, and, in response to the fourth input, the electronic device optionally adjusts the second selection time according to the fourth input while maintaining the note initiation time and the note duration of each of the selected note event objects. For example, FIGS. 5II-5KK illustrate the second pivot 518 being dragged and the selected time interval being adjusting accordingly, without stretching the selected notes 506-1, 506-2, and 506-3.

In some embodiments, the electronic device, further in response to the third input, optionally selects one or more additional note event objects in the sequence of note event objects, and further in response to the fourth input, optionally de-selects one or more of the selected note event objects. That is, one or more notes are selected and/or de-selected in response to the changing selected time interval. However, in some embodiments, adjusting the selected time interval using the pivots does not change which notes are selected, as illustrated in FIGS. 5FF-5KK.

In some embodiments, the electronic device receives third input selecting one or more additional note event objects that are positioned either before the first selection time or after the second selection time, and, in response to the third input, the electronic device optionally selects the one or more additional note event objects while maintaining the first selection time and the second selection time. For example, FIGS. 5OO-5PP illustrate selecting the note 506-18 while maintaining the selected time interval.

In some embodiments, the electronic device receives fourth input de-selecting one or more of the selected note event objects, and, in response to the fourth input, the electronic device optionally de-selects the one or more of the selected note event objects while maintaining the first selection time and the second selection time. For example, FIGS. 5MM-5NN illustrate de-selecting the note 506-3 while maintaining the selected time interval.

In some embodiments, none of the selected note event objects fall within the selected time interval. A time stretch operation optionally stretches all of the selected notes with respect to the selected time interval, even if one or more of the selected notes (or all of the selected notes) fall outside the selected time interval. For example, FIGS. 5QQ-5RR illustrate stretching the selected notes 506-1 and 506-2 (which fall within the selected time interval) along with selected note 506-18 (which falls outside the selected time interval.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 6A-6B are, optionally, implemented by components depicted in FIGS. 1A-1B. For example, receiving operation 601, displaying operation 603, selecting operation 605, storing operation 607, inserting operation 609, receiving operation 611, and adjusting operation 613 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
    receiving a first input on a musical user interface area that initiates at a first location in the user interface area corresponding to a first selection time in a sequence of note event objects and terminates at a second location in the user interface area corresponding to a second selection time in the sequence of note event objects;
    in response to the first input, displaying a selection area including a first border at a location corresponding to the first selection time and a second border at a location corresponding to the second selection time, the first and second borders being movable to different locations corresponding to different times of the sequence;
    further in response to the first input, selecting one or more of the note event objects based on the first location and the second location;
    receiving second input storing the selected note event objects; and in response to the second input, storing the selected note event objects with a time offset determined based on a difference between a note initiation time of an earliest note event object of the selected note event objects and the first selection time.

2. The method of claim 1, the method further comprising:
receiving third input inserting the stored note event objects; and
in response to the third input, inserting at least a portion of the stored note event objects into the sequence of note event objects based on the determined time offset.

3. The method of claim 2, wherein the third input includes a dragging input that traverses a first distance along a time axis, the first distance being shorter than a distance from the first selection time to the second selection time along the time axis; and
wherein the portion of the stored note event objects inserted excludes at least a latest note event object of the stored note event objects.

4. The method of claim 2, wherein the third input includes a dragging input that traverses a first distance along a time axis, the first distance being longer than a distance from the first selection time to the second selection time along the time axis, the method further comprising:
further in response to the third input, repeating at least a portion of the stored note event objects.

5. The method of claim 2, wherein the earliest note event object has a first pitch along a pitch axis in the user interface area, and the third input starts at a second pitch along the pitch axis, different from the first pitch, the method further comprising:
transposing the inserted portion of the stored note event objects such that the earliest note event object has the second pitch along the pitch axis.

6. The method of claim 5, wherein transposing the inserted portion is further based on a selected scale.

7. The method of claim 2, wherein a user interface object of the user interface area has a first visual appearance before the second input is received, and the user interface object changes to a second visual appearance in response to the second input.

8. The method of claim 7, the method further comprising:
receiving fourth input clearing the stored note event objects from storage;
in response to the fourth input:
clearing the stored note event objects from storage; and
reverting the user interface object from the second visual appearance to the first visual appearance.

9. The method of claim 1, wherein the first location does not coincide with a location corresponding to one of the sequence of notes.

10. A method comprising:
receiving a first input on a musical user interface area that initiates at a first location in the user interface area corresponding to a first selection time in a sequence of note event objects and terminates at a second location in the user interface area corresponding to a second selection time in the sequence of note event objects;
in response to the first input, displaying a selection area including a first border at a location corresponding to the first selection time and a second border at a location corresponding to the second selection time, the first and second borders being movable to different locations corresponding to different times of the sequence;
further in response to the first input, selecting one or more of the note event objects based on the first location and the second location, wherein each of the selected note event objects has a note initiation time and a note duration;
receiving second input dragging one of the first and second borders a first distance along a time axis; and
in response to the second input, adjusting the note initiation time and the note duration of each of the selected note event objects based on the first distance.

11. The method of claim 10, wherein the note initiation times and the note durations are each adjusted in proportion to the first distance along the time axis.

12. The method of claim 10, wherein the note initiation times are adjusted relative to the first selection time.

13. The method of claim 10, wherein adjusting the note initiation time of each note event object includes snapping each note initiation time to a nearest quantized rhythm value.

14. The method of claim 10, wherein the dragged border is dragged past a non-dragged border along the time axis, and adjusting the note initiation time of each of the selected note event objects includes reversing an order of the selected note event objects.

15. The method of claim 10, the method further comprising:
further in response to the first input, displaying a first pivot at a first pivot location corresponding to the first selection time;
receiving third input dragging the first pivot; and
in response to the third input, adjusting the first selection time according to the third input while maintaining the note initiation time and the note duration of each of the selected note event objects.

16. The method of claim 15, the method further comprising:
further in response to the first input, displaying a second pivot at a second pivot location corresponding to the second selection time;
receiving fourth input dragging the second pivot; and
in response to the fourth input, adjusting the second selection time according to the fourth input while maintaining the note initiation time and the note duration of each of the selected note event objects.

17. The method of claim 16, the method further comprising:
further in response to the third input, selecting one or more additional note event objects in the sequence of note event objects; and
further in response to the fourth input, de-selecting one or more of the selected note event objects.

18. The method of claim 10, the method further comprising:
receiving third input selecting one or more additional note event objects that are positioned either before the first selection time or after the second selection time; and
in response to the third input, selecting the one or more additional note event objects while maintaining the first selection time and the second selection time.

19. The method of claim 10, the method further comprising:
receiving fourth input de-selecting one or more of the selected note event objects; and
in response to the fourth input, de-selecting the one or more of the selected note event objects while maintaining the first selection time and the second selection time.

20. A non-transitory computer readable storage medium storing one or more programs, the one or more programs comprising instructions, which when executed by an electronic device with one or more processors and memory, cause the electronic device to perform a method comprising:

receiving a first input on a musical user interface area that initiates at a first location in the user interface area corresponding to a first selection time in a sequence of note event objects and terminates at a second location in the user interface area corresponding to a second selection time in the sequence of note event objects;

in response to the first input, displaying a selection area including a first border at a location corresponding to the first selection time and a second border at a location corresponding to the second selection time, the first and second borders being movable to different locations corresponding to different times of the sequence;

further in response to the first input, selecting one or more of the note event objects based on the first location and the second location;

receiving second input storing the selected note event objects; and in response to the second input, storing the selected note event objects with a time offset determined based on a difference between a note initiation time of an earliest note event object of the selected note event objects and the first selection time.

21. An electronic device, comprising:
one or more processors;
memory; and
one or more programs, wherein the one or more programs are stored in the memory and configured to be executed by the one or more processors, the one or more processors including instructions for performing a method comprising:

receiving a first input on a musical user interface area that initiates at a first location in the user interface area corresponding to a first selection time in a sequence of note event objects and terminates at a second location in the user interface area corresponding to a second selection time in the sequence of note event objects;

in response to the first input, displaying a selection area including a first border at a location corresponding to the first selection time and a second border at a location corresponding to the second selection time, the first and second borders being movable to different locations corresponding to different times of the sequence;

further in response to the first input, selecting one or more of the note event objects based on the first location and the second location;

receiving second input storing the selected note event objects; and in response to the second input, storing the selected note event objects with a time offset determined based on a difference between a note initiation time of an earliest note event object of the selected note event objects and the first selection time.

22. The electronic device of claim 21, the method further comprising:
receiving third input inserting the stored note event objects; and
in response to the third input, inserting at least a portion of the stored note event objects into the sequence of note event objects based on the determined time offset.

23. The electronic device of claim 22, wherein the third input includes a dragging input that traverses a first distance along a time axis, the first distance being shorter than a distance from the first selection time to the second selection time along the time axis; and
wherein the portion of the stored note event objects inserted excludes at least a latest note event object of the stored note event objects.

24. The electronic device of claim 22, wherein the third input includes a dragging input that traverses a first distance along a time axis, the first distance being longer than a distance from the first selection time to the second selection time along the time axis, the method further comprising:
further in response to the third input, repeating at least a portion of the stored note event objects.

25. The electronic device of claim 22, wherein the earliest note event object has a first pitch along a pitch axis in the user interface area, and the third input starts at a second pitch along the pitch axis, different from the first pitch, the method further comprising:
transposing the inserted portion of the stored note event objects such that the earliest note event object has the second pitch along the pitch axis.

26. The electronic device of claim 21, wherein the first location does not coincide with a location corresponding to one of the sequence of notes.

27. The non-transitory computer readable storage medium of claim 20, the method further comprising:
receiving third input inserting the stored note event objects; and
in response to the third input, inserting at least a portion of the stored note event objects into the sequence of note event objects based on the determined time offset.

28. The non-transitory computer readable storage medium of claim 27, wherein the third input includes a dragging input that traverses a first distance along a time axis, the first distance being shorter than a distance from the first selection time to the second selection time along the time axis; and
wherein the portion of the stored note event objects inserted excludes at least a latest note event object of the stored note event objects.

29. The non-transitory computer readable storage medium of claim 27, wherein the third input includes a dragging input that traverses a first distance along a time axis, the first distance being longer than a distance from the first selection time to the second selection time along the time axis, the method further comprising:
further in response to the third input, repeating at least a portion of the stored note event objects.

30. The non-transitory computer readable storage medium of claim 27, wherein the earliest note event object has a first pitch along a pitch axis in the user interface area, and the third input starts at a second pitch along the pitch axis, different from the first pitch, the method further comprising:
transposing the inserted portion of the stored note event objects such that the earliest note event object has the second pitch along the pitch axis.

31. The non-transitory computer readable storage medium of claim 20, wherein the first location does not coincide with a location corresponding to one of the sequence of notes.

32. A non-transitory computer readable storage medium storing one or more programs, the one or more programs comprising instructions, which when executed by an electronic device with one or more processors and memory, cause the electronic device to perform a method comprising:
receiving a first input on a musical user interface area that initiates at a first location in the user interface area corresponding to a first selection time in a sequence of note event objects and terminates at a second location in the user interface area corresponding to a second selection time in the sequence of note event objects;

in response to the first input, displaying a selection area including a first border at a location corresponding to the first selection time and a second border at a location corresponding to the second selection time, the first and second borders being movable to different locations corresponding to different times of the sequence;

further in response to the first input, selecting one or more of the note event objects based on the first location and the second location, wherein each of the selected note event objects has a note initiation time and a note duration;

receiving second input dragging one of the first and second borders a first distance along a time axis; and in response to the second input, adjusting the note initiation time and the note duration of each of the selected note event objects based on the first distance.

33. The non-transitory computer readable storage medium of claim 32, wherein the note initiation times and the note durations are each adjusted in proportion to the first distance along the time axis.

34. The non-transitory computer readable storage medium of claim 32, wherein the note initiation times are adjusted relative to the first selection time.

35. The non-transitory computer readable storage medium of claim 32, wherein adjusting the note initiation time of each note event object includes snapping each note initiation time to a nearest quantized rhythm value.

36. The non-transitory computer readable storage medium of claim 32, wherein the dragged border is dragged past a non-dragged border along the time axis, and adjusting the note initiation time of each of the selected note event objects includes reversing an order of the selected note event objects.

37. The non-transitory computer readable storage medium of claim 32, the method further comprising:
   further in response to the first input, displaying a first pivot at a first pivot location corresponding to the first selection time;
   receiving third input dragging the first pivot; and
   in response to the third input, adjusting the first selection time according to the third input while maintaining the note initiation time and the note duration of each of the selected note event objects.

38. The non-transitory computer readable storage medium of claim 32, the method further comprising:
   receiving third input selecting one or more additional note event objects that are positioned either before the first selection time or after the second selection time; and
   in response to the third input, selecting the one or more additional note event objects while maintaining the first selection time and the second selection time.

39. The non-transitory computer readable storage medium of claim 32, the method further comprising:
   receiving fourth input de-selecting one or more of the selected note event objects; and
   in response to the fourth input, de-selecting the one or more of the selected note event objects while maintaining the first selection time and the second selection time.

40. An electronic device, comprising:
one or more processors;
memory; and
one or more programs, wherein the one or more programs are stored in the memory and configured to be executed by the one or more processors, the one or more processors including instructions for performing a method comprising:
   receiving a first input on a musical user interface area that initiates at a first location in the user interface area corresponding to a first selection time in a sequence of note event objects and terminates at a second location in the user interface area corresponding to a second selection time in the sequence of note event objects;
   in response to the first input, displaying a selection area including a first border at a location corresponding to the first selection time and a second border at a location corresponding to the second selection time, the first and second borders being movable to different locations corresponding to different times of the sequence;
   further in response to the first input, selecting one or more of the note event objects based on the first location and the second location, wherein each of the selected note event objects has a note initiation time and a note duration;
   receiving second input dragging one of the first and second borders a first distance along a time axis; and
   in response to the second input, adjusting the note initiation time and the note duration of each of the selected note event objects based on the first distance.

41. The electronic device of claim 40, wherein the note initiation times and the note durations are each adjusted in proportion to the first distance along the time axis.

42. The electronic device of claim 40, wherein the note initiation times are adjusted relative to the first selection time.

43. The electronic device of claim 40, wherein adjusting the note initiation time of each note event object includes snapping each note initiation time to a nearest quantized rhythm value.

44. The electronic device of claim 40, wherein the dragged border is dragged past a non-dragged border along the time axis, and adjusting the note initiation time of each of the selected note event objects includes reversing an order of the selected note event objects.

45. The electronic device of claim 40, the method further comprising:
   further in response to the first input, displaying a first pivot at a first pivot location corresponding to the first selection time;
   receiving third input dragging the first pivot; and
   in response to the third input, adjusting the first selection time according to the third input while maintaining the note initiation time and the note duration of each of the selected note event objects.

46. The electronic device of claim 40, the method further comprising:
   receiving third input selecting one or more additional note event objects that are positioned either before the first selection time or after the second selection time; and
   in response to the third input, selecting the one or more additional note event objects while maintaining the first selection time and the second selection time.

47. The electronic device of claim 40, the method further comprising:
   receiving fourth input de-selecting one or more of the selected note event objects; and in response to the fourth input, de-selecting the one or more of the selected note event objects while maintaining the first selection time and the second selection time.

* * * * *